(12) United States Patent
Kim et al.

(10) Patent No.: US 12,541,274 B2
(45) Date of Patent: Feb. 3, 2026

(54) ELECTRONIC DEVICE

(71) Applicant: HiDeep Inc., Seongnam-si (KR)

(72) Inventors: Seyeob Kim, Seongnam-si (KR);
Bonkee Kim, Seongnam-si (KR);
Yunjoung Kim, Seongnam-si (KR);
Jongsik Kim, Seongnam-si (KR);
Hyong Cheol Shin, Seongnam-si (KR);
Kwyro Lee, Seongnam-si (KR)

(73) Assignee: HiDeep Inc. (KR)

( * ) Notice: Subject to any disclaimer, the term of this patent is extended or adjusted under 35 U.S.C. 154(b) by 0 days.

(21) Appl. No.: 18/734,657

(22) Filed: Jun. 5, 2024

(65) Prior Publication Data

US 2024/0402856 A1 Dec. 5, 2024

(30) Foreign Application Priority Data

Jun. 5, 2023 (KR) .................. 10-2023-0072399
Nov. 27, 2023 (KR) .................. 10-2023-0166299
(Continued)

(51) Int. Cl.
*G06F 3/044* (2006.01)
*G06F 1/16* (2006.01)
(Continued)

(52) U.S. Cl.
CPC .......... *G06F 3/0446* (2019.05); *G06F 1/1652* (2013.01); *G06F 3/03545* (2013.01); *G06F 3/04164* (2019.05); *G06F 2203/04102* (2013.01)

(58) Field of Classification Search
CPC .............. G06F 3/0446; G06F 3/04164; G06F 3/03545; G06F 1/1652; G06F 2203/04102
(Continued)

(56) References Cited

U.S. PATENT DOCUMENTS

2009/0085891 A1  4/2009  Yang et al.
2015/0277601 A1  10/2015 Tahara et al.
(Continued)

FOREIGN PATENT DOCUMENTS

JP  2016224638 A  12/2016
JP  2017162247 A  9/2017
(Continued)

OTHER PUBLICATIONS

European Search Report EP 24179993, Issued on Oct. 24, 2024.
(Continued)

*Primary Examiner* — Mark Edwards
(74) *Attorney, Agent, or Firm* — The Belles Group, P.C.

(57) ABSTRACT

The present disclosure relates to an electronic device, and more particularly, to an electronic device capable of sensing a stylus pen and an external object such as a finger, which is brought into proximity or contact with the electronic device and reducing the number of channels between a sensor unit and a touch controller. The electronic device according to an embodiment of the present invention includes a sensor unit and a touch controller. Here, the sensor unit includes: a plurality of first patterns, each of which extends in a first direction and has both ends electrically connected to the touch controller; and a plurality of third patterns, each of which extends in a second direction different from the first direction to cross the first pattern and has both ends of which at least one end is electrically connected to the touch controller.

18 Claims, 36 Drawing Sheets

(30) Foreign Application Priority Data

Mar. 15, 2024 (KR) .................. 10-2024-0036409
May 16, 2024 (KR) .................. 10-2024-0063613

(51) Int. Cl.
*G06F 3/0354* (2013.01)
*G06F 3/041* (2006.01)

(58) Field of Classification Search
USPC ..................................................... 345/173
See application file for complete search history.

(56) References Cited

U.S. PATENT DOCUMENTS

| | | | |
|---|---|---|---|
| 2016/0349921 A1* | 12/2016 | Mizuhashi | ............... G06F 3/046 |
| 2017/0123569 A1 | 5/2017 | Kim et al. | |
| 2017/0269770 A1 | 9/2017 | Ogawa | |
| 2019/0179460 A1* | 6/2019 | Mizuhashi | .......... G02F 1/13338 |
| 2020/0001645 A1* | 1/2020 | Yano | ..................... G06F 3/0488 |
| 2021/0311605 A1* | 10/2021 | Jiang | ..................... G06F 3/0446 |
| 2023/0168757 A1* | 6/2023 | Wu | ........................ G06F 3/041 |
| | | | 345/174 |

FOREIGN PATENT DOCUMENTS

| | | |
|---|---|---|
| JP | 2020004103 A | 1/2020 |
| KR | 10-2013-0094615 A | 8/2013 |
| KR | 10-2016-0083379 A | 7/2016 |
| KR | 10-2020-0077987 A | 7/2020 |
| KR | 10-2022-0112520 A | 8/2022 |
| WO | 2014/017749 A1 | 1/2014 |
| WO | 2023/068872 A1 | 4/2023 |

OTHER PUBLICATIONS

Japanese Office Action 2024-090792, Issued Apr. 30, 2025.
Korean Office Action for concurrent Korean Application No. 10-2024-0063613, Issued Sep. 10, 2025.

* cited by examiner

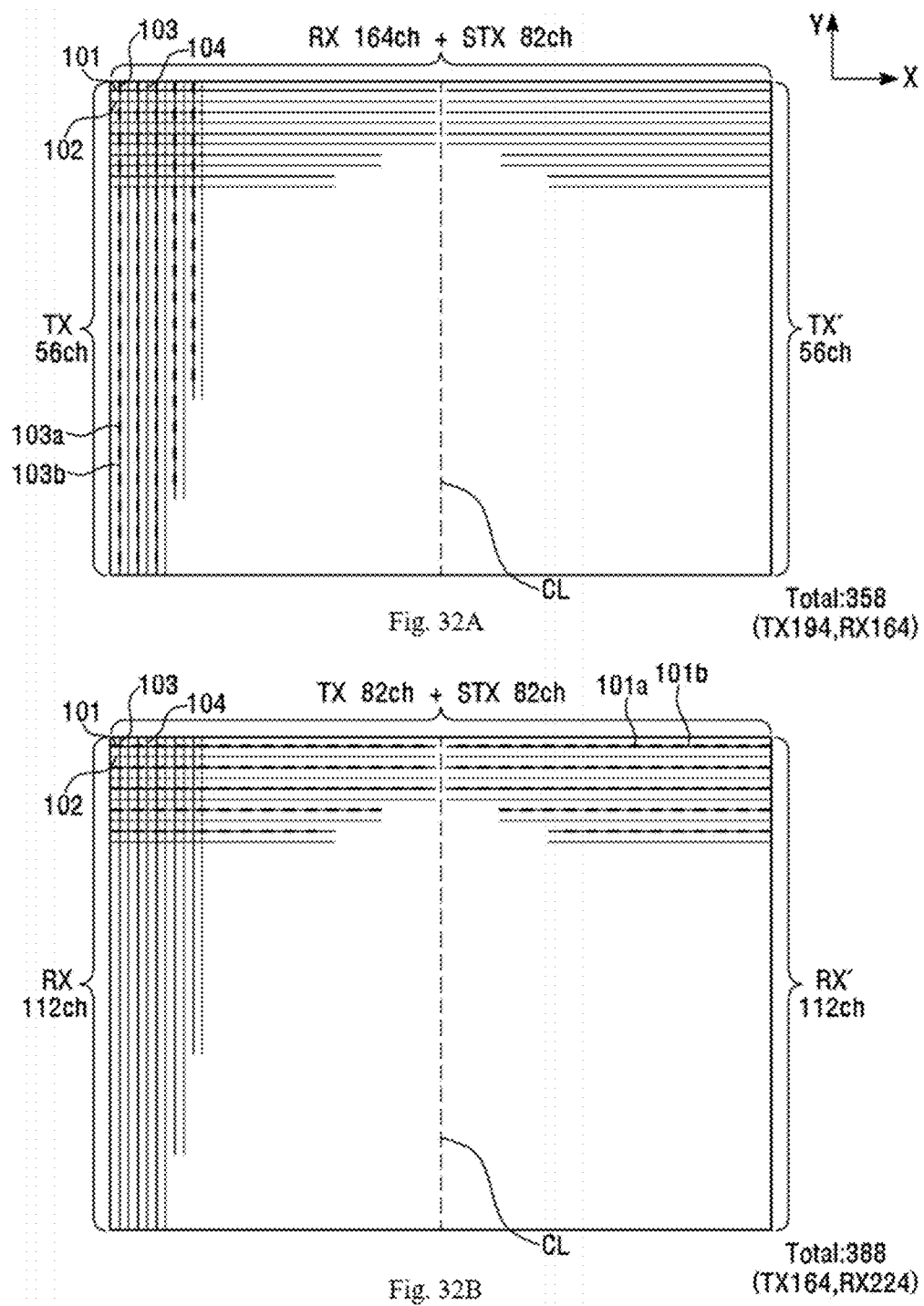

ELECTRONIC DEVICE

CROSS-REFERENCE TO RELATED APPLICATIONS

This U.S. Non-Provisional patent application claims priority under 35 USC § 119 of Korean Patent Application No. 10-2023-0072399, filed on Jun. 5, 2023; Korean Patent Application No. 10-2023-0166299, filed on Nov. 27, 2023; Korean Patent Application No. 10-2024-0036409, filed on Mar. 15, 2024; and Korean Patent Application No. 10-2024-0063613, filed on May 16, 2024, the entire contents of all of which are hereby incorporated by reference herein, for all purposes.

BACKGROUND

The present disclosure relates to an electronic device, and more particularly, to an electronic device capable of sensing a stylus pen and an external object such as a finger, which is brought into proximity or contact with the electronic device, and reducing the number of channels between a sensor unit and a touch controller.

In recent years, a smartphone and a tablet personal computer (PC) are actively spreading, and a technology for a built-in contact position measurement device is also actively developing.

The smartphone or the tablet PC generally includes a touch screen, and a user may use a finger or a stylus pen to designate specific coordinates on the touch screen. The user may input a specific signal to the smartphone by designating specific coordinates on the touch screen.

The touch screen may operate based on an electrical method, an infrared methods, and an ultrasound method. The electrical operation method may include, e.g., a R-type touch screens (resistive touch screen) or a C-type touch screen (capacitive touch screen).

Typically, the R-type touch screen capable of simultaneously recognizing a finger of a user and a stylus pen are widely used. However, the R-type touch screen has a limitation of reflection caused by an air layer between ITO layers. Accordingly, in recent years, the C-type touch screen is increasingly applied. The C-type touch screen operates in a method of sensing a difference between capacitances of transparent electrodes generated by contact of an object. However, the C-type touch screens has a disadvantage of generating an operational error caused by unintended contact of a hand when using a stylus pen because it is difficult to physically distinguish between the object such as the finger and the stylus pen.

Typically, in order to overcome the disadvantage, separate software that distinguishes the hand from the stylus pen based on a contact area is used, or a position measurement device in an electromagnetic resonance (EMR) method is used to distinguish the hand from the stylus pen. Here, the EMR method has an advantage of being insensitive to a display and an external noise by using a magnetic field instead of an electric field as driving force when using a touch function with the stylus pen while a touch and a display operate, thus having the advantage of being insensitive to the display and external noise.

However, the EMR method requires attaching a sensor film manufactured by using an additional separate FPCB to a bottom surface of a display panel to generate and transmit a magnetic field to the stylus pen and receive a magnetic field generated by the stylus pen again.

The sensor film is also referred to as a digitizer. When a position of the stylus pen that generates a magnetic field is changed, a separate integrated circuit detects the change of the magnetic field generated by an interaction.

On the other hand, the stylus pen is a device capable of inputting data by lightly touching the screen in a pen shape when dragging or clicking on the screen. The user may use the stylus pen for a precise touch input.

The stylus pen may be classified into an active stylus pen and a passive stylus pen depending on whether the stylus pen includes a battery and an electronic component.

In recent years, technologies of an inductive electro magnetic resonance (EMR) method and in a capacitive resonance method are proposed to realize the passive stylus pen capable of recognizing a precise touch.

The EMR method that is one kind of inductive resonance methods has a superior writing/drawing quality that is a main function, but has a disadvantage in that the electronic device has a great thickness and added costs because an additional separate sensor panel for EMR and an additional integrated circuit for EMR are required to be added.

The capacitive resonance method supports even a stylus pen touch without additional component or costs by using a general touch sensor and a general touch controller. However, according to the capacitive resonance method, although a resonance frequency coincides with a frequency of a driving signal, signal transmission is difficult due to extremely great attenuation thereof.

Regardless of whether the inductive resonance method or the capacitive resonance method is used, a magnitude (amplitude) of a resonance signal needs to be large to more accurately identify a touch by the stylus pen, and a frequency of a driving signal transmitted to the stylus pen needs to be almost equal to a resonance frequency of built-in resonance circuit of the stylus pen.

FIG. 1 is a schematic view for explaining that an output voltage Vout of a capacitance to voltage amplifier (CVA) is varied according to a position of a stylus pen 10 on a flexible display panel in a typical electronic device.

Referring to FIG. 1, a reason why an output of the CVA is varied depending on the position of the pen 10 on the flexible display panel is that an impedance ratio of both sides based on the pen 10 on a sensing line is varied.

Based on a major axis of the typical flexible display panel, a resistance R of a metal mesh touch sensor is approximately 1.2 k ohm, and a capacitor C is approximately 250 pF.

Based on ten distributed models, at a driving frequency of 300 kHz, an impedance of the capacitor is approximately 200 times (120 ohm vs. $1/(2\pi*300 \text{ k}*25 \text{ pF})=21$ k ohm) greater than a resistance thereof. Thus, the capacitor is a main factor.

FIG. 2 is a view for explaining through current sensing that output voltages Vout1 and Vout2 of the CVA are varied according to the position of the stylus pen 10 in FIG. 1, and FIG. 3 is a view for explaining through voltage sensing that the output voltages Vout1 and Vout2 of the CVA are varied according to the position of the pen 10 in FIG. 1.

Referring to FIGS. 2 and 3, the output voltages of the CVA are varied according to the position of the pen 10 on the sensing line. That is, the output voltage of the CVA increases as the pen 10 moves toward a sensing circuit unit 50 and decreases as the pen 10 moves away from the sensing circuit unit 50.

Since a size of a screen of the corresponding electronic device increases to about 11 inches to about 16 inches, or in the case of foldable screens, lengths of sensor patterns of the sensor unit also increase, there is a limitation in that resistance and capacitance values of the sensor unit increase.

FIG. 4 is a view for explaining a foldable device that is an example of the typical electronic device.

Referring to FIG. 4, the foldable device has at least one inner screen and at least one outer screen. The foldable device includes an inner touch screen 20 to realize the inner screen and an outer touch screen 25 to realize the outer screen. Also, the foldable device includes digitizers 30 and 35 disposed below inner/outer touch screens 20 and 25 for driving and sensing the stylus pen 10.

The stylus pen 10 in the inductive resonance method that is one kind of passive stylus pens receives an electromagnetic signal from the digitizers 30 and 35, and the digitizers 30 and 35 receive a resonance signal emitted from the stylus pen 10.

A coil to which a current is inducible by the electromagnetic signal to receive the electromagnetic signal from the stylus pen 10 is densely arranged on the digitizers 30 and 35. Since the foldable device further includes the digitizers 30 and 35 for respective inner/outer touch screens 20 and 25, there are a limitation in downsizing and slimness of the entire device and a limitation in designing a flexible inner structure.

Also, since a magnetic shielding material (not shown) and a copper layer (not shown), each of which has a predetermined thickness, are additionally attached on the bottom surface of each of the digitizers 30 and 35, there is an additional limitation in reducing a thickness of the entire device.

Particularly, although most of currently available foldable smartphones have the touch screens 20 and 25 on both an outer surface and an inner surface, respectively, based on a folded shape, a stylus function is supported only to the touch screen 20 on the inner surface and is not supported to the touch screen 25 on the outer surface. This is because the thickness of the entire device and manufacturing costs thereof increase when the digitizers 30 and 35 are attached to the bottom surfaces of the inner touch screen 20 and the outer touch screen 25, respectively, as illustrated in FIG. 4 to operate the stylus pen 10 in the EMR method.

SUMMARY

The present disclosure provides an electronic device that does not require a separate sensor for driving or sensing a stylus pen.

The present disclosure also provides an electronic device capable of performing double routing.

The present disclosure also provides an electronic device capable of reducing the number of channels between a touch controller and a sensor unit capable of sensing an object and a stylus pen at the same time.

The present disclosure also provides an electronic device capable of supporting a stylus pen function to an outer touch screen in addition to an inner touch screen.

An embodiment of the present invention provides an electronic device including a sensor unit and a touch controller. Here, the sensor unit includes: a plurality of first patterns, each of which extends in a first direction and has both ends electrically connected to the touch controller; and a plurality of third patterns, each of which extends in a second direction different from the first direction to cross the first pattern and has both ends of which at least one end is electrically connected to the touch controller.

In an embodiment, both the ends of each of the plurality of third patterns may be electrically connected to the touch controller.

In an embodiment, the sensor unit may further include a plurality of fourth patterns arranged adjacent to the third patterns, each extending in the second direction, and having one ends electrically connected to the touch controller or electrically floating and the other ends electrically connected to each other.

In an embodiment, one end of at least one of the plurality of fourth patterns may be electrically connected to the touch controller, and one ends of the rest fourth patterns may be electrically floating.

In an embodiment, one ends of the plurality of fourth patterns may be connected in pairs in parallel and electrically connected to the touch controller.

In an embodiment, the sensor unit may further include a plurality of second patterns arranged adjacent to the plurality of first patterns, respectively, and the plurality of second patterns may have one ends electrically floating and the other ends electrically connected to each other.

In an embodiment, each of the plurality of first patterns may include: a first-1 pattern having both ends of which one end is electrically connected to the touch controller; and a first-2 pattern arranged adjacent to the first-1 pattern and having both ends of which the other end is electrically connected to the touch controller.

In an embodiment, each of the plurality of third patterns may include: a third-1 pattern having both ends of which one end is electrically connected to the touch controller; and a third-2 pattern arranged adjacent to the third-1 pattern and having both ends of which the other end is electrically connected to the touch controller.

In an embodiment of the present invention, an electronic device includes a sensor unit and a touch controller. Here, the sensor unit includes: a plurality of first patterns, each of which extends in a first direction and has both ends of which at least one end is electrically connected to the touch controller; a plurality of second patterns arranged adjacent to the first patterns, each extending in the first direction, and having one ends electrically connected to each other; a plurality of third patterns, each of which extends in a second direction different from the first direction to cross the first pattern and has both ends of which at least one end is electrically connected to the touch controller; and a plurality of fourth patterns arranged adjacent to the third patterns, each extending in the second direction, and having one ends electrically connected to each other. Also, the plurality of first patterns include some first patterns each having both ends of which one end is electrically connected to the touch controller and other first patterns each having both ends of which the other end is electrically connected to the touch controller, and the some first patterns and the other first patterns are arranged alternately along the second direction.

In an embodiment, the plurality of second patterns may include some second patterns each having both ends of which one end is electrically connected to the touch controller and other second patterns each having both ends of which the other end is electrically connected to the touch controller, and the some second patterns and the other some second patterns may be arranged alternately along the second direction.

In an embodiment, each of the plurality of third patterns may include: a third-1 pattern; and a third-2 pattern arranged adjacent to the third-1 pattern, and the third-1 pattern may be arranged closer to the first pattern than the third-2 pattern.

In an embodiment, each of the plurality of first patterns may include: a first-1 pattern; and a first-2 pattern arranged adjacent to the first-1 pattern, and the first-1 pattern may be arranged closer to the third pattern than the first-2 pattern.

In an embodiment, the electronic device may further include a display panel on which the sensor unit is disposed. Here, the display panel may include an active area on which the plurality of first patterns and the plurality of third patterns are arranged and a dead space outside the active area, the sensor unit may further include at least one uplink channel disposed on the dead space, and the uplink channel may include an uplink trace extending in the first direction and a connection trace configured to connect the uplink trace to the touch controller.

In an embodiment, the uplink channel may include a first uplink channel and a second uplink channel, and the plurality of first patterns may be disposed between the first uplink channel and the second uplink channel.

In an embodiment, the connection trace may include some parallel traces arranged parallel to the uplink trace, and a plurality of traces connected to one ends of the plurality of first patterns may be disposed between the uplink traces and the parallel traces.

In an embodiment, the touch controller may control the sensor unit to operate in one of a plurality of modes, and the plurality of modes may include: an uplink mode that controls a current to flow through some first patterns in the first direction among the plurality of first patterns and controls a current to flow through other first patterns in a direction opposite to the first direction; and a downlink mode that controls to receive a stylus pen signal from the plurality of first patterns and the plurality of third patterns.

In an embodiment, in the uplink mode, the touch controller may control: a pen driving signal to be applied to one ends of the some first patterns; an inverse pen driving signal to be applied to the other ends of the some first patterns or the other ends of the some first patterns to be grounded; the inverse pen driving signal to be applied to the one ends of the other first patterns or the one ends of the other first patterns to be grounded; and the pen driving signal to be applied to the other ends of the other first patterns.

In an embodiment, the touch controller may include: a first circuit unit including a driving circuit connected to one ends of the plurality of first patterns to output a pen driving signal, an inverse driving circuit configured to output an inverse pen driving signal, and a ground circuit; a second circuit unit including a driving circuit connected to the other ends of the plurality of first patterns to output the pen driving signal, an inverse driving circuit configured to output the inverse pen driving signal, and a receiving circuit configured to receive a stylus pen signal; a third circuit unit including a receiving circuit connected to one ends of the plurality of third patterns to receive the stylus pen signal; and a control unit configured to control the first to third circuit units.

In an embodiment, the touch controller may include: a differential amplifier unit connected to both ends of the plurality of first patterns; and a circuit unit including a receiving circuit connected to one ends of the plurality of third patterns to receive the stylus pen signals.

In an embodiment, the touch controller may control the sensor unit to operate in one of a plurality of modes, and the plurality of modes may include a touch sensing mode and a pen signal sensing mode. Here, in the touch sensing mode, the touch controller may control the touch driving signal to be applied to the plurality of third patterns and receive the touch sensing signal from the plurality of first patterns, and in the pen signal sensing mode, the touch controller may receive the pen signal from the plurality of first patterns and the plurality of third patterns. Also, the touch controller may differentiate and output two signals output from an n-th first pattern and an n+2-th first pattern in the second direction in an order from the top of the plurality of first patterns.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIGS. 32A and 32B are views for explaining other typical sensor units each having a landscape shape;

DETAILED DESCRIPTION

Figure 1:
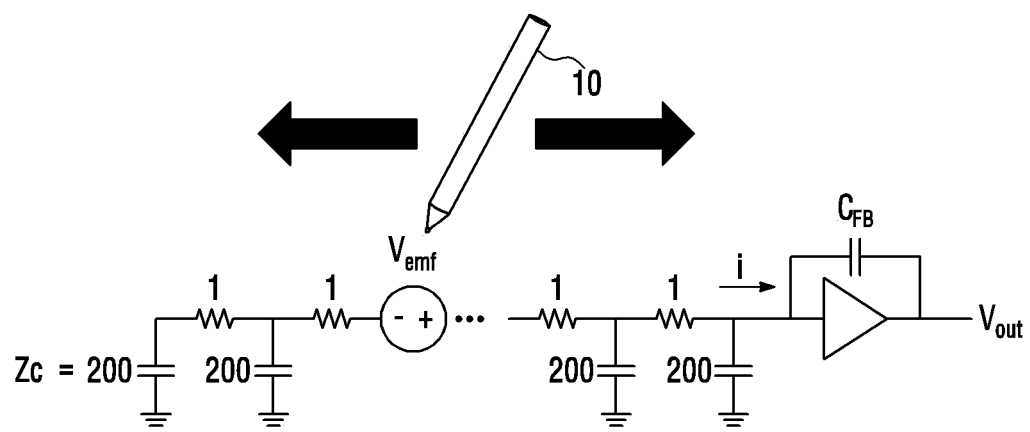
FIG. 1 is a schematic view for explaining that an output voltage Vout of a capacitance to voltage amplifier (CVA) is varied according to a position of a stylus pen 10 on a flexible display panel in a typical electronic device.
Figure 2:
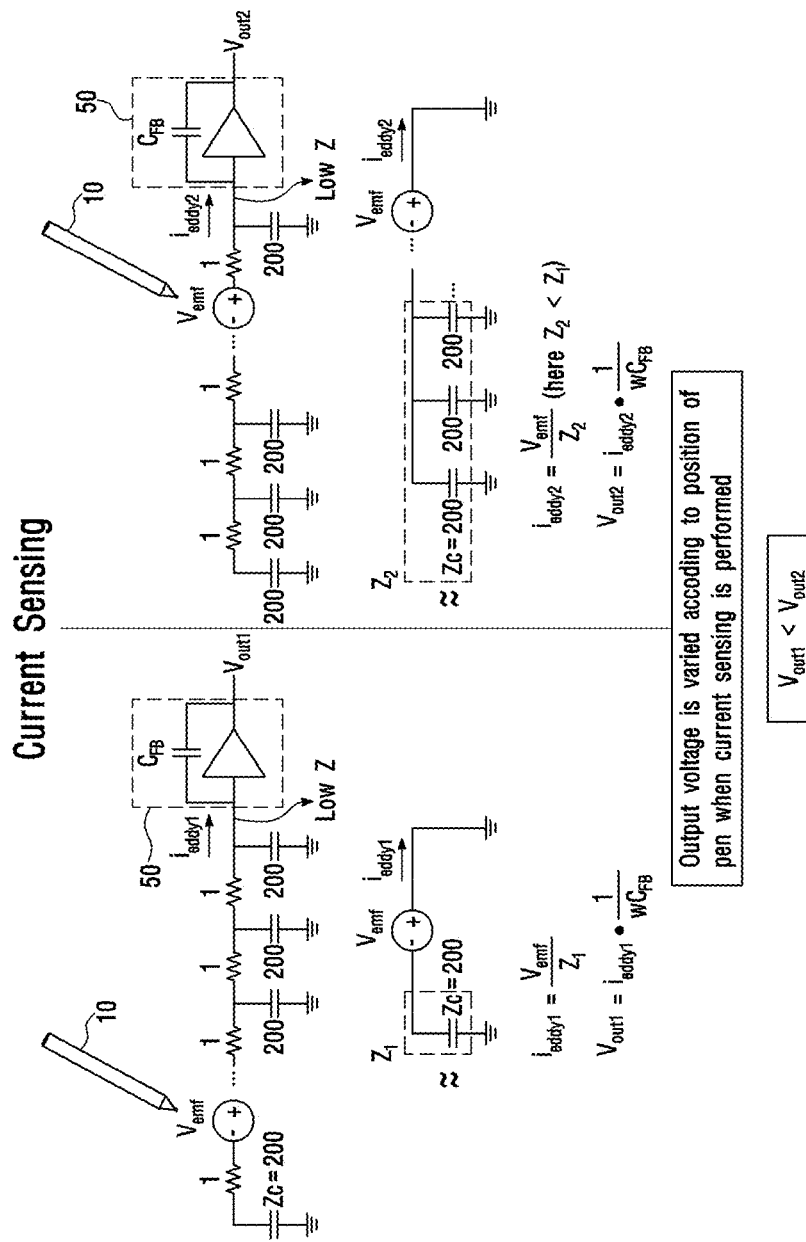
FIG. 2 is a view for explaining that output voltages Vout1 and Vout2 of the CVA are varied according to the position of the stylus pen 10 in FIG. 1 through current sensing.
Figure 3:
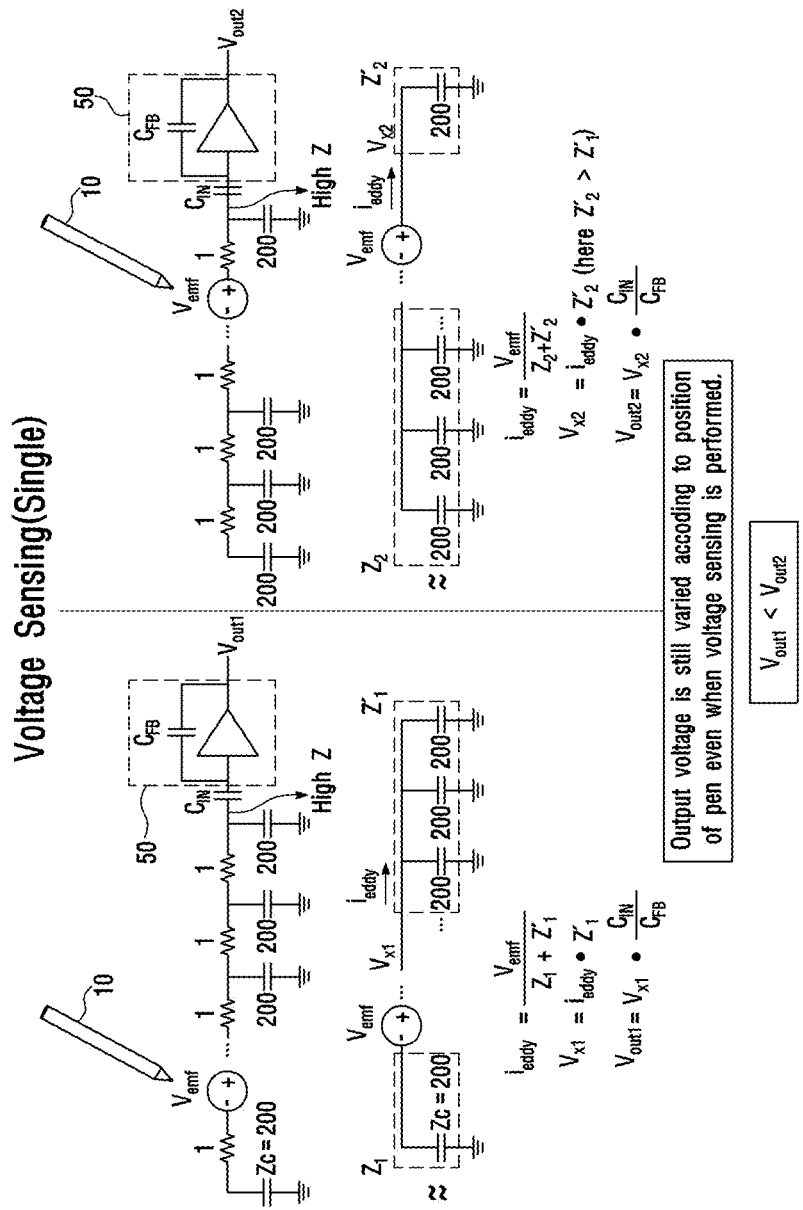
FIG. 3 is a view for explaining that output voltages Vout1 and Vout2 of the CVA are varied according to the position of the stylus pen 10 in FIG. 1 through voltage sensing.

The present invention will now be described more fully with reference to the accompanying drawings, in which exemplary embodiments of the invention are shown. These embodiments are provided so that this disclosure will be thorough and complete, and will fully convey the concept of the invention to those skilled in the art. The invention may, however, be embodied in many different forms and should not be construed as being limited to the embodiments set forth herein. Therefore, it will be understood that the embodiments disclosed in this specification includes some variations without limitations to the shapes as illustrated in the figures. Also, the position or the arrangement of each component in the embodiment may be varied without departing form the spirit or scope of the invention. The preferred embodiments should be considered in descriptive sense only and not for purposes of limitation. Therefore, the scope of the invention is defined not by the detailed description of the invention but by the appended claims, and all differences within the scope will be construed as being included in the present invention. In the drawings, like reference numerals refer to like elements throughout.

An electronic device according to various embodiments of the present document may be an electronic device such as a typical smartphone or an electronic device having a rectangular screen that is relatively greater than a screen of the typical smartphone and having a diagonal length of about 10 inches or more to about 13 inches or less. For example, the electronic device may include at least one of a foldable smartphone, a tablet personal computer, a vehicle display device, an e-book reader, a laptop personal computer, and a netbook computer.

Also, the electronic device according to various embodiments of the present invention may detect a position of an object such as a finger disposed on a screen, output a driving signal for driving a stylus pen, and detect a position of the stylus pen disposed on the screen by sensing a signal output from the stylus pen.

Also, the electronic device according to various embodiments of the present invention includes a foldable device having at least one folded screen, and the foldable device includes a tablet personal computer (PC) or laptop PC in addition to a smartphone.

Hereinafter, various embodiments will be described in detail with reference to the accompanying drawings.

Figure 5:
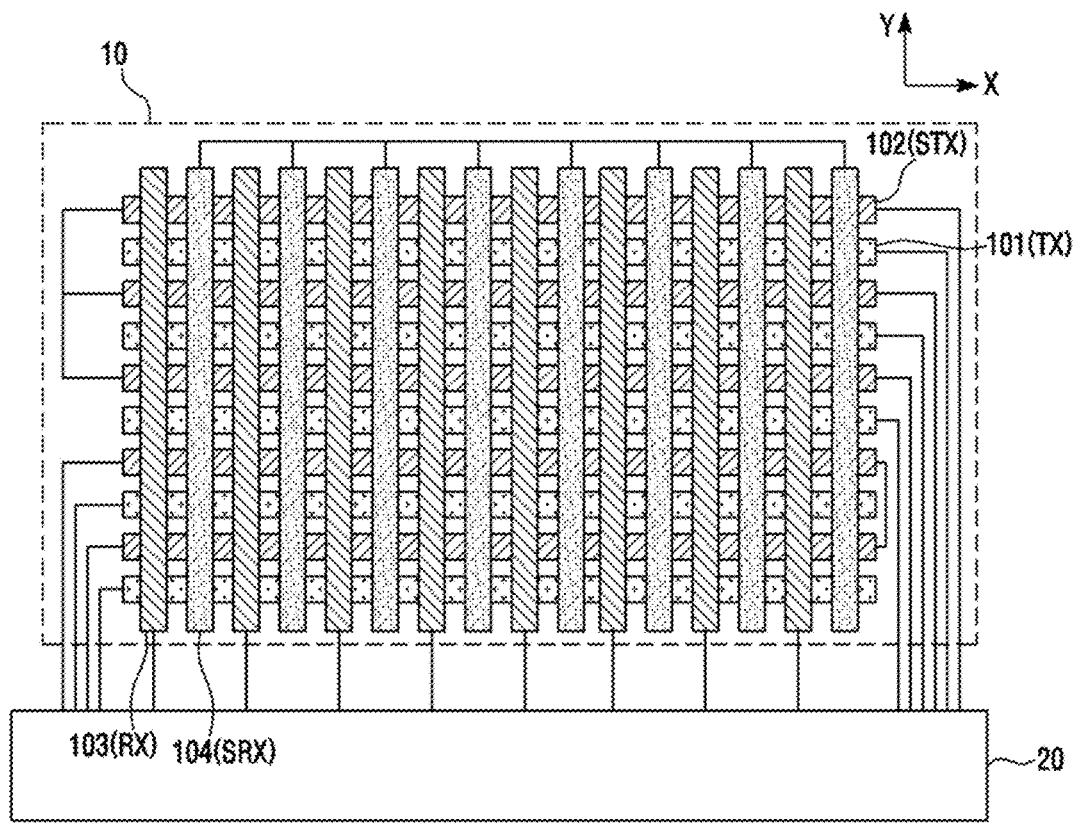
FIG. 5 is a schematic configuration view of an electronic device according to a first embodiment of the present invention.

FIG. 5 is a schematic configuration view of an electronic device according to a first embodiment of the present invention.

Referring to FIG. 5, the electronic device according to the first embodiment includes a sensor unit 10 and a touch controller 20 and further include a plurality of traces that electrically connect the sensor unit 10 and the touch controller 20 or electrically connect two or more patterns of the sensor unit 20 to each other.

The sensor unit 10 may sense an object such as a finger and drive and/or sense a stylus pen.

The sensor unit 10 includes a plurality of patterns (or a plurality of electrodes).

The sensor unit 10 may include a plurality of first to fourth patterns 101, 102, 103, and 104.

The first pattern 101 has a shape extending in an arbitrary first direction X. The first direction may be a direction of a major axis of the screen of the electronic device. The first pattern 101 may be also referred to as TX (a first touch electrode or a touch driving electrode).

Each of a plurality of first patterns 101 has one end that is electrically connected to the touch controller 20 through the trace and the other end that is electrically floating.

The second pattern 102 has a shape extending in the first direction X, is disposed adjacent to the first pattern 101, and is spaced a predetermined distance from the first pattern 101. The second pattern 102 may be also referred to as stylus TX (STX) (a first pen electrode or a pen driving electrode).

The second pattern 102 has one end that is electrically connected to one or more other second patterns through the trace and the other end that is electrically connected to the touch controller 20 through the trace.

Some of a plurality of second patterns 102 may have one ends disposed at a left side and the other ends disposed at a right side. On the contrary, the rest second patterns may have one ends disposed at the right side and the other ends disposed at the left side.

The third pattern 103 has a shape extending in a second direction Y different from the first direction. The second direction Y may be a direction perpendicular to the first direction X and a direction of a minor axis of the screen of the electronic device. The third pattern 103 may be also referred to as RX (a second touch electrode or a touch receiving electrode).

Each of a plurality of third patterns 103 has one end that is electrically connected to the touch controller 20 through the trace and the other end that is electrically floating.

The fourth pattern 104 has a shape extending in the second direction Y, is disposed adjacent to the third pattern 103, and is spaced a predetermined distance from the third pattern 103. The fourth pattern 104 may be also referred to as stylus RX (SRX) (a second pen electrode or a pen receiving electrode).

The plurality of fourth patterns 104 have one ends electrically connected to each other through at least one trace and the other ends that are electrically floating.

The third and fourth patterns 103 and 104 are disposed on the same layer as or a different layer from the first and second patterns 101 and 102 and are spaced a predetermined distance from the first and second patterns 101 and 102.

The plurality of first patterns 101 are arranged in the second direction Y, and the plurality of second patterns 102 are also arranged in the second direction Y. The plurality of third patterns 103 are arranged in the first direction X, and the plurality of fourth patterns 104 are also arranged in the first direction X.

Since the first pattern 101 extends in the first direction X, the third pattern 103 extends in the second direction Y, and the first direction X is longer than the second direction Y, the number of the first plurality of patterns 101 is less than the number of the third plurality of patterns 103. Thus, the number of channels of the plurality of first patterns 101 is less than that of channels of the plurality of third patterns 103. Here, the number of the plurality of first patterns 101 and the number of the plurality of third patterns 103 may increase or decrease according to a size of the screen of the electronic device.

Since a display screen of a tablet PC, a laptop computer, or a foldable device, which is an example of the electronic device, has a landscape shape, the number (e.g., 8) of the channels of the plurality of third patterns 103 is relatively greater than that (e.g., 5) of the channels of the plurality of first patterns 101. Thus, the plurality of second patterns 102 for driving and/or sensing the stylus pen are required to be arranged as many as the number (5) of the channels of the plurality of first patterns 101. In this case, overall resistance of the sensor unit 100 increases by the traces that electrically connect the plurality of second patterns 102 and the touch controller 200. Accordingly, parasitic capacitance may be formed between the traces. For example, in a case of an 11 inch to 16 inch tablet PCs, since the number of channels of added second patterns 102 is greater than approximately 30, the parasitic capacitance may act as a significant burden on the electronic device.

An embodiment (or embodiments) of the electronic device, which may solve the above-described limitations, will be described in detail with reference to drawings below.

Figure 6:
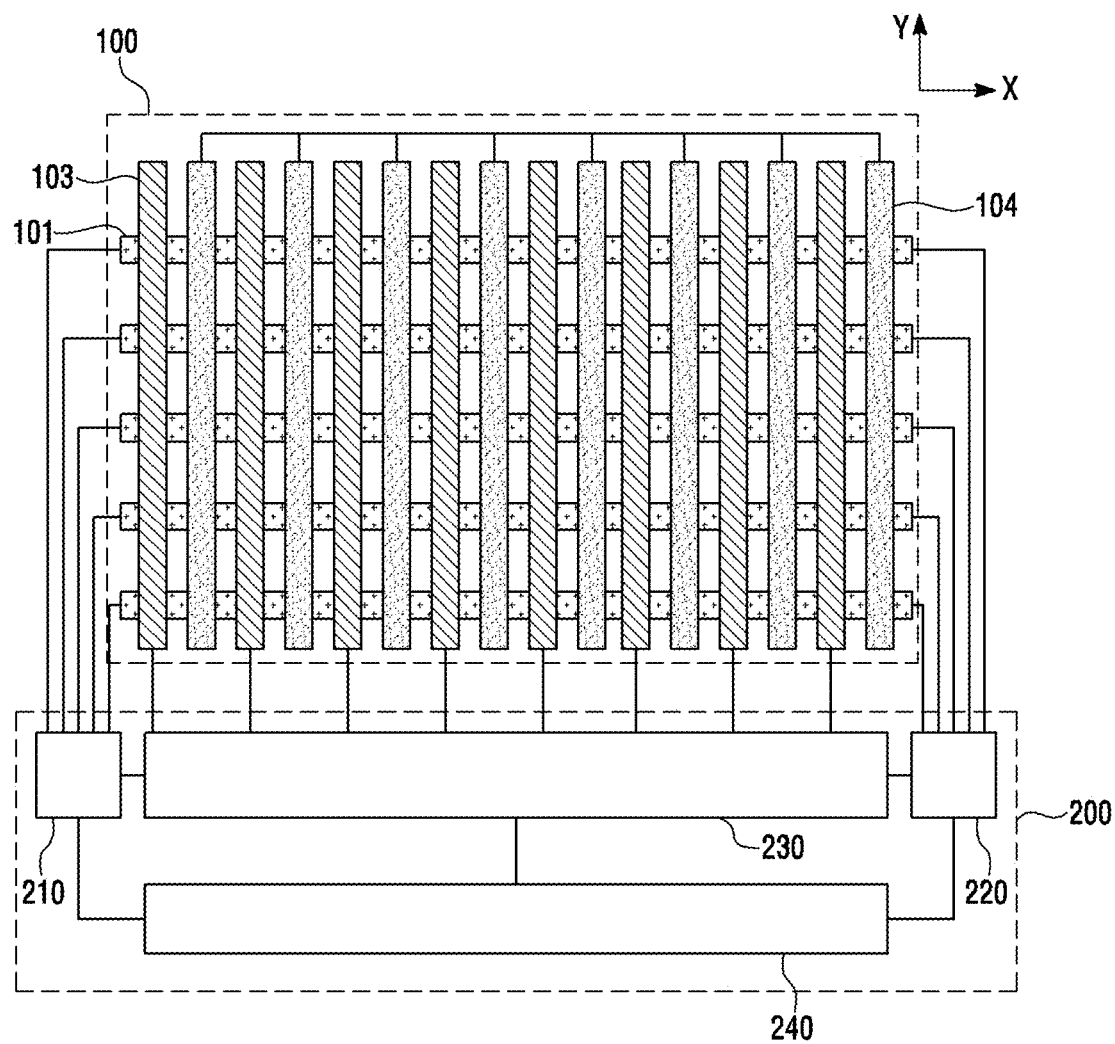
FIG. 6 is a schematic configuration view of an electronic device according to a second embodiment of the present invention.

FIG. 6 is a schematic configuration view of an electronic device according to a second embodiment of the present invention.

Referring to FIG. 6, the electronic device according to the second embodiment includes a sensor unit 100 and a touch controller 200 and further include a plurality of traces that electrically connect the sensor unit 100 and the touch controller 200.

The sensor unit 100 includes a plurality of first patterns 101, a plurality of third patterns 103, and a plurality of fourth patterns 104, and the touch controller 200 includes a first circuit unit 210, a second circuit unit 220, a third circuit unit 230, and a control unit 240.

When compared with the sensor unit 10 in FIG. 5, the sensor unit 100 in FIG. 6 has a difference in that the second pattern 102 is omitted, and both ends of the first pattern 101 arranged in the first direction (or a direction of a major axis) are electrically connected to the touch controller 200 through the traces. More particularly, the first pattern 101 has one end connected to the first circuit unit 210 of the touch controller 200 through one trace (or trace pattern) and the other end connected to the second circuit unit 220 of the touch controller 200 through another trace (or trace pattern). Hereinafter, the above-described method of electrically connecting both the ends of each of the plurality of first patterns 101 to the touch controller 200 through the traces is referred to as a "double routing method".

In the sensor unit 100 of FIG. 6, the first pattern 101 may be referred to as a first pattern in the first direction X, the third pattern 103 may be referred to as a first pattern in the second direction Y, and the fourth pattern 104 may be referred to as a second pattern in the second direction Y.

One end disposed more closely to the touch controller 200 among both ends of the third pattern 103 arranged in the second direction (or a direction of a minor axis) is electrically connected to the touch controller 200 through the traces, and the other end is electrically floating. Here, the one end of the third pattern 103 may be connected to the third circuit unit 230 of the touch controller 200.

One end disposed more closely to the touch controller 200 among both ends of the fourth pattern 104 disposed adjacent to the third pattern 103 and arranged in the second direction (or the direction of the minor axis) is electrically floating, and the other end is electrically connected to the other ends of other third patterns through at least one trace.

Each of the first circuit unit 210 and the second circuit unit 220 of the touch controller 200 may include a touch driving circuit unit that outputs a touch driving signal, a first driving circuit unit that outputs a first driving signal, a first inverse driving circuit unit that outputs an inverse signal of the first driving signal, a ground circuit unit, and a receiving circuit unit that receives a pen signal. The third circuit unit 230 may include a receiving circuit unit that receives a touch sensing signal or a pen signal.

When compared with the sensor unit 10 in FIG. 5, the sensor unit 100 of the electronic device according to the second embodiment of the present invention may not only sense an object such as a finger, but also drive and/or sense the stylus pen although the sensor unit 100 does not include the plurality of second patterns 102. Furthermore, the number of channels between the sensor unit 100 and the touch controller 200 may be reduced.

The electronic device according to the second embodiment of the present invention may be a landscape-type electronic device. The sensor unit (100) of a landscape-type electronic device is configured with a width in the first direction greater than the height in the second direction, and the touch controller (200) controlling the sensor unit (100) is positioned beneath the sensor unit (100). A landscape-type electronic device corresponds to, for example, the form factor of a tablet PC or a foldable smartphone.

The electronic device including the sensor unit 100 and the touch controller 200 according to the second embodiment of the present invention may detect a position of an object such as a finger disposed on the screen of the electronic device, drive the stylus pen brought into proximity or contact with the screen, and sense a signal emitted from the stylus pen to detect the position of the stylus pen disposed on the screen. Hereinafter, an embodiment will be described in detail with reference to FIGS. 7 to 10.

Figure 7:
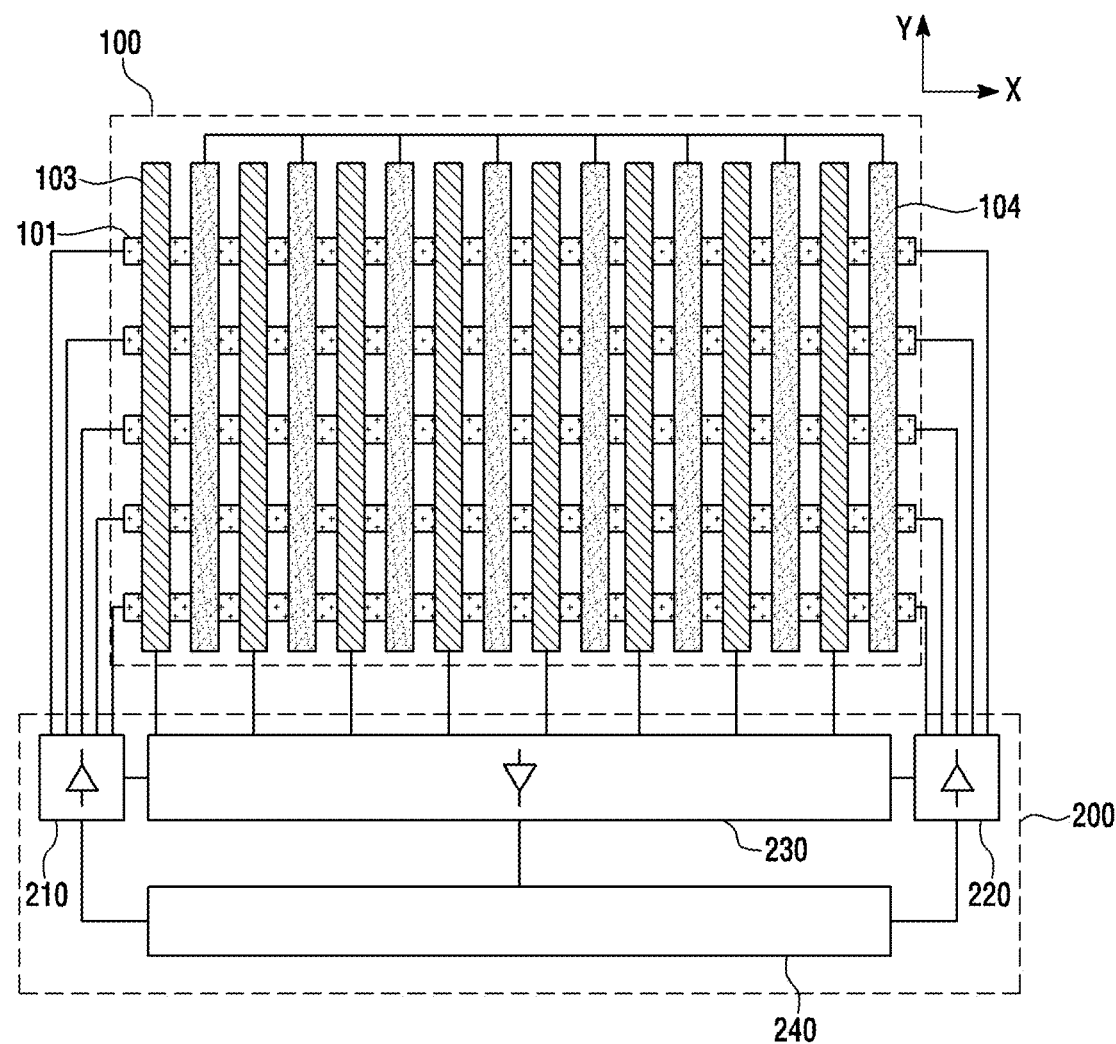
FIG. 7 is a view for explaining a first mode (or touch sensing mode) for sensing an object by the electronic device in FIG. 6.
Figure 8:
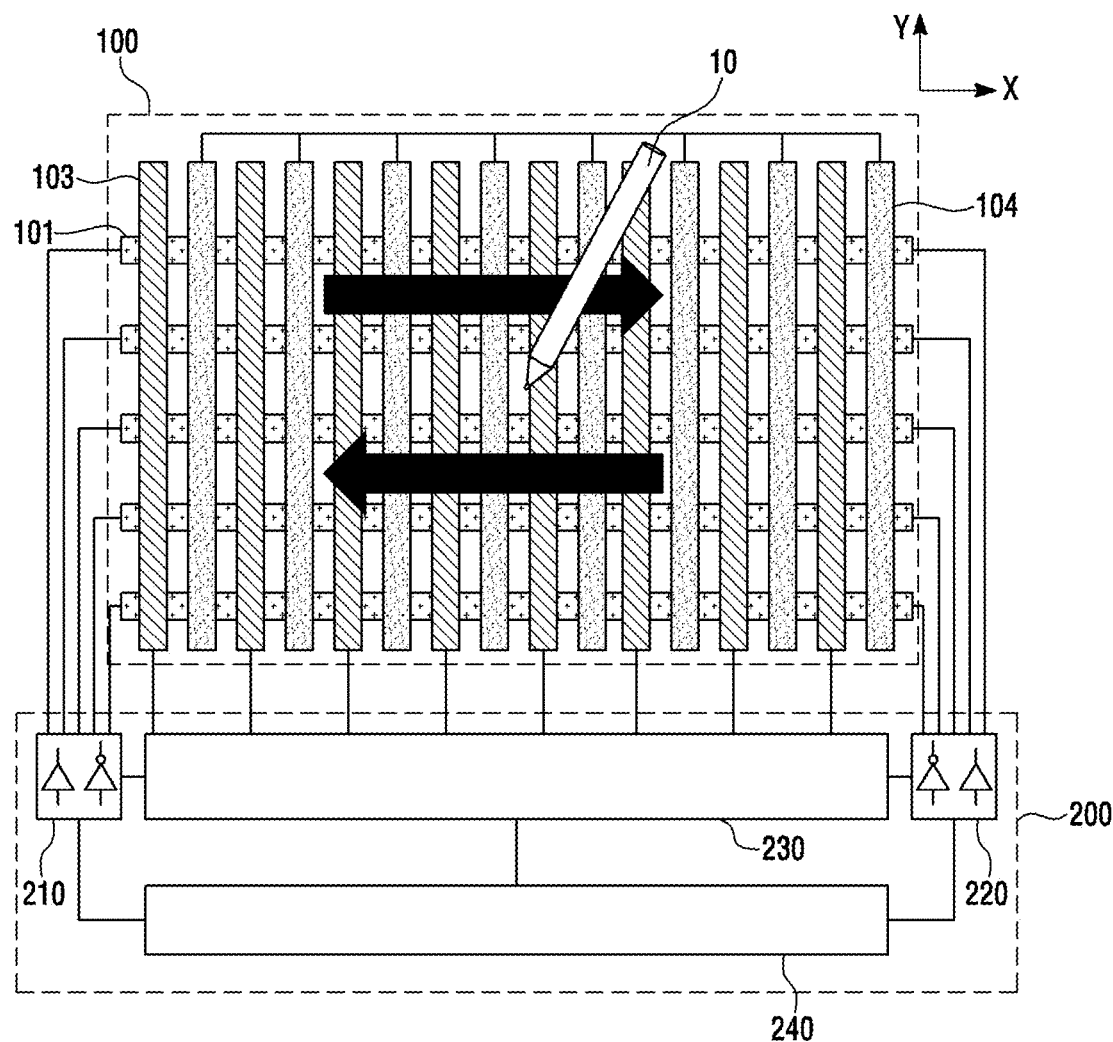
FIGS. 8 and 9 are views for explaining a second mode (or uplink mode) for driving a stylus pen by the electronic device in FIG. 6.
Figure 9:
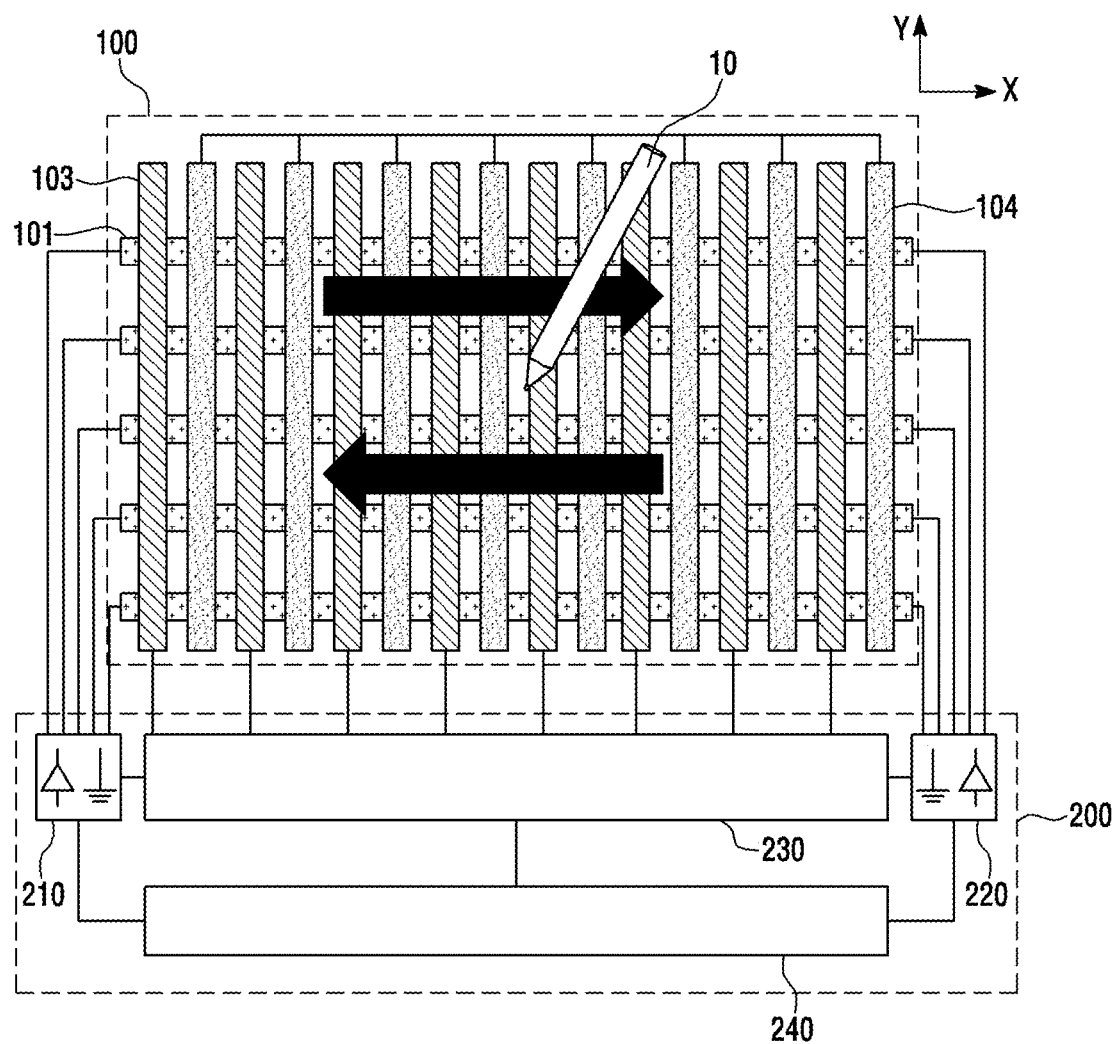
Figure 10:
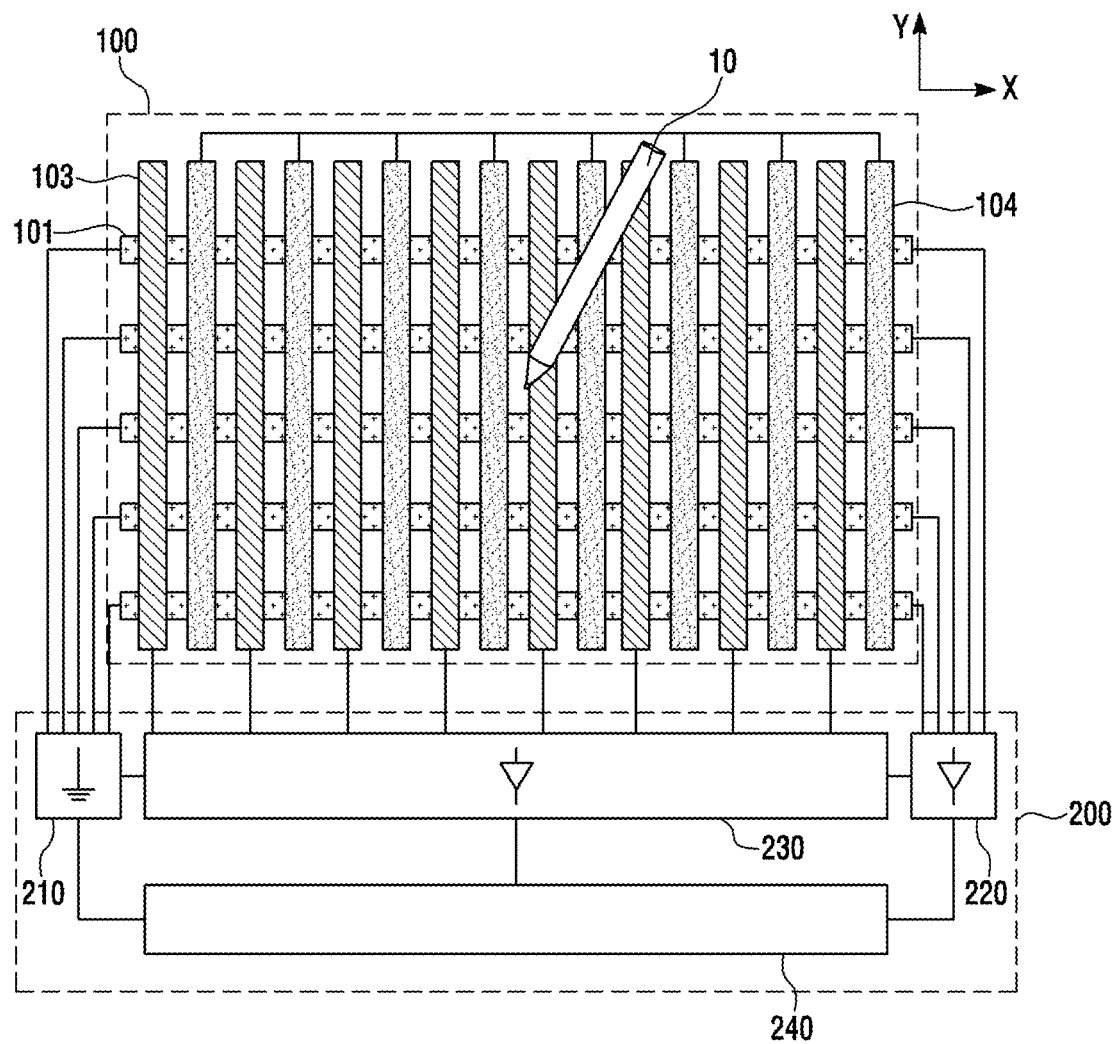
FIG. 10 is a view for explaining a third mode (or downlink mode) for sensing the stylus pen by the electronic device in FIG. 6.

FIG. 7 is a view for explaining a first mode (or touch sensing mode) for the electronic device in FIG. 6 to sense an object, FIGS. 8 to 9 are views for explaining a second mode (or uplink mode) for the electronic device in FIG. 6 to drive the stylus pen, and FIG. 10 is a view for explaining a third mode (or downlink mode) for the electronic device in FIG. 6 to sense (or detect) the stylus pen.

The touch controller 200 of the electronic device according to the second embodiment of the present invention may sense an object such as a finger brought into proximity or contact with the sensor unit 100 by using the plurality of first patterns 101 and the plurality of third patterns 103 of the sensor unit 100.

Particularly, referring to FIG. 7, the touch controller 200 may use the plurality of first patterns 101 of the sensor unit 100 as the touch driving electrode TX to which the touch driving signal is applied and the plurality of third patterns 103 as the touch receiving electrode RX that outputs the touch receiving signal, and vice versa.

The control unit 240 of the touch controller 200 may control the first circuit unit 210 and the second circuit unit 220 to apply a touch driving signal to the plurality of first patterns 101. To this end, each of the first circuit unit 210 and the second circuit unit 220 may output a touch driving signal by a control signal from the control unit 240.

The control unit 240 may allow the first circuit unit 210 to apply a touch driving signal to one ends of the plurality of first patterns 101 and the second circuit unit 220 to simultaneously apply the touch driving signal to the other ends of the plurality of first patterns 101. When the same touch driving signal is applied to both ends of each of the first patterns 101 as described above, a position of maximum resistance in each of the first patterns 101 may be a central portion of the corresponding first pattern 101.

The control unit 240 may receive a touch sensing signal through the plurality of third patterns 103. Each received touch sensing signal includes information on an amount of variation in capacitance between the first pattern 101 and the third pattern 103. The control unit 240 may determine a position of an object based on the amount of variation in capacitance.

Although not shown in the drawings, the control unit 240 may control so that the touch driving signal is applied to each of the first pattern 101 and the third pattern 103, and the touch sensing signal is output from each of the first pattern 101 and the third pattern 103.

The touch controller 200 of the electronic device according to the second embodiment of the present invention may form a current loop for driving the stylus pen using the plurality of first patterns 101.

The touch controller 200 may form a current loop in the sensor unit 100 for driving the stylus pen by using one of two methods that will be described with reference to FIGS. 8 and 9 below.

First, as illustrated in FIG. 8, the touch controller 200 controls a preset current to flow through one or more first patterns among the plurality of first patterns 101 along the first direction X and controls the current to simultaneously flow through one or more first patterns along a direction −X that is a direction opposite to the first direction X. Here, the touch controller 200 may select the one or more first patterns and the one or more other first patterns according to a position of the stylus pen brought into proximity or contact with the screen. Based on the position of the stylus pen 10, the first pattern(s) disposed thereabove are the one or more first patterns, and the first pattern(s) disposed therebelow are the one or more other first patterns.

The control unit 240 may control the first circuit unit 210 so that a first driving signal is applied to one end of the one or more first patterns among the plurality of first patterns 101 and the second circuit unit 220 so that a first inverse driving signal that is an inverse signal of the first driving signal is applied to the other end of the one or more first patterns, thereby allowing the current in the first direction X to flow through the one or more first patterns. Here, the first driving signal may be a pulse waveform signal or a sine waveform signal.

At the same time, the control unit 240 may control the first circuit unit 210 so that the first inverse driving signal is applied to the one end of the one or more other first patterns among the plurality of first patterns 101 and the second circuit unit 220 so that the first driving signal is applied to the other end of the one or more other first patterns, thereby allowing the current in the direction −X opposite to the first direction to flow through the rest first patterns.

The current in the first direction X, which flows through some first patterns, and the current in the direction −X opposite to the first direction, which flows through other first patterns, may form at least one current loop around the stylus pen 10. The formed current loop may generate a magnetic field, and the generated magnetic field may allow a resonance circuit unit disposed in the stylus pen 10 to resonate, thereby driving the stylus pen 10.

Next, as illustrated in FIG. 9, the control unit 240 may control the first circuit unit 210 so that a first driving signal is applied to one ends of some first patterns among the plurality of first patterns 101 and the second circuit unit 220 so that the other ends of the some first patterns are grounded, thereby allowing the current in the first direction X to flow through the some first patterns.

At the same time, the control unit 240 may control the first circuit unit 210 so that the first driving signal is applied to one ends of the rest first patterns among the plurality of first patterns 101 and the second circuit unit 220 so that the other ends of the rest first patterns are grounded, thereby allowing the current in the direction −X opposite to the first direction to flow through the rest first patterns.

The current in the first direction X, which flows through some first patterns, and the current in the direction −X opposite to the first direction, which flows through other first patterns, may form at least one current loop around the stylus pen 10. The formed current loop may generate a magnetic field, and the generated magnetic field may allow a resonance circuit unit disposed in the stylus pen 10 to resonate, thereby driving the stylus pen 10.

The touch controller 200 of the electronic device according to the second embodiment of the present invention may receive a stylus pen signal (hereinafter referred to as a pen signal) emitted from the stylus pen using the plurality of first patterns 101 and the plurality of third patterns 103 and determine a position of the stylus pen based on the received pen signal.

As illustrated in FIG. 10, the pen signal may be sensed by using the plurality of first patterns 101 and the plurality of third patterns 103.

The control unit 240 may control the third circuit unit 230 to receive a pen signal from each of the plurality of third patterns 103. The control unit 240 may determine the position of the stylus pen in the first direction X based on the pen signal received by the third circuit unit 230. Here, the pen signal may be received through the plurality of third patterns 103 because an induction signal induced to the fourth pattern 104 is transmitted to the third pattern 103 disposed adjacent to the fourth pattern 104 through capacitive coupling formed between the third pattern 103 and the fourth pattern 104, which are disposed adjacent to each other.

Also, the control unit 240 may control the first circuit unit 210 so that one ends of the plurality of first patterns 101 are electrically grounded and the second circuit unit 220 receives a pen signal from the other end of each of the plurality of first patterns 101. The control unit 240 may determine the position of the stylus pen in the second direction Y based on the pen signal received by the second circuit unit 220.

In FIG. 10, the first circuit unit 210 allows the one ends of the plurality of first patterns 101 to be electrically grounded, and the second circuit unit 220 receives the pen signal from the other ends of the plurality of first patterns 101, and vice versa.

Figure 11:
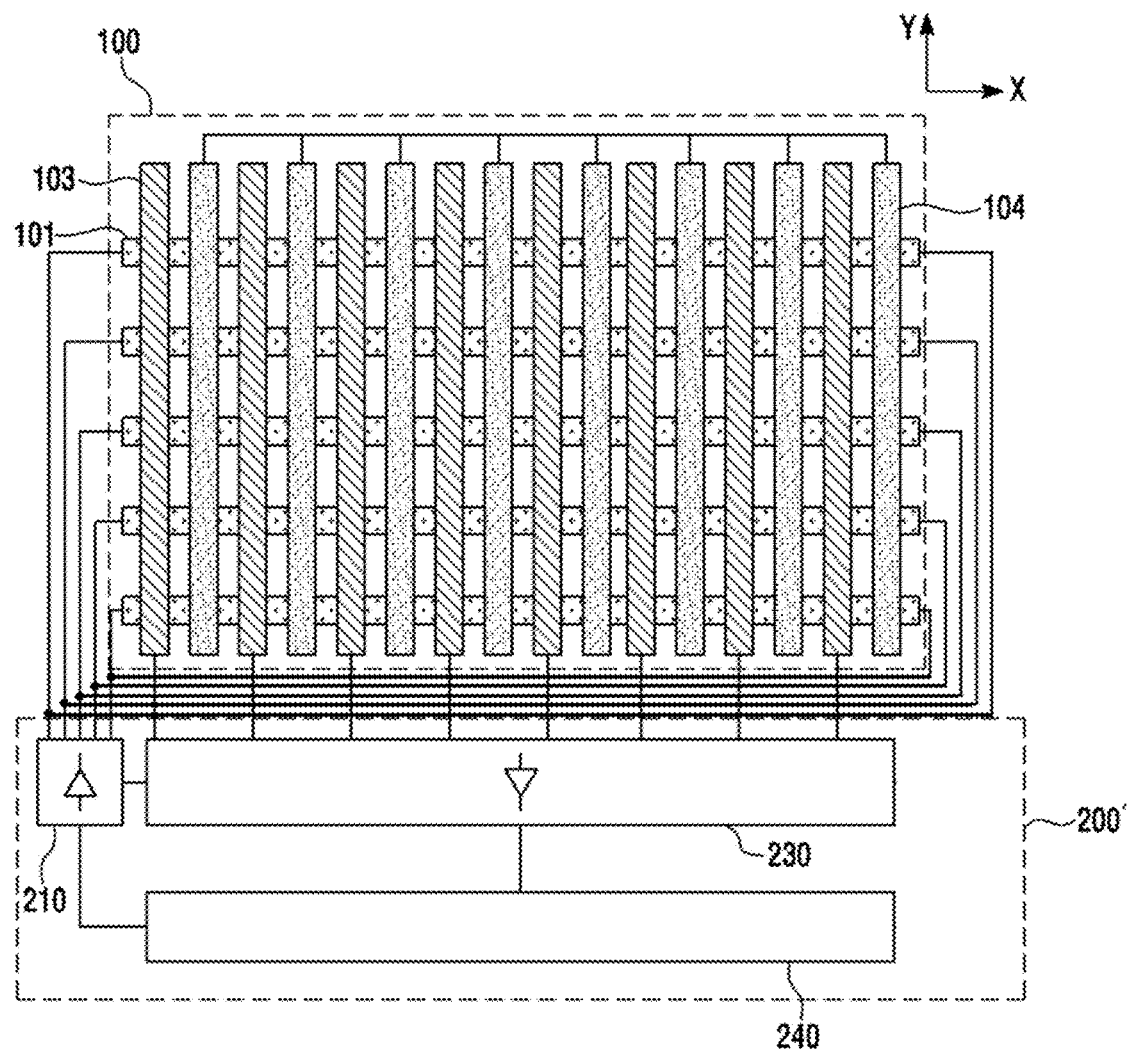
FIG. 11 is a view for explaining a modified example of the sensor unit 100 in FIG. 6.

FIG. 11 is a view for explaining a modified example of the electronic device in FIG. 6.

When compared with the electronic device in FIG. 6, both ends of each of the first patterns 101 of the sensor unit 100 in FIG. 11 are electrically connected to each other through the conductive traces and then connected to a touch controller 200'.

The touch controller 200' may apply a touch driving signal to the plurality of first patterns 101 using one first circuit unit 210 and receive a touch sensing signal from the plurality of third patterns 103 using the third circuit unit 230.

Although not shown in FIG. 11, a multiplexer (not shown) may be disposed between the sensor unit 100 and the touch controller 200'. The multiplexer (not shown) may include a switch that allows both ends of each of the first patterns 101 to be electrically shorted or opened according to a control signal. When the switch is turned on by the control signal, both the ends of each of the first patterns 101 may be electrically shorted as illustrated in FIG. 11, and when the switch is turned off by the control signal, both the ends of each of the first patterns 101 may be electrically opened from each other.

Figure 12A:
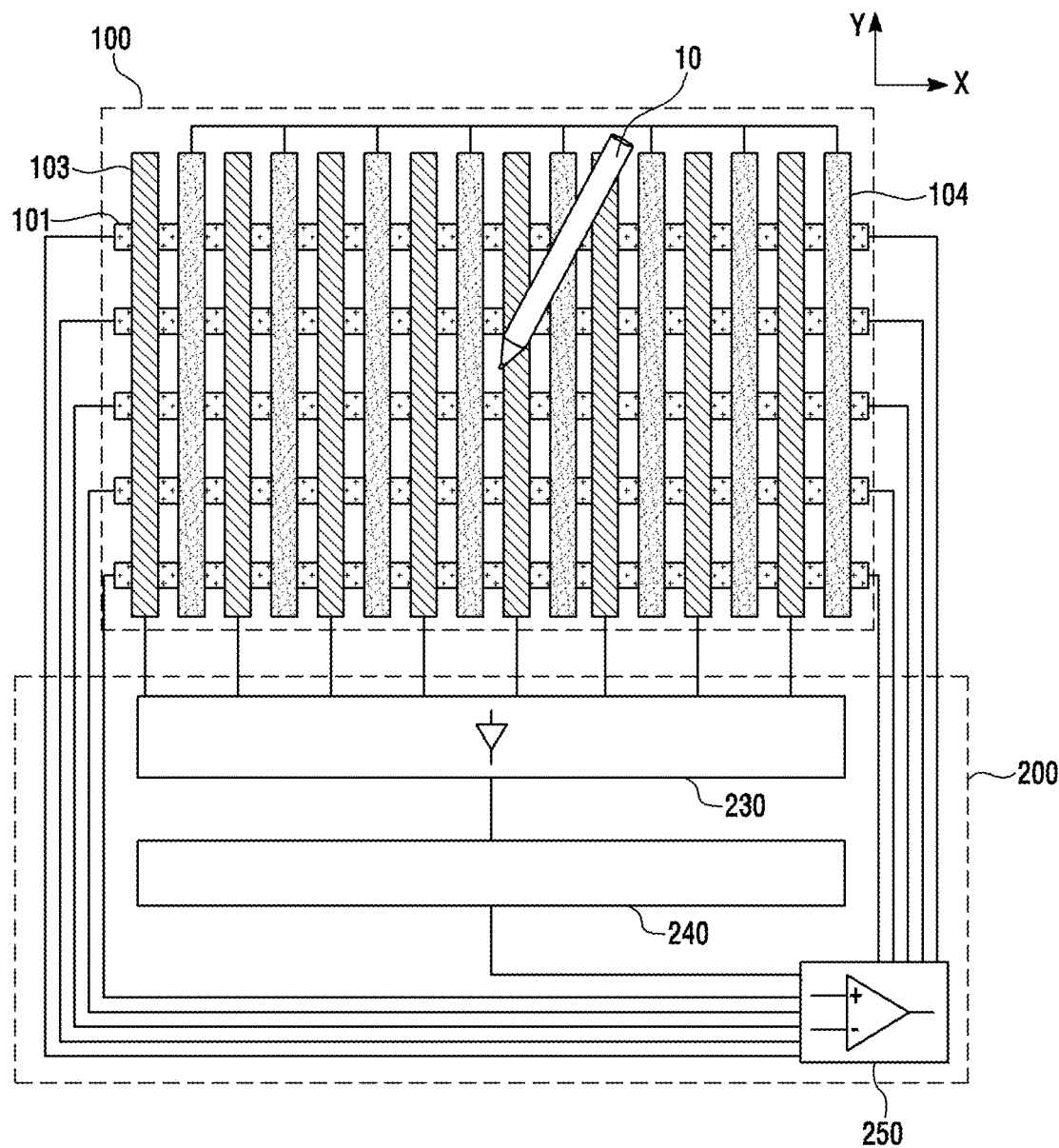
FIG. 12A is a view for explaining a modified example of the touch controller 200 of the electronic device in FIG. 10.

FIG. 12A is a view for explaining a modified example of the touch controller 200 of the electronic device in FIG. 10.

Referring to FIG. 12A, a touch controller 200' includes a third circuit unit 230, a control unit 240, and a differential amplifier unit 250.

The touch controller 200' in FIG. 12A is configured such that the first circuit unit 210 and the second circuit unit 220 in FIG. 10 are replaced with one differential amplifier unit 250.

As illustrated in FIG. 12A, the third circuit unit 230 may receive a stylus pen signal from the plurality of third patterns 103, and the control unit 240 may determine the position of the stylus pen in the first direction X based on a signal detected by the third circuit unit 230.

Also, the differential amplifier unit 250 may receive and differentially amplify the stylus pen signal from both ends of each of the first patterns 101, and the control unit 240 may determine the position of the stylus pen in the second direction Y based on the differential signal output from the differential amplifier unit 250.

Figure 12B:
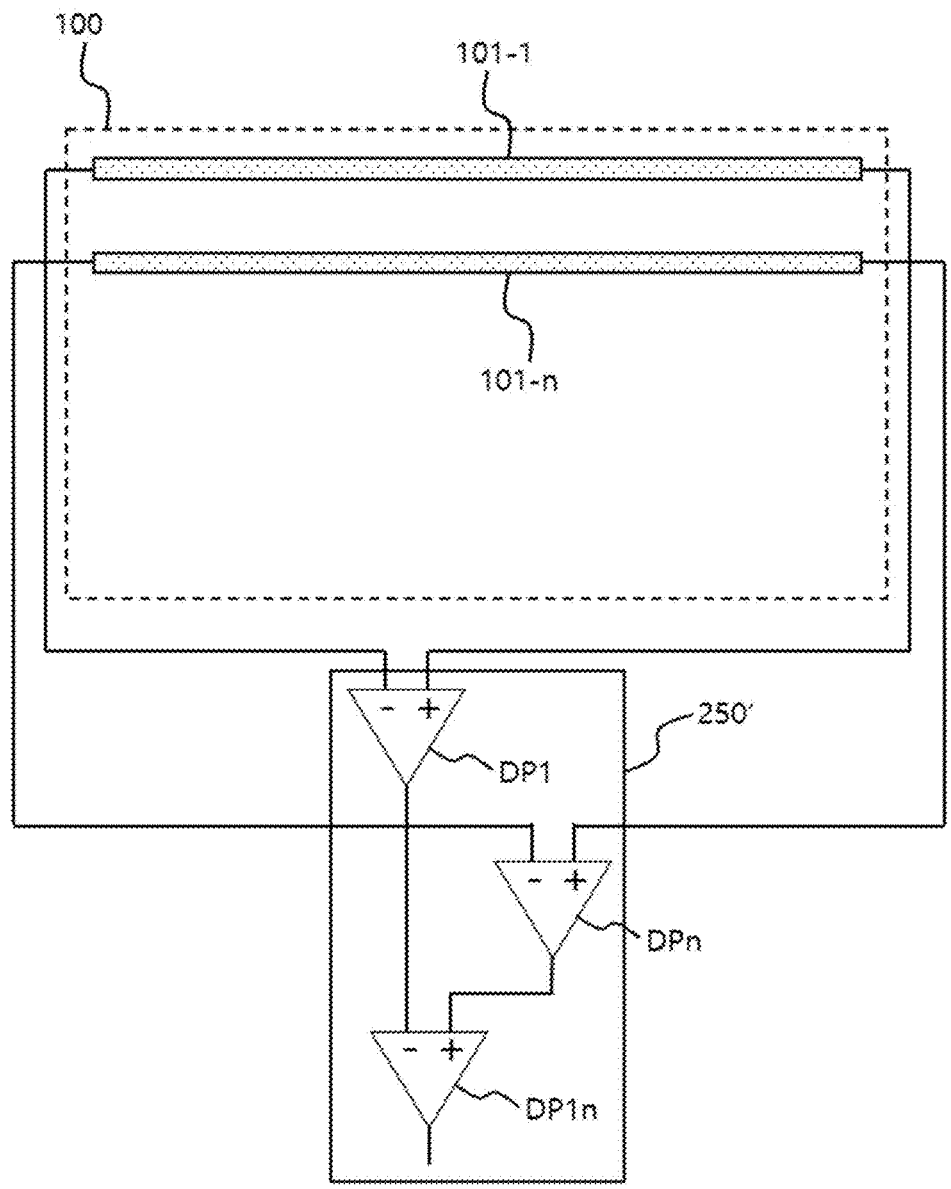
FIG. 12B is a view for explaining a modified example of a differential amplifier unit 250 in FIG. 12A.

FIG. 12B is a view for explaining a modified example of the differential amplifier unit 250 in FIG. 12A.

As illustrated in FIG. 12B, a differential amplification unit 250' may include a plurality of differential amplifiers DP1, DPn, and DP1n. A pair of input terminals of a first differential amplifier DP1 is connected to both ends of one first patterns 101-1, respectively, and a pair of input terminals of a second differential amplifier DPn is connected to both ends of another first pattern 101-n, respectively. A pair of input terminals of the third differential amplifier DP1n is connected to an output terminal of the first differential amplifier DP1 and an output terminal of the second differential amplifier DPn, respectively. The output terminal of the third differential amplifier DP1n is connected to the control unit 240 of FIG. 11A.

Here, the another first pattern 101-n may be disposed directly adjacent to the one first pattern 101-1.

Alternatively, the another first pattern 101-n may be spaced a predetermined distance from the one first pattern 101-1. For example, one or more another first pattern (not shown) may be disposed between the another first pattern 101-n and the one first pattern 101-1.

Figure 13:
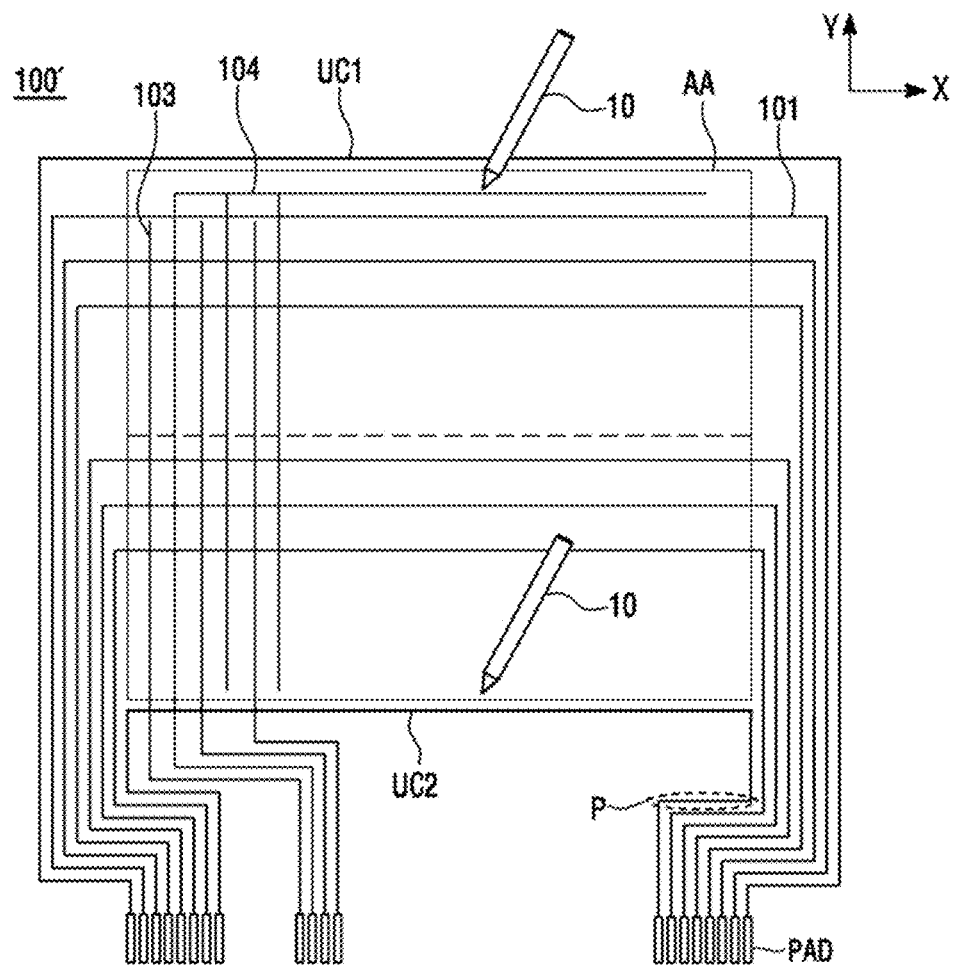
FIG. 13 is a view for explaining a modified example of the sensor unit 100 in FIG. 6.

FIG. 13 is a view for explaining a modified example of the sensor unit 100 in FIG. 6.

A sensor unit 100' in FIG. 13 includes a plurality of first patterns 101, a plurality of third patterns 103, and a plurality of fourth patterns 104 as with the sensor unit 100 in FIG. 6 and further includes uplink channels UC1 and UC2. For reference, the plurality of first patterns 101, the plurality of third patterns 103, and the plurality of fourth patterns 104 are expressed by lines in FIG. 13 unlike those in FIG. 6.

The plurality of first patterns 101, the plurality of third patterns 103, and the plurality of fourth patterns 104 are disposed on an active area AA of a display panel. On the other hand, the uplink channels UC1 and UC2 are disposed on a dead space (or bezel) of the display panel.

Each of the uplink channels UC1 and UC2 may include uplink traces disposed in the first direction X that is the same direction as the plurality of first patterns 101, and a pair of connection traces that connect both ends of the corresponding uplink trace to a pad PAD. Here, the uplink traces and the connection traces may be integrated with each other.

The uplink traces of the first uplink channel UC1 may be disposed on the plurality of first patterns (101), and the uplink traces of the second uplink channel UC2 may be disposed below the plurality of first patterns 101. The plurality of first patterns 101 may be disposed between the uplink traces of the first uplink channel UC1 and the uplink traces of the second uplink channel UC2.

In a case of the sensor unit 100 of FIG. 6, when the stylus pen 10 is brought into proximity or contact with an upper end area or a lower end area of the active area AA, the current loop is hardly formed around the stylus pen 10 because a separate pattern or trace through which a current flows is not provided in the dead space outside the active area AA.

However, in a case of a sensor unit 100' of FIG. 13, since the uplink channels UC1 and UC2 are additionally provided in the dead space, a current loop may be formed around the corresponding stylus pen 10 by allowing a predetermined current to flow through the uplink channels UC1 and UC2 although the stylus pen is brought into proximity or contact with the upper end area or the lower end area of the active area AA.

Figure 14:
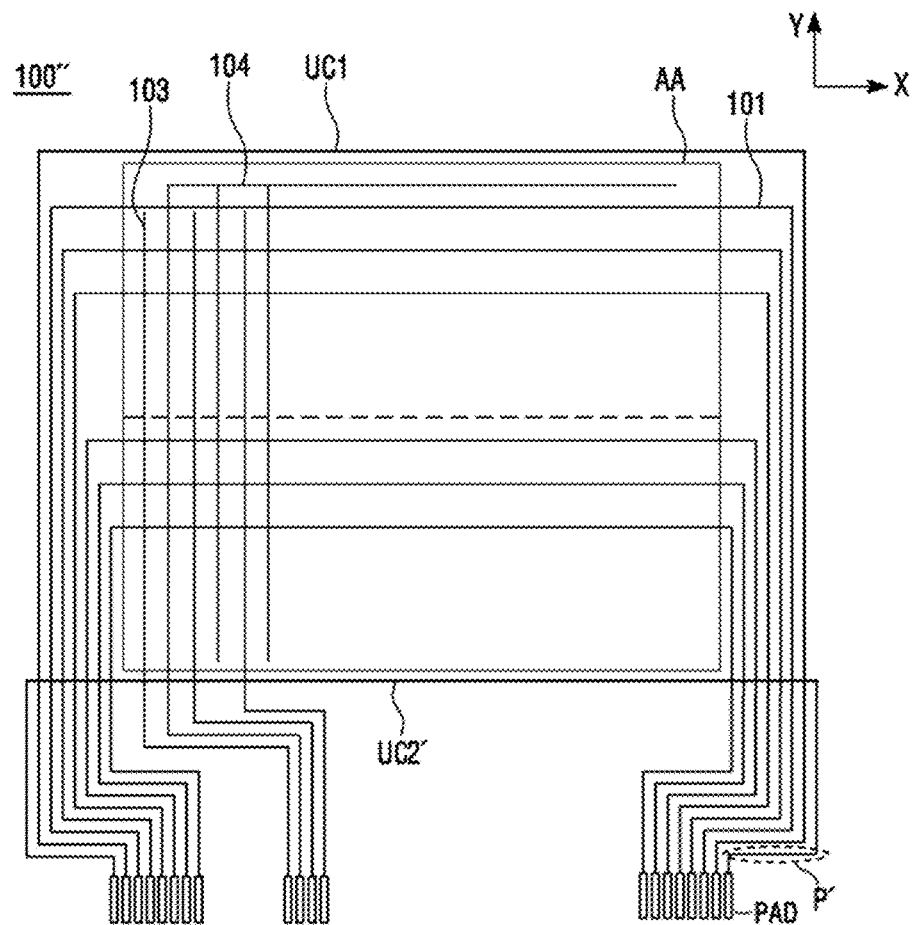
FIG. 14 is a view for explaining a modified example of the sensor unit 100' in FIG. 13.

FIG. 14 is a view for explaining a modified example of the sensor unit 100' in FIG. 13.

A sensor unit 100" in FIG. 14 is the same as the sensor unit 100' in FIG. 13 except for a second uplink channel UC2'.

An uplink trace of the second uplink channel UC2' may be relatively longer than the uplink trace of the second uplink channel UC2 of FIG. 13.

The uplink trace of the second uplink channel UC2' may be relatively longer than an uplink trace of the first uplink channel UC1.

The uplink trace of the second uplink channel UC2' may include some parallel traces P' disposed in parallel to the uplink trace of the second uplink channel UC2'. In this case, the some parallel traces P' may be spaced as far as possible from the connection trace of the second uplink channel UC2'. For example, traces connected to one ends of the plurality of first patterns 101 may be arranged between the uplink trace and the some of the parallel traces P' of second uplink channel UC2'. A reason for this will be described with reference to FIG. 13.

When a predetermined current flows through the second uplink channel UC2 of the sensor unit 100' in FIG. 13, as the current flowing through the uplink trace of the second uplink channel UC2 has a direction opposite to that of a current flowing through some parallel traces P of the second uplink channel UC2, a magnetic field for driving the stylus pen may be partially cancelled.

However, in a case of the sensor unit 100" in FIG. 14, since the uplink trace of the second uplink channel UC2' is spaced relatively farther away from the some parallel traces P', the magnetic field may be minimally cancelled.

Figure 15:
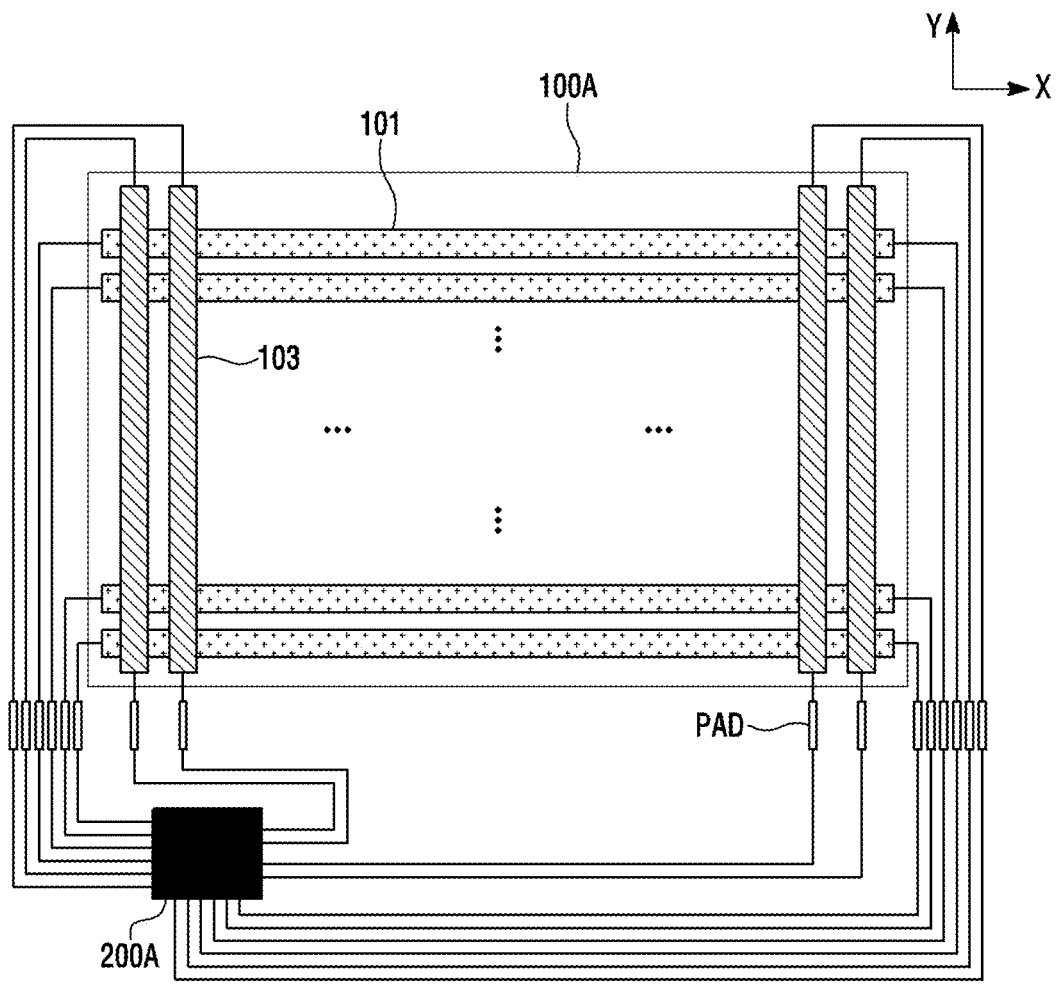
FIG. 15 is a schematic configuration view of an electronic device according to a third embodiment of the present invention.

FIG. 15 is a schematic configuration view of an electronic device according to a third embodiment of the present invention.

Referring to FIG. 15, the electronic device according to the third embodiment includes a sensor unit 100A and a touch controller 200A and further include a plurality of traces that electrically connect the sensor unit 100A and the touch controller 200A.

The sensor unit 100A includes a plurality of first patterns 101 and a plurality of third patterns 103. When compared with the sensor unit 100 in FIG. 6, the sensor unit 100A in FIG. 15 has a difference in that the fourth pattern 104 is omitted, and both ends of the third pattern 103 are electrically connected to the touch controller 200A through the traces. That is, in the sensor unit 100A in FIG. 15, not only the plurality of first patterns 101 but also the plurality of third patterns 103 are directly connected to the touch controller 200A in a double routing method.

The touch controller 200A may include first to third circuit units 210, 220, and 230 and a control unit 240 as same as the touch controller 200 in FIG. 6.

In the electronic device in FIG. 15, as a landscape-type electronic device, the number of third patterns 103 may be greater than that of first patterns 101.

The sensor unit 100A and the touch controller 200A of the electronic device in FIG. 15 may detect a position of an object such as a finger disposed on a display screen, drive the stylus pen brought into proximity or contact with the display screen, and sense a signal emitted from the stylus pen to detect the position of the stylus pen disposed on the display screen.

Specifically, as mentioned in FIG. 7, the touch controller 200A may control the touch driving signal to both ends of the plurality of first patterns 101 and receive the touch sensing signal through the plurality of third patterns 103 to determine the position of the object.

As described above in FIG. 8 or 9, the touch controller 200A may control the current in the first direction X to flow through some first patterns distinguished based on the position of the stylus pen and the current in the direction −X opposite to the first direction through some first patterns, thereby resonating the resonance circuit unit of the stylus pen.

As described in FIG. 10, the touch controller 200A may receive a pen signal emitted from the stylus pen using the plurality of first patterns 101 and the plurality of third patterns 103 and determine a position of the stylus pen based on the received pen signal. Here, since the plurality of fourth patterns 104 are not provided in the sensor unit 100A in FIG. 15, the touch controller 200A may control both ends of the plurality of third patterns 103 as same as both the ends of the plurality of first patterns 101 to receive the pen signal. That is, the sensor unit 100A in FIG. 15 may directly receive the pen signal through the third patterns 103 instead of using the capacitive coupling method described in FIG. 10.

Although not shown in a separate drawing, the uplink channels UC1 and UC2 in FIG. 13 or 14 may be directly applied to the sensor unit 100A in FIG. 15.

Since each of the first patterns 101 of the electronic device in FIG. 15 is connected to the touch controller 200A in the double routing method, when the touch controller 200A is driven in a third mode (or downlink mode) that senses the pen signal in FIG. 10, the touch controller 200A may directly receive the pen signal output through the first patterns 101. Likewise, since each of the third patterns 103 is connected to the touch controller 200A in the double routing method, when the touch controller 200A is driven in the third mode (or downlink mode), the touch controller 200A may directly receive the pen signal output through the third patterns 103.

Figure 16:
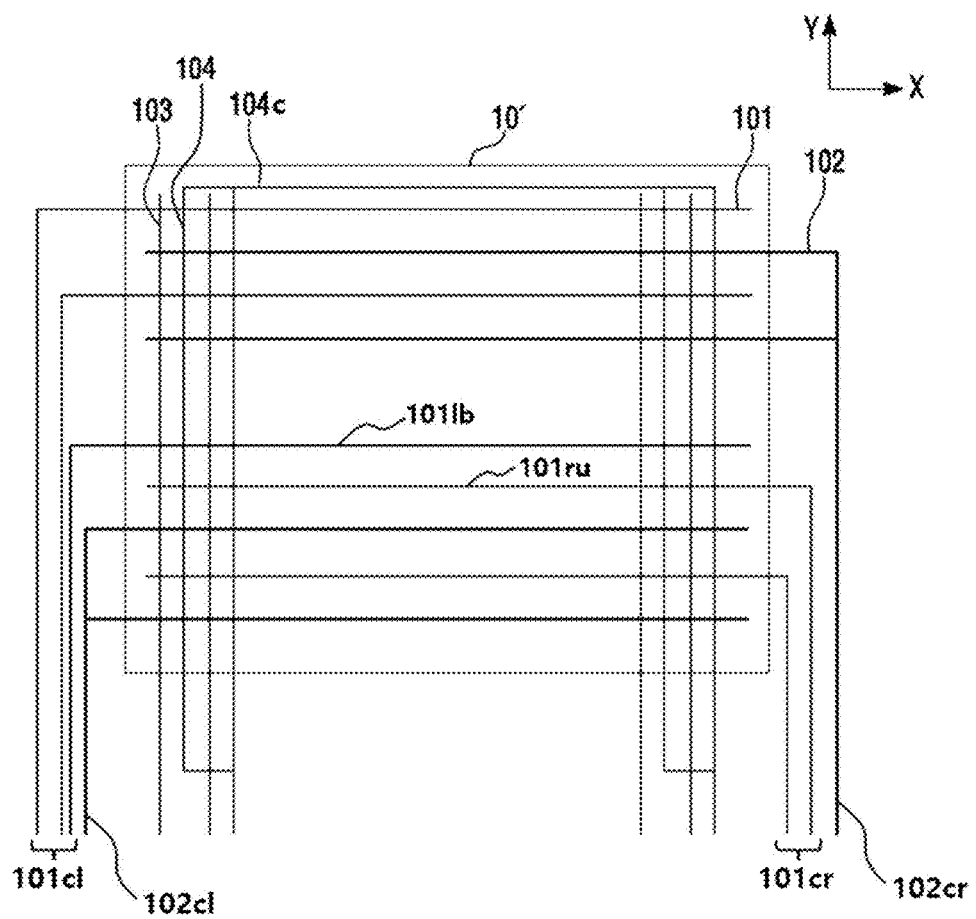
FIG. 16 is a schematic view illustrating a modified example of the sensor unit 10 in FIG. 5.

FIG. 16 is a schematic view illustrating a modified example of the sensor unit 10 in FIG. 5.

As illustrated in FIG. 16, a sensor unit 10' includes first to fourth patterns 101, 102, 103, and 104.

Among the plurality of first patterns 101 of the sensor unit 10' of FIG. 16, one ends (left ends) of a half of the first patterns 101 disposed above based on the second direction Y are connected to a trace 101cl for connection with the touch controller (not shown), and the other end (right end) thereof is floating. Also, the other end (right end) of each of a rest half of the first patterns 101 disposed below based on the second direction Y is connected to a trace 101cr for connection with the touch controller (not shown), and one end (left end) thereof is floating.

Among the plurality of second patterns 102 of the sensor unit 10' of FIG. 16, right ends of a half of the second patterns 102 disposed above the second direction Y are electrically connected to each other through a trace 102cr, and left ends thereof are floating. Also, left ends of a half of the second patterns 102 disposed below the second direction Y are electrically connected to each other through a trace 102cl, and right ends thereof are floating.

Lower ends of the plurality of third patterns 103 of the sensor unit 10' of FIG. 16 are connected to the touch controller (not shown) through a trace, and upper ends thereof are floating.

Upper ends of the plurality of fourth patterns 104 of the sensor unit 10' of FIG. 16 are electrically connected to each other through a trace 104c. Lower ends of the plurality of fourth patterns 104 may be connected in parallel in pairs and connected to the touch controller (not shown). This is different from the sensor unit 10 of FIG. 5.

The touch controller (not shown) may operate the plurality of first patterns 101 and the plurality of third patterns 103 in a first mode (touch sensing mode) to sense an object such as a finger.

The touch controller (not shown) may operate the plurality of fourth patterns 104 in a second mode (uplink mode) for driving the stylus pen.

The touch controller (not shown) may operate the plurality of first patterns 101 and the plurality of third patterns 103 in a third mode (downlink mode) for sensing the stylus pen. In this case, the pen signal output from the plurality of first patterns 101 may be transmitted from the plurality of second patterns 102 by capacitive coupling, and the pen signal output from the plurality of third patterns 103 may be transmitted from the plurality of fourth patterns 104 by capacitive coupling.

When compared with the sensor unit 10 in FIG. 5, the sensor unit 10' in FIG. 16 has an advantage of reducing the number of channels (or pins) of the touch controller (not shown). This is caused by parallel connection of the lower ends of the plurality of fourth patterns 104 in pairs. For example, when the number of each of the first patterns 101 and the second patterns 102 is 35, and the number of each of the third patterns 103 and the fourth patterns 104 is 42, the touch controller (not shown) requires 35 pins connected to 35 first patterns 101, 42 pins connected to 42 third patterns 103, and 21 (=42*½) pins connected to 42 fourth patterns 104. As a result, the touch controller (not shown) requires 98 pins. On the contrary, the sensor unit 10 of FIG. 5 requires additional 21 pins for the fourth patterns 104 because the lower ends of the fourth patterns 104 are not connected in pairs in parallel.

Since the number of channels of the touch controller (not shown) may be reduced by using the sensor unit 10' in FIG. 16, there is an advantage of reducing a size or a manufacturing cost of the touch controller (not shown).

Also, in the sensor unit 10' in FIG. 16, the left ends of some first patterns 101 disposed above based on the second direction Y among the plurality of first patterns 101 are connected to the touch controller (not shown), and the right ends of the rest first patterns disposed below based on the second direction Y are connected to the touch controller (not shown). This arrangement configuration may reduce the number of traces disposed on both bezel areas of the display panel.

On the other hand, in the sensor unit 10' in FIG. 16, since a first pattern 101*lb* disposed lowermost among the some first patterns 101 having the left ends connected to the touch controller (not shown) and a first pattern 101*ru* disposed uppermost among the rest first patterns having the right ends connected to the touch controller (not shown) are connected to the trace in opposite directions, signal distortion occurs when the touch controller (not shown) differentiates a signal output from the lowermost first pattern 101*lb* and a signal output from the uppermost first pattern 101*ru*. This distortion is referred to as 'half-half distortion'. The half-half distortion may cause an unintended ghost touch.

Figure 17:
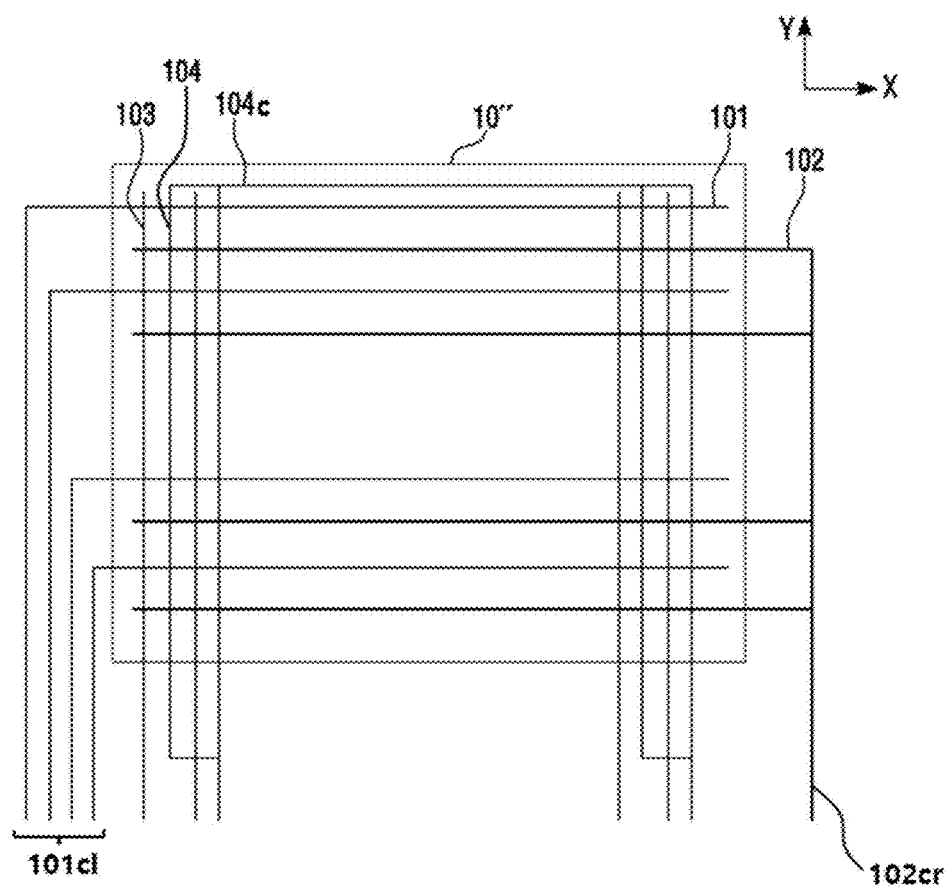
FIG. 17 is a schematic view illustrating a modified example of the sensor unit 10' in FIG. 16.

FIG. 17 is a schematic view illustrating a modified example of the sensor unit 10' in FIG. 16.

As illustrated in FIG. 17, a sensor unit 10" includes first to fourth patterns 101, 102, 103, and 104.

When compared with the sensor unit 10" in FIG. 16, the sensor unit 10" in FIG. 17 has a difference in that all left ends of the plurality of first patterns 101 are connected to the touch controller (not shown) through s trace 101*cl*, and all right ends of the plurality of second patterns 102 are electrically connected to each other through a trace 102*cr*. The difference has an advantage in that the touch controller (not shown) does not produce the above-described half-half distortion although signals output through the plurality of first patterns 101 of the sensor unit 10" in FIG. 17 are differentiated.

The touch controller (not shown) may operate the plurality of first patterns 101 and the plurality of third patterns 103 in a first mode (touch sensing mode) for sensing an object such as a finger.

The touch controller (not shown) may operate the plurality of fourth patterns 104 in a second mode (uplink mode) for driving the stylus pen.

The touch controller (not shown) may operate the plurality of first patterns 101 and the plurality of third patterns 103 in a third mode (downlink mode) for sensing the stylus pen. In this case, the pen signal output from the plurality of first patterns 101 may be transmitted from the plurality of second patterns 102 by capacitive coupling, and the pen signal output from the plurality of third patterns 103 may be transmitted from the plurality of fourth patterns 104 by capacitive coupling.

The number of channels of the touch controller (not shown) for the sensor unit 10" in FIG. 17 is equal to that of channels of the touch controller (not shown) for the sensor unit 10' in FIG. 16.

However, since all left ends of the plurality of first patterns 101 of the sensor unit 10" in FIG. 17 are connected to the touch controller (not shown) through traces 101*cl*, the number of traces 101*cl* disposed on a left bezel area may relatively increase to cause increase in thickness of the bezel. Also, since resistance relatively increases by the traces 101*cl*, a touch bandwidth may be narrowed.

Figure 18:
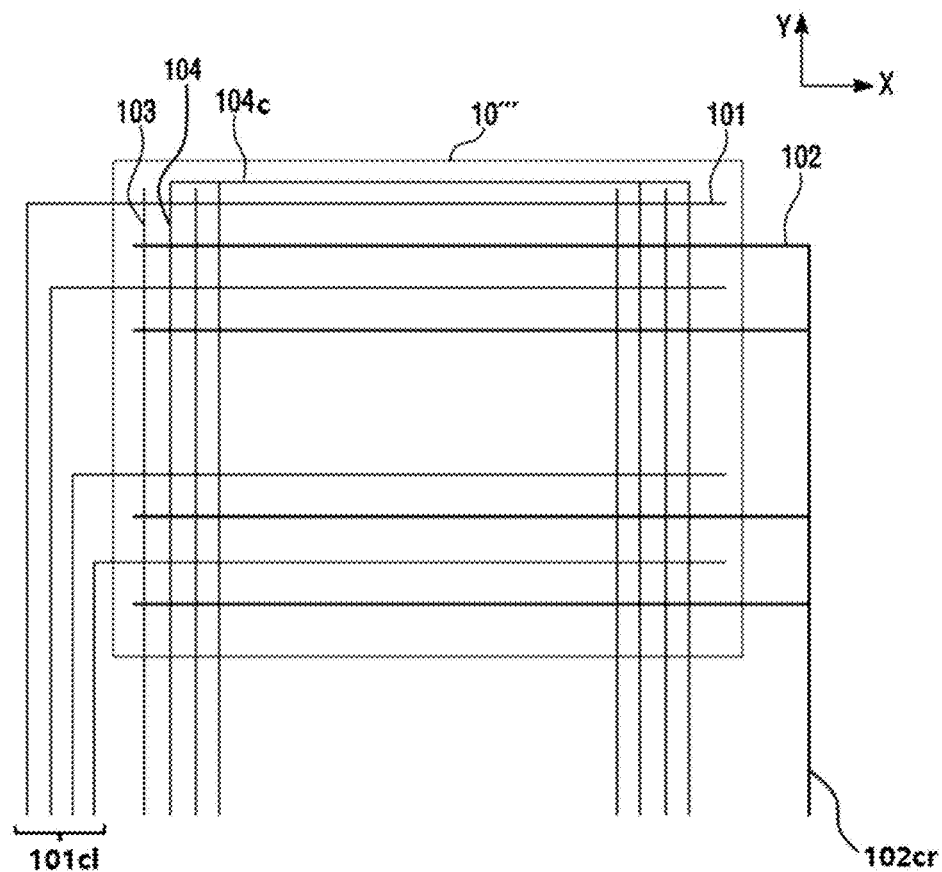
FIG. 18 is a schematic view illustrating a modified example of the sensor unit 10" in FIG. 17.

FIG. 18 is a schematic view illustrating a modified example of the sensor unit 10" in FIG. 17.

As illustrated in FIG. 18, a sensor unit 10''' includes first to fourth patterns 101, 102, 103, and 104.

When compared with the sensor unit 10" in FIG. 17, the sensor unit 10''' in FIG. 18 has a difference in that lower ends of the plurality of fourth patterns 104 are individually connected to the touch controller (not shown) instead of being connected in pairs in parallel.

The sensor unit 10''' in FIG. 18 may directly use the plurality of fourth patterns 104 to sense the pen signal emitted from the stylus pen.

As with the sensor unit 10" in FIG. 17, the sensor unit 10''' in FIG. 18 has traces 101*cl* connected to left ends of the plurality of first patterns 101, the half-half distortion does not occur.

Also, since the sensor unit 10''' in FIG. 18 may directly use the plurality of fourth patterns 104 to detect the pen signal emitted from the stylus pen, the sensor unit 10''' does not use capacitive coupling Cc between the third patterns 103 and the fourth patterns 104, which are adjacent to each other. Thus, a capacitance value of the sensor unit 10''' may be reduced to allow the touch bandwidth to be relatively expanded further than the sensor unit 10" in FIG. 17.

Also, the number of channels of the touch controller (not shown) for the sensor unit 10''' in FIG. 18 is greater than that of channels of the touch controller (not shown) for the sensor unit 10" in FIG. 17. This is because each of the plurality of fourth patterns 104 is connected to the touch controller (not shown).

Figure 19:
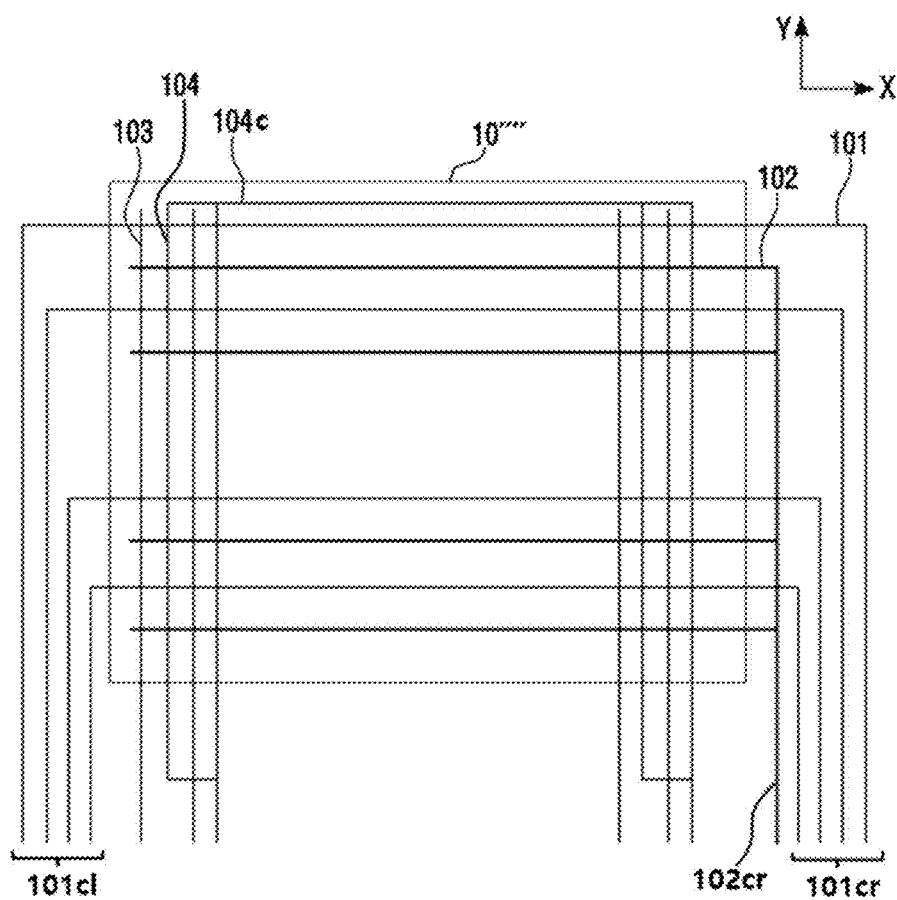
FIG. 19 is a schematic view illustrating another modified example of the sensor unit 10" in FIG. 17.

FIG. 19 is a schematic view illustrating another modified example of the sensor unit 10" in FIG. 17.

As illustrated in FIG. 19, a sensor unit 10'''' includes first to fourth patterns 101, 102, 103, and 104.

When compared with the sensor unit (10") shown in FIG. 17, the sensor unit 10'''' in FIG. 19 has a difference in terms of double routing method by which not only the left ends but also the right ends of the plurality of first patterns 101 are electrically connected to the touch controller (not shown) through the traces 101*cl* and 101*cr*. The difference has an advantage of expanding the touch bandwidth further than the sensor unit 10" in FIG. 17.

Also, like the sensor unit 10" in FIG. 17, the half-half distortion does not occur in the sensor unit 10'''' of FIG. 19.

On the other hand, the number of channels (or pins) of the touch controller (not shown) for the sensor unit 10'''' in FIG. 19 is greater than that for the sensor unit 10" in FIG. 17. This is because the plurality of first patterns 101 are connected to the touch controller (not shown) in the double routing method.

Figure 20:
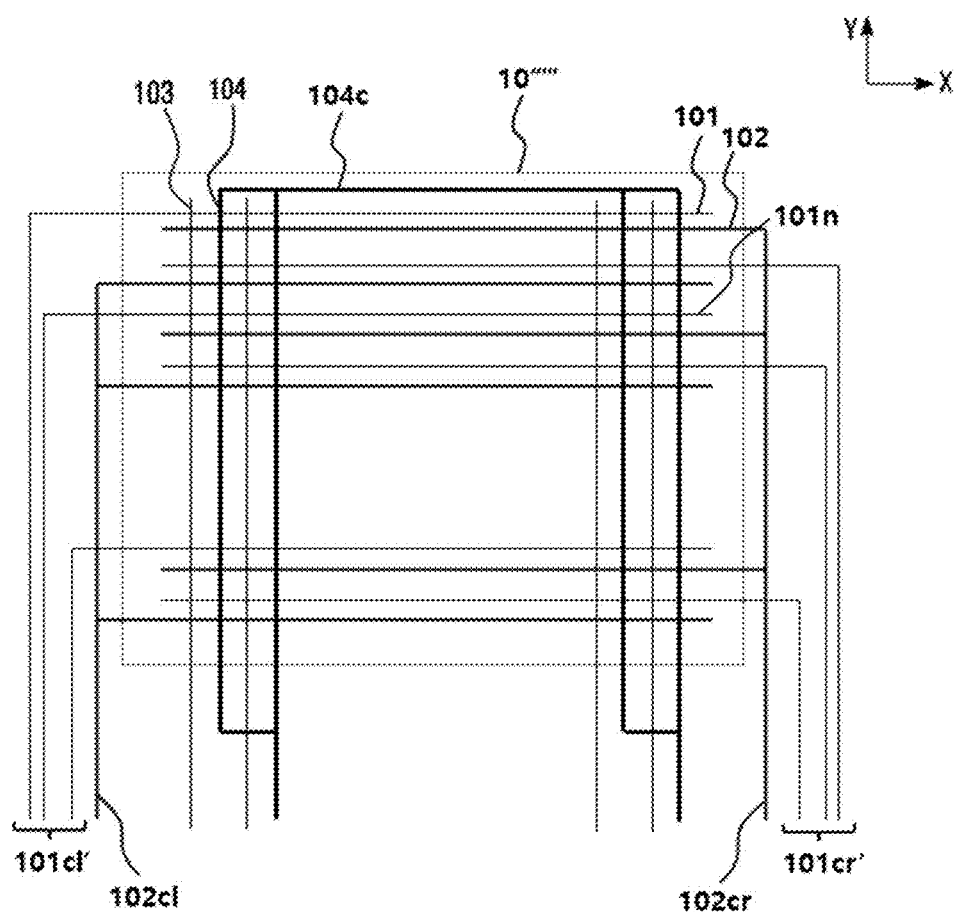
FIG. 20 is a schematic view illustrating another modified example of the sensor unit 10' in FIG. 16.

FIG. 20 is a schematic view illustrating a modified example of the sensor unit 10' in FIG. 16.

As illustrated in FIG. 20, a sensor unit 10'''' includes first to fourth patterns 101, 102, 103, and 104.

When compared with the sensor unit 10' in FIG. 16, the sensor unit 10'''' in FIG. 20 has a difference in the plurality of first patterns 101 and the plurality of second patterns 102.

The plurality of first patterns 101 include some first patterns connected to one side trace 101cl' for connection with the touch controller (not shown) and other first patterns connected to the other side trace 101cr'. The some first patterns and the other first patterns are arranged alternately along the second direction Y.

Also, the plurality of second patterns 102 include some second patterns connected to one side trace 102cl for connection with the touch controller (not shown) and other some second patterns connected to the other side trace 102cr'. The some second patterns and the other some second patterns are arranged alternately along the second direction Y.

When a left end of both ends of one of the plurality of first patterns 101 is connected to the trace 101cl', a right end of both the ends of one of the plurality of second patterns 102, which is adjacent to the first pattern 101, may be connected to the trace 102cr.

Since the traces 101cl' and 101cr' that connect the plurality of first patterns 101 and the touch controller (not shown) of the sensor unit 10'''' in FIG. 20 are arranged alternately, i.e., once at a left side and then at a right side, along the second direction Y, the number of traces arranged at the left side and the number of traces arranged at the right side may be the same as or similar to each other to maintain uniformity.

The touch controller (not shown) may sense (first mode) a touch of an object such as a finger, drive (second mode) the stylus pen, and sense (third mode) the pen signal from the stylus pen by using the sensor unit 10'''' in FIG. 20. Specifically, a method by which the touch controller (not shown) operates the sensor unit 10'''' for each mode will be described with reference to <Table 1> below.

TABLE 1

|  | 101 | 103 | 102 | 104 |
|---|---|---|---|---|
| Touch | Driving<br>Receiving | Receiving<br>Driving |  |  |
| Stylus | Receiving<br>Receiving | Receiving |  Driving | Driving/Receiving |

Referring to FIG. 20 together with <Table 1>, the touch controller (not shown) may operate the sensor unit 10'''' in the first mode (Touch).

As an example of the first mode (Touch), the touch controller (not shown) may apply a touch driving signal to at least one of the plurality of first patterns 101 of the sensor unit 10'''' and receive a touch sensing signal from plurality of third patterns 103. Here, the touch controller (not shown) may differentiate the touch sensing signals received from the plurality of third patterns 103.

As another example of the first mode (Touch), the touch controller (not shown) may apply a touch driving signal to at least one of the plurality of third patterns 103 of the sensor unit 10'''' and receive a touch sensing signal from plurality of first patterns 101. Here, the touch controller (not shown) may differentiate the touch sensing signal received from the plurality of first patterns 101. When the touch sensing signal is differentiated, the touch controller (not shown) may differentiate the touch sensing signal output from a n-th first pattern 101 and a n+2-th first pattern 101n in an order from the top of the plurality of first patterns 101 to prevent the above-described 'half-half distortion' from occurring.

The touch controller (not shown) may operate the sensor unit 10'' in a second mode (Stylus/Driving). For example, the touch controller (not shown) may apply a pen driving signal to at least one of the plurality of fourth patterns 104 of the sensor unit 10''''.

The touch controller (not shown) may operate the sensor unit 10'''' in the third mode (Stylus/Receiving).

As an example of the third mode (Stylus/Receiving), the touch controller (not shown) may receive a pen sensing signal from plurality of first patterns 101 and the plurality of third patterns 103 of the sensor unit 10''''. The pen sensing signal output from each of the first patterns 101 is transmitted from the second pattern 102 adjacent to the corresponding first pattern 101 through capacitive coupling. Also, the pen sensing signal output from each of the third patterns 103 is transmitted from the fourth pattern 104 adjacent to the corresponding third pattern 103 through capacitive coupling Here, the touch controller (not shown) may differentiate the pen sensing signals received from the plurality of first patterns 101 (or the plurality of third patterns 103). When the touch controller (not shown) differentiates the pen sensing signals, the touch controller (not shown) may differentiate the pen sensing signals output from the n-th first pattern 101 and the n+2-th first pattern 101n in an order from the top of the plurality of first patterns 101 to prevent the above-described 'half-half distortion' from occurring.

As another example of the third mode (Stylus/Receive), the touch controller (not shown) may receive the pen sensing signal from the plurality of first patterns 101 and the plurality of fourth patterns 104 of the sensor unit 10''''. The pen sensing signal output from each of the first patterns 101 is transmitted from the second pattern 102 adjacent to the corresponding first pattern 101 through capacitive coupling. The pen sensing signal output from the plurality of fourth patterns 104, which is a signal directly induced to a pen signal from an external stylus pen, is not transmitted through capacitive coupling. Here, the touch controller (not shown) may differentiate the pen sensing signals received from the plurality of first patterns 101 (or plurality of fourth patterns 104). When the touch controller (not shown) differentiates the pen sensing signals, the touch controller (not shown) may differentiate the pen sensing signals output from the n-th first pattern 101 and the n+2-th first pattern 101n in an order from the top of the plurality of first patterns 101 to prevent the above-described 'half-half distortion' from occurring.

Although not shown in a separate drawing, when one ends of the plurality of second patterns 102 of the sensor unit 10'''' in FIG. 20, which are electrically floating, are electrically connected to the touch controller (not shown), the touch controller (not shown) may operate the sensor unit in a third mode (Stylus/Receiving). When operated in the third mode, the touch controller (not shown) may receive the pen sensing signal from the plurality of second patterns 102 and the plurality of third patterns 103 of the sensor unit 10'''' or receive the pen sensing signal from the plurality of second patterns 102 and the plurality of fourth patterns 104.

Figure 21:
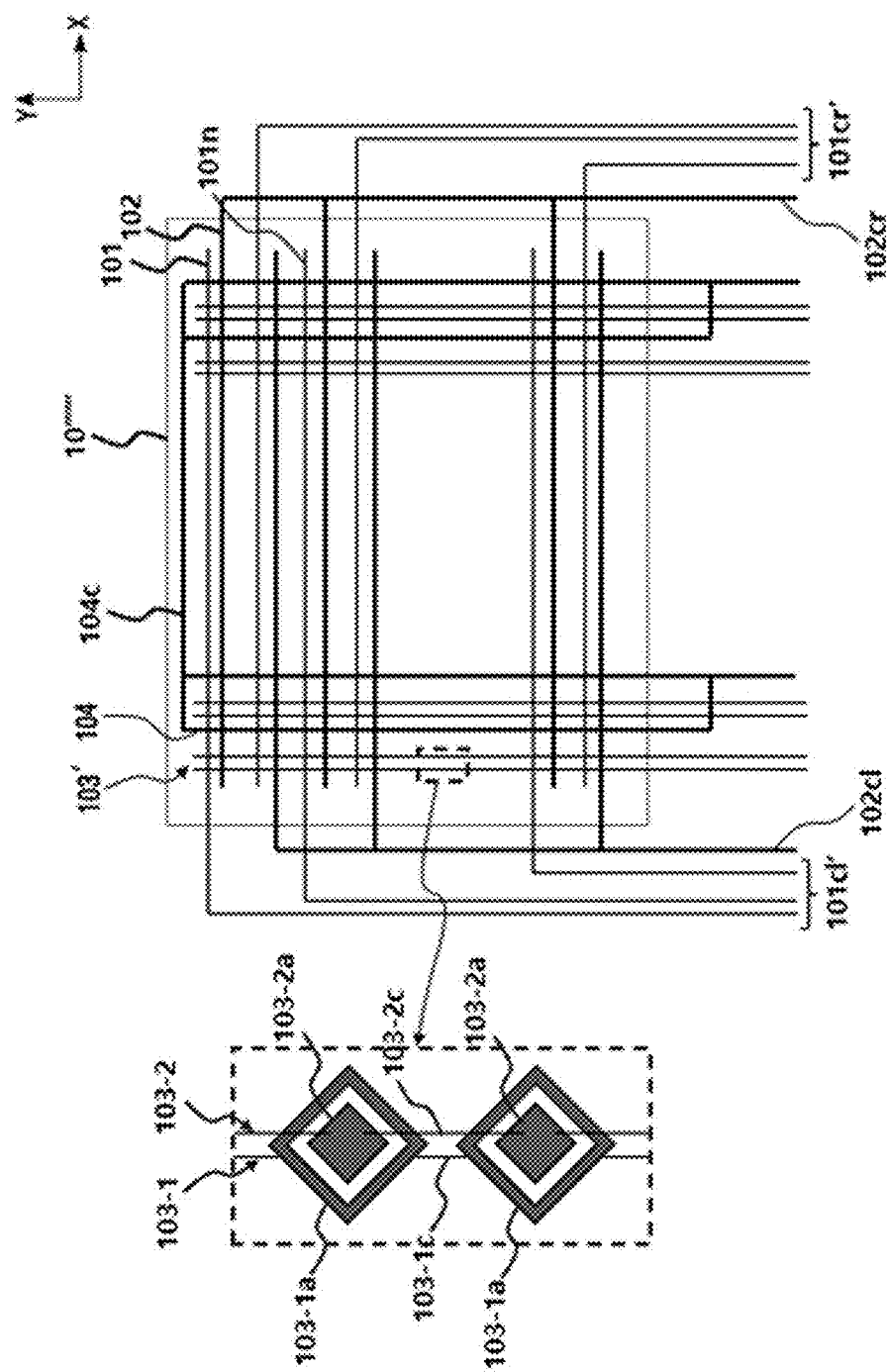
FIG. 21 is a schematic view illustrating a modified example of the sensor unit 10" in FIG. 20.

FIG. 21 is a schematic view illustrating a modified example of the sensor unit 10'''' in FIG. 20.

As illustrated in FIG. 21, a sensor unit 10''''' includes first to fourth patterns 101, 102, 103', and 104.

The sensor unit 10''''' in FIG. 21 has a difference from the sensor unit 10'''' in FIG. 20 in terms of a plurality of third patterns 103'.

Each of the plurality of third patterns 103' includes a third-1 pattern 103-1 and a third-2 pattern 103-2, which are adjacent to each other.

The third-1 pattern 103-1 includes a plurality of main patterns 103-1a arranged in the second direction Y and connection patterns 103-1c that connect two adjacent main patterns 103-1a among the plurality of main patterns 103-1a. Each of the main patterns 103-1a of the third-1 pattern 103-1 may have a rectangular shape, a rhombus shape, or a diamond shape and have an opening in which each of the main patterns 103-2a of the third-2 pattern 103-2 is disposed.

The third-2 pattern 103-2 includes a plurality of main patterns 103-2a arranged in the second direction Y and connection patterns 103-2c that connect two adjacent main patterns 103-2a among the plurality of main patterns 103-2a. Each of the main patterns 103-2a of the third-2 pattern 103-2 may have a rectangular shape, a rhombus shape, or a diamond shape. Each of the main patterns 103-2a of the third-2 pattern 103-2 may have a shape corresponding to that of each of the main patterns 103-1a of the third-1 pattern 103-1.

Each of the main patterns 103-1a of the third-1 pattern 103-1 is disposed relatively closer to the first pattern 101 than each of the main patterns 103-2a of the third-2 pattern 103-2.

Each of the plurality of third patterns 103' includes the third-1 pattern 103-1 and the third-2 pattern 103-2, and each of the third-1 pattern 103-1 and the third-2 pattern 103-2 is connected to the touch controller (not shown). Thus, although the number of pins for the plurality of third patterns (103') in the touch controller (not shown) increases by two times when compared with the sensor unit 10'''' in FIG. 20, in the first mode (touch driving mode), the touch controller (not shown) may apply the touch driving signal to the plurality of first patterns 101 and differentiate two touch sensing signals output from the third-1 pattern 103-1 and the third-2 pattern 103-2, respectively, to cancel a display noise and a low ground mass (LGM) caused by a poor ground of an object, which act on the sensor unit 10'''', thereby improving sensing sensitivity.

Figure 22:
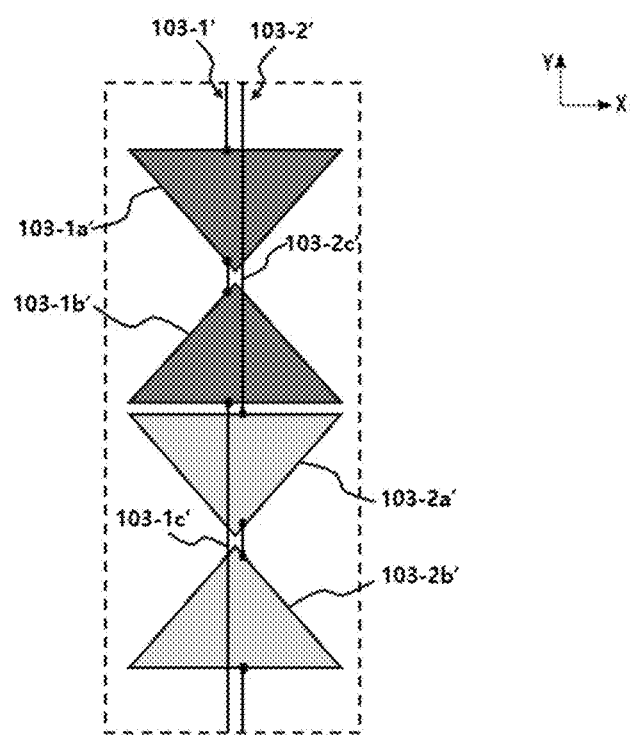
FIG. 22 is a view for explaining a modified example of a third-1 pattern 103-1 and a third-2 pattern 103-2 in FIG. 21.

FIG. 22 is a view for explaining a modified example of the third-1 pattern 103-1 and the third-2 pattern 103-2 in FIG. 21.

Referring to FIG. 22, a third-1 pattern 103-1' includes a plurality of main patterns 103-1a' and 103-1b' arranged in the second direction Y and connection patterns 103-1c' that connect two adjacent main patterns 103-1a' and 103-1b' among the plurality of main patterns 103-1a' and 103-1b'. Each of main patterns 103-1a' and 103-1b' of the third-1 pattern 103-1' may include a first main pattern 103-1a' and a second main pattern 103-1b'. The first main pattern 103-1a' and the second main pattern 103-1b' may have shapes that are symmetric to each other in the first direction X. For example, each of the first main pattern 103-1a' and the second main pattern 103-1b' may have an inverted triangular shape. The first main pattern 103-1a' and the second main pattern 103-1b' may be electrically connected to each other.

The third-2 pattern 103-2' includes a plurality of main patterns 103-2a' and 103-2b' arranged in the second direction Y and connection patterns 103-2c' that connect two adjacent main patterns 103-2a' and 103-2b' among the plurality of main patterns 103-2a' and 103-2b'. Each of the main patterns 103-2a' and 103-2b' of the third-2 pattern 103-2' may include a first main pattern 103-2a' and a second main pattern 103-2b'. The first main pattern 103-2a' and the second main pattern 103-2b' may have shapes that are symmetric to each other in the first direction X. For example, each of the first main pattern 103-2a' and the second main pattern 103-2b' may have an inverted triangular shape. The first main pattern 103-2a' and the second main pattern 103-2b' may be electrically connected to each other.

The plurality of main patterns 103-1a' and 103-1b' of the third-1 pattern 103-1' and the plurality of main patterns 103-2a' and 103-2b' of the third-2 pattern 103-2' are arranged alternately in the second direction Y.

Figure 23:
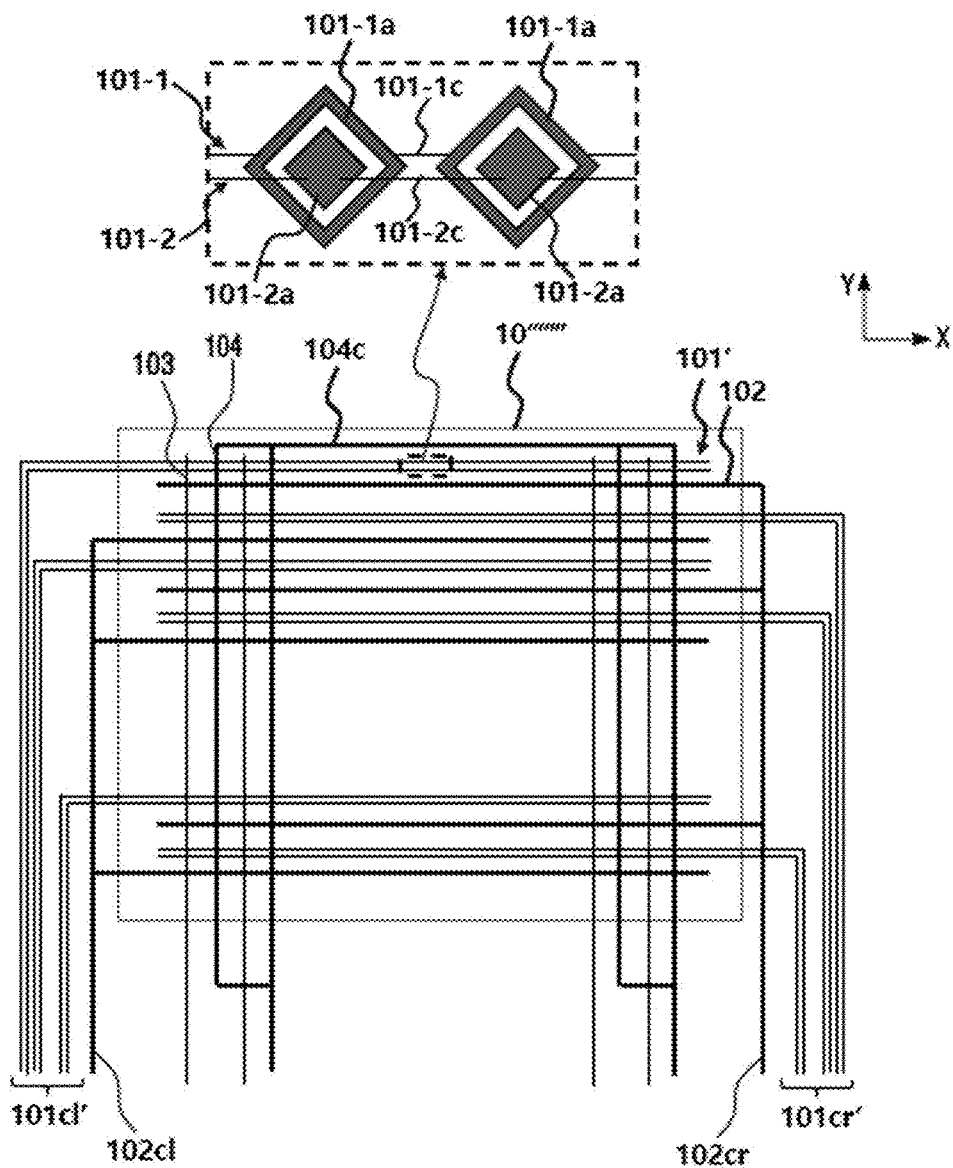
FIG. 23 is a schematic view illustrating another modified example of the sensor unit 10''' in FIG. 20.

FIG. 23 is a schematic view illustrating another modified example of the sensor unit 10'''' in FIG. 20.

As illustrated in FIG. 23, a sensor unit 10''''' includes first to fourth patterns 101', 102, 103, and 104.

The sensor unit 10''''' of FIG. 23 has a difference from the sensor unit 10'''' of FIG. 20 in terms of a plurality of first patterns 101'.

Each of the plurality of first patterns 101' includes a first-1 pattern 101-1 and a first-2 pattern 101-2.

The first-1 pattern 101-1 includes a plurality of main patterns 101-1a arranged in the first direction X and connection patterns 101-1c that connect two adjacent main patterns 101-1a among the plurality of main patterns 101-1a. Each of the main patterns 101-1a of the first-1 pattern 101-1 may have a rectangular shape, a rhombus shape, or a diamond shape and have an opening in which each of the main patterns 101-2a of the first-2 pattern 101-2 is disposed.

The first-2 pattern 101-2 includes a plurality of main patterns 101-2a arranged in the first direction X and connection patterns 101-2c that connect two adjacent main patterns 101-2a among the plurality of main patterns 101-2a. Each of the main patterns 101-2a of the first-2 pattern 101-2 may have a rectangular shape, a rhombus shape, or a diamond shape. Each of the main patterns 101-2a of the first-2 pattern 101-2 may have a shape corresponding to that of each of the main patterns 101-1a of the first-1 pattern 101-1.

Each of the main patterns 101-1a of the first-1 pattern 101-1 is disposed relatively closer to the third pattern 103 than each of the main patterns 101-2a of the first-2 pattern 101-2.

Each of the plurality of third patterns 101' includes the first-1 pattern 101-1 and the first-2 pattern 101-2, and each of the first-1 pattern 101-1 and the first-2 pattern 101-2 is connected to the touch controller (not shown). Thus, although the number of pins for the plurality of first patterns 101' in the touch controller (not shown) increases by two times when compared with the sensor unit 10'''' in FIG. 20, in the first mode (touch driving mode), the touch controller (not shown) may apply the touch driving signal to the first-1 pattern 101-1 and simultaneously apply a touch driving signal obtained by inverting a phase of the touch driving signal by 180° to the first-2 pattern 101-2 to reduce or remove a flicker occurring on the display panel including the sensor unit 10'''''. The flicker represents a feature in which flickering occurs on the display panel that is influenced when the touch driving signals applied simultaneously to at least two first patterns of the plurality of first patterns 101 of FIG. 20 are added. Since the touch driving signals having opposite phases are applied simultaneously to each of the first patterns 101' of the sensor unit 10''''' of FIG. 23, even when the two touch driving signals are added together, a sum thereof is '0', which does not give an effect on the display panel. Thus, the flicker phenomenon does not occur.

Although not shown in a separate drawing, the first-1 pattern 101-1 and the first-2 pattern 101-2 of each of the first patterns 101' may have the pattern shape illustrated in FIG. 22.

Figure 24:
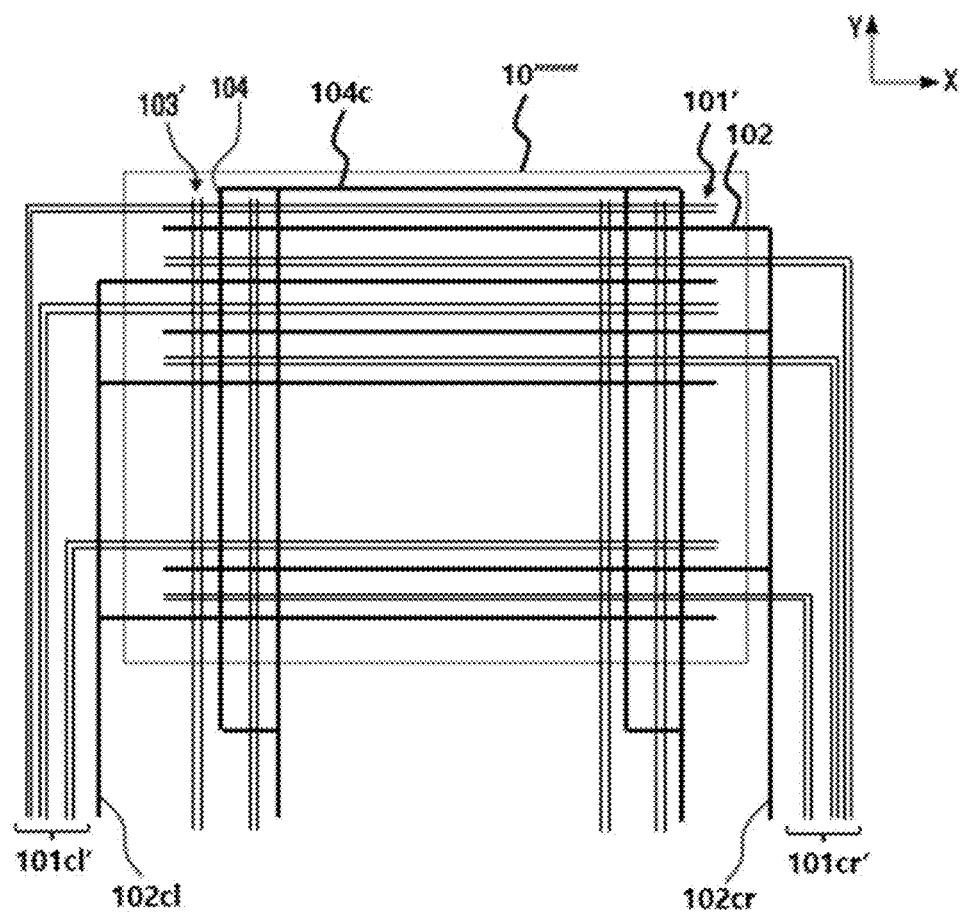
FIG. 24 is a schematic view illustrating another modified example of the sensor unit 10'''' in FIG. 20.

FIG. 24 is a schematic view illustrating another modified example of the sensor unit 10'''' in FIG. 20.

As illustrated in FIG. 24, a sensor unit 10'''''' includes first to fourth patterns 101', 102, 103', and 104.

When compared with the sensor unit 10'''' in FIG. 20, the sensor unit 10'''''' in FIG. 24 has a difference in terms of a plurality of first patterns 101' and a plurality of second patterns 103'. The plurality of first patterns 101' is the same as the plurality of first patterns 101' in FIG. 23, and the plurality of third patterns 103' is the same as the plurality of third patterns 103' in FIG. 21.

Although there is a disadvantage in which the number of pins of the touch controller (not shown) slightly increases when the sensor unit 10'''''' in FIG. 24 is used, the sensor units 10'''' and 10''''' in FIGS. 21 and 23 may exhibit technical effects together. That is, sensing sensitivity may be improved by cancelling a display noise acting on the sensor unit 100'''''' and a low ground mass (LGM) caused by a poor ground of an object, and a flicker occurring on the display panel including the sensor unit 100'''''' may be reduced or removed.

Figure 25:
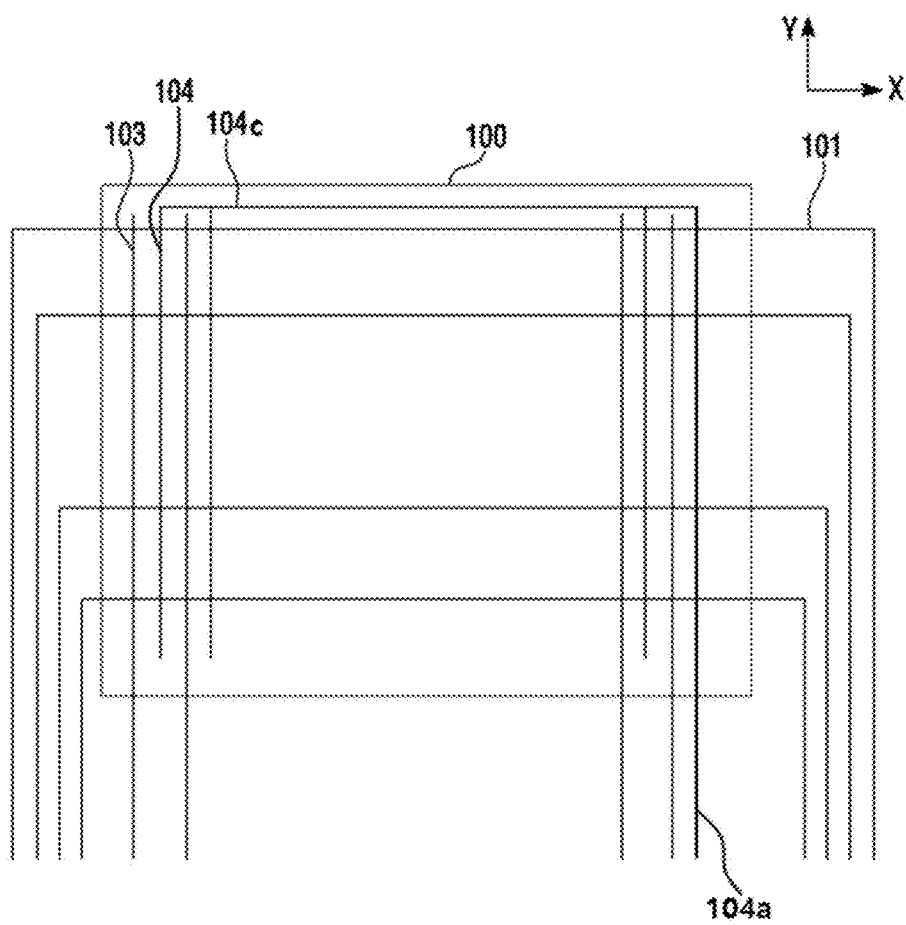
FIG. 25 is a schematic view illustrating the sensor unit 100 in FIG. 6.

FIG. 25 is a schematic view illustrating the sensor unit 100 in FIG. 6.

As illustrated in FIG. 25, a sensor unit 100 includes a first pattern 101, a third pattern 103, and a fourth pattern 104. Here, the first pattern 101 may be referred to as a first pattern in the first direction X, the third pattern 103 may be referred to as a first pattern in the second direction Y, and the fourth pattern 104 may be referred to as a second pattern in the second direction Y.

The plurality of first patterns 101 of the sensor unit 100 in FIG. 25 is connected to the touch controller (not shown) in the double routing method. Thus, there is an advantage of expanding the touch bandwidth and preventing the half-half distortion.

The plurality of fourth patterns 104 of the sensor unit 100 in FIG. 25 may be electrically floating instead of being electrically connected to the touch controller (not shown). When the touch controller (not shown) drives the sensor unit 100 in the third mode (or downlink mode) that senses a pen signal, the touch controller (not shown) may sense the pen signal through the plurality of third patterns 103. The pen signal from the plurality of third patterns 103 is transmitted from the plurality of fourth patterns 104 by capacitive coupling. Also, the touch controller (not shown) may directly receive the pen signal through the plurality of first patterns 101.

At least one fourth pattern 104*a* among the plurality of fourth patterns 104 of the sensor unit 100 in FIG. 25 may be electrically connected to the touch controller (not shown). When the touch controller (not shown) operates the sensor unit 100 in the first mode (touch sensing mode), the touch controller (not shown) may control the plurality of fourth patterns 104 to be electrically grounded. This may minimize an influence of the plurality of fourth patterns 104 in the first mode.

On the other hand, when the sensor unit 100 in FIG. 25 uses the plurality of first patterns 101 to drive the stylus pen, a total resistance of the plurality of first patterns 101 and the traces connected thereto relatively increases in comparison with a case of not using the double routing method. Thus, although a power consumption in the second mode (uplink mode) is relatively high, since all or most of the plurality of fourth patterns 104 are not used, there is an advantage of reducing the number of channels of the touch controller (not shown).

Figure 26:
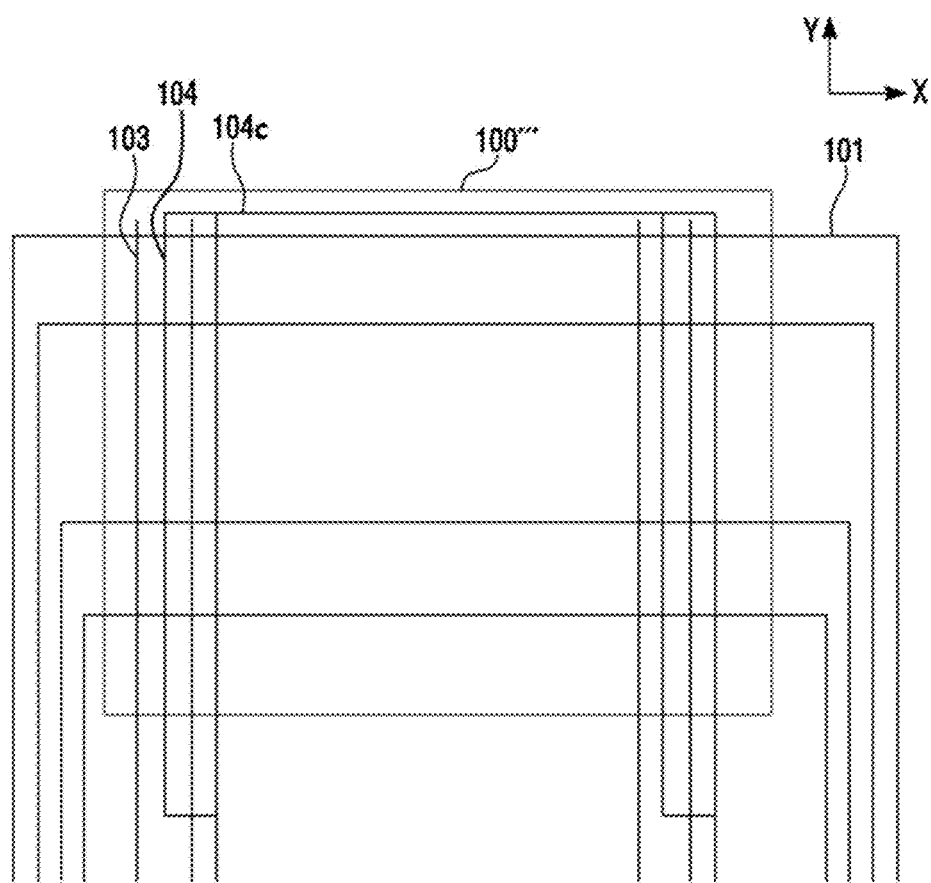
FIG. 26 is a schematic view illustrating a modified example of the sensor unit 100 in FIG. 25.

FIG. 26 is a schematic view illustrating a modified example of the sensor unit 100 in FIG. 25.

As illustrated in FIG. 26, a sensor unit 100''' includes a first pattern 101, a third pattern 103, and a fourth pattern 104.

When compared with the sensor unit 100''' in FIG. 25, the sensor unit 100''' in FIG. 26 has a difference in that lower ends of the plurality of fourth patterns 104 are connected in pairs in parallel, and the portion connected in parallel is electrically connected to the touch controller (not shown).

The touch controller (not shown) may use the plurality of first patterns 101 and the plurality of third patterns 103 when operated in the first mode (touch sensing mode). Specifically, the touch controller (not shown) may apply the touch driving signal to the plurality of first patterns 101 and receive the touch sensing signal from the plurality of third patterns 103. The touch controller (not shown) may operate the first mode in the method described in FIG. 7 or 11.

The touch controller (not shown) may operate the plurality of fourth patterns 104 as a pattern for driving the stylus pen in the second mode (uplink mode). In this case, a total resistance of the plurality of fourth patterns 104 may be relatively reduced because the lower ends of the plurality of fourth patterns 104 are connected in pairs in parallel in comparison with the sensor unit 100 of FIG. 25. Thus, there is an advantage of reducing the power consumption by up to a half in comparison with a case of driving the stylus pen using the sensor unit 100 of FIG. 25.

Also, the touch controller (not shown) may directly receive the pen signal through the plurality of first patterns 101 and receive the pen signal through the plurality of third patterns 103. Here, the pen signal from the plurality of first patterns 101 may be sensed in one of the methods in FIG. 10, 12*a*, or 12*b*, and the pen signal from the plurality of third patterns 103 may be transmitted from the plurality of fourth patterns 104 and sensed by capacitive coupling.

Figure 27:
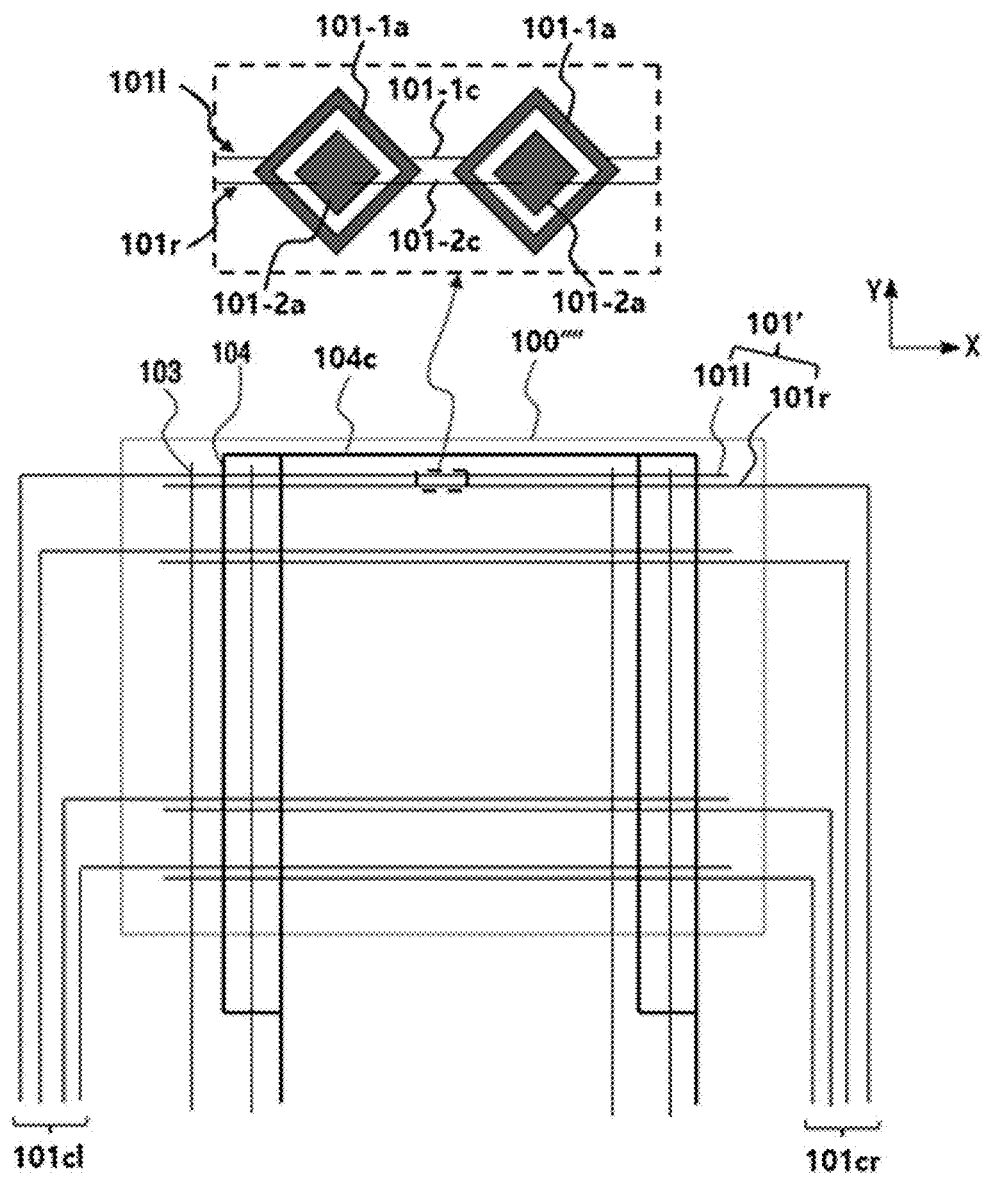
FIG. 27 is a schematic view illustrating a modified example of the sensor unit 100''' in FIG. 26.

FIG. 27 is a schematic view illustrating a modified example of the sensor unit 100''' in FIG. 26.

As illustrated in FIG. 27, a sensor unit 100'''' includes a first pattern 101', a third pattern 103, and a fourth pattern 104.

The sensor unit 100'''' of FIG. 27 has a difference from the sensor unit 100''' of FIG. 26 in terms of a plurality of first patterns 101'.

Each of the plurality of first patterns 101' includes a first-1 pattern 101*l* and a first-2 pattern 101*r*. The first-1 pattern 101*l* and the first-2 pattern 101*r* are arranged in the first direction X and adjacent to each other. The first pattern 101*l* and the second pattern 101*r* are physically spaced apart from each other to form capacitive coupling therebetween.

The first pattern 101*l* has both ends of which one end (left end) is electrically connected to the touch controller (not shown) through a trace 101*cl*, and the second pattern 101*r* has both ends of which the other end (right end) is electrically connected to the touch controller (not shown) through a trace 101*cr*.

The first-1 pattern 101*l* includes a plurality of main patterns 101-1*a* arranged in the first direction X and connection patterns 101-1*c* that connect two adjacent main patterns 101-1*a* among the plurality of main patterns 101-1*a*. Each of the main patterns 101-1*a* of the first-1 pattern 101*l* may have a rectangular shape, a rhombus shape, or a diamond shape and have an opening in which each of the main patterns 101-2*a* of the first-2 pattern 101*r* is disposed.

The first-2 pattern 101*r* includes a plurality of main patterns 101-2*a* arranged in the first direction X and connection patterns 101-2*c* that connect two adjacent main patterns 101-2*a* among the plurality of main patterns 101-

2a. Each of the main patterns 101-2a of the first-2 pattern 101r may have a rectangular shape, a rhombus shape, or a diamond shape. Each of the main patterns 101-2a of the first-2 pattern 101r may have a shape corresponding to that of each of the main patterns 101-1a of the first-1 pattern 101l.

Each of the main patterns 101-1a of the first-1 pattern 101l is disposed relatively closer to the third pattern 103 than each of the main patterns 101-2a of the first-2 pattern 101r.

Each of the plurality of third patterns 101' includes the first-1 pattern 101l and the first-2 pattern 101r, and each of the first-1 pattern 101l and the first-2 pattern 101r is connected to the touch controller (not shown) through respective traces 101cl and 101cr. Thus, although the number of pins for the plurality of third patterns 101' in the touch controller (not shown) increases by two times when compared with the sensor unit 100''' in FIG. 26, in the first mode (touch driving mode), the touch controller (not shown) may apply the touch driving signal to the plurality of third patterns 103 and differentiate two touch sensing signals output from the first-1 pattern 101l and the first-2 pattern 101r, respectively, to cancel a display noise acting on the sensor unit 100'''''' and a low ground mass (LGM) caused by a poor ground of an object, thereby improving sensing sensitivity.

Although not shown in a separate drawing, the first-1 pattern 101l and the first-2 pattern 101r of each of the first patterns 101' may have the pattern shape illustrated in FIG. 22.

On the other hand, the touch controller (not shown) may operate the second mode (uplink mode) by using the plurality of fourth patterns 104.

Also, the touch controller (not shown) may operate the third mode (downlink mode) by using the plurality of first patterns 101' and the plurality of third patterns 103. Here, the touch controller (not shown) may receive a pen signal transmitted from the fourth pattern 104 to the third pattern 103 through the plurality of third patterns 103 by capacitive coupling. The touch controller (not shown) may directly receive the pen signal through the plurality of first patterns 101'.

Figure 28:
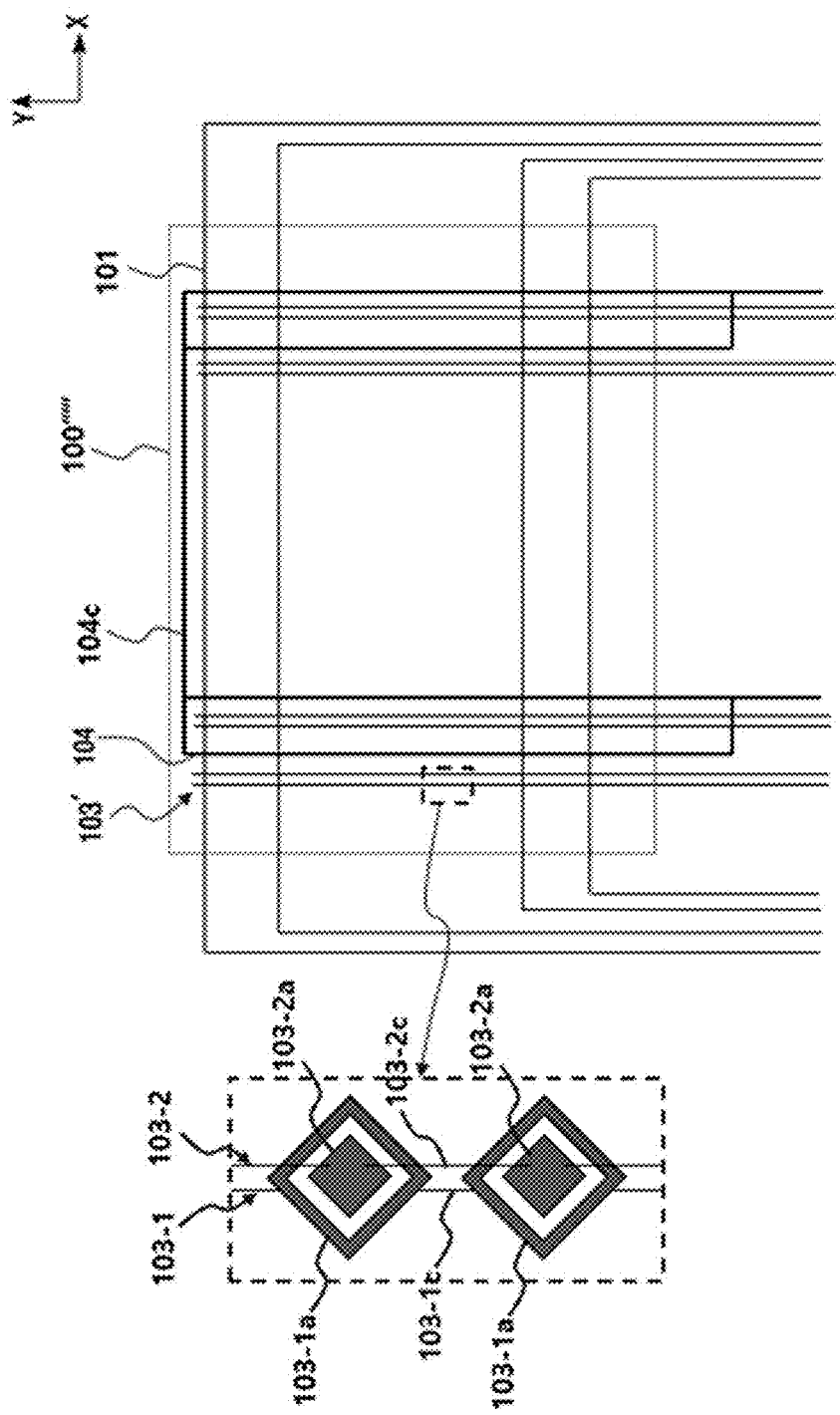
FIG. 28 is a schematic view illustrating another modified example of the sensor unit 100''' in FIG. 26.

FIG. 28 is a schematic view illustrating another modified example of the sensor unit 100''' in FIG. 26.

As illustrated in FIG. 28, a sensor unit 100'''''' includes a first pattern 101, a third pattern 103', and a fourth pattern 104.

The sensor unit 100'''''' in FIG. 28 has a difference from the sensor unit 100''' in FIG. 26 in terms of a plurality of third patterns 103'.

Each of the plurality of third patterns 103' includes a third-1 pattern 103-1 and a third-2 pattern 103-2, which are adjacent to each other.

The third-1 pattern 103-1 includes a plurality of main patterns 103-1a arranged in the second direction Y and connection patterns 103-1c that connect two adjacent main patterns 103-1a among the plurality of main patterns 103-1a. Each of the main patterns 103-1a of the third-1 pattern 103-1 may have a rectangular shape, a rhombus shape, or a diamond shape and have an opening in which each of the main patterns 103-2a of the third-2 pattern 103-2 is disposed.

The third-2 pattern 103-2 includes a plurality of main patterns 103-2a arranged in the second direction Y and connection patterns 103-2c that connect two adjacent main patterns 103-2a among the plurality of main patterns 103-2a. Each of the main patterns 103-2a of the third-2 pattern 103-2 may have a rectangular shape, a rhombus shape, or a diamond shape. Each of the main patterns 103-2a of the third-2 pattern 103-2 may have a shape corresponding to that of each of the main patterns 103-1a of the third-1 pattern 103-1.

Each of the main patterns 103-1a of the third-1 pattern 103-1 is disposed relatively closer to the first pattern 101 than each of the main patterns 103-2a of the third-2 pattern 103-2.

Each of the plurality of third patterns 103' includes the third-1 pattern 103-1 and the third-2 pattern 103-2, and each of the third-1 pattern 103-1 and the third-2 pattern 103-2 is connected to the touch controller (not shown). Thus, although the number of pins for the plurality of first patterns 101' in the touch controller (not shown) increases by two times when compared with the sensor unit 100''' in FIG. 26, in the first mode (touch driving mode), the touch controller (not shown) may apply the touch driving signal to the third-1 pattern 103-1 and simultaneously apply a touch driving signal obtained by inverting a phase of the touch driving signal by 180° to the third-2 pattern 103-2 to reduce or remove a flicker occurring on the display panel including the sensor unit 100'''''.

Although not shown in a separate drawing, the third-1 pattern 103-3 and the third-2 pattern 103-2 of each of the third patterns 103' may have the pattern shape illustrated in FIG. 22.

Figure 29:
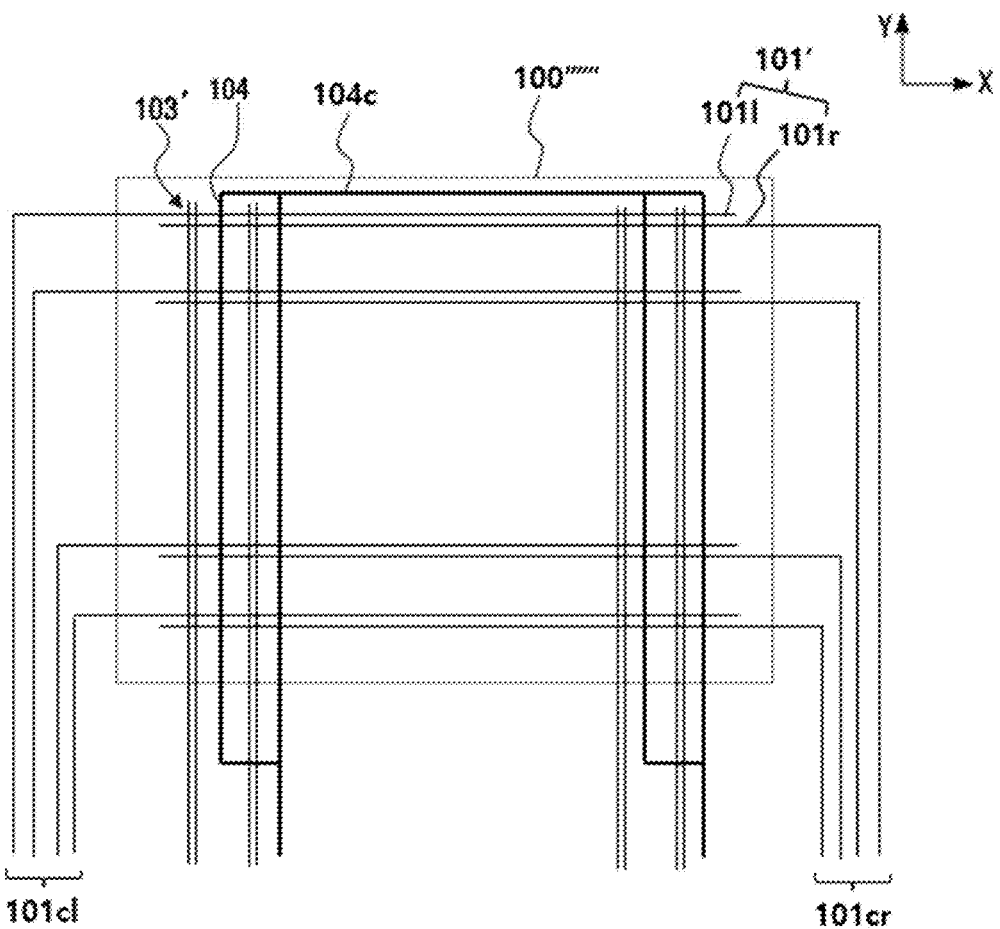
FIG. 29 is a schematic view illustrating another modified example of the sensor unit 100''' in FIG. 26.

FIG. 29 is a schematic view illustrating another modified example of the sensor unit 100''' in FIG. 26.

As illustrated in FIG. 29, a sensor unit 100'''''' includes a first pattern 101', a third pattern 103', and a fourth pattern 104.

When compared with the sensor unit 100''' in FIG. 26, the sensor unit 100'''''' in FIG. 29 has a difference in terms of a plurality of first patterns 101' and a plurality of second patterns 103'. The plurality of first patterns 101' is the same as the plurality of first patterns 101' in FIG. 27, and the plurality of third patterns 103' is the same as the plurality of third patterns 103' in FIG. 28.

Although there is a disadvantage in which the number of pins of the touch controller (not shown) slightly increases when the sensor unit 100'''''' in FIG. 29 is used, the sensor units 100'''' and 100''''' in FIGS. 27 and 28 may exhibit technical effects together. That is, sensing sensitivity may be improved by cancelling a display noise acting on the sensor unit 100'''' and a low ground mass (LGM) caused by a poor ground of an object, and a flicker occurring on the display panel including the sensor unit 100'''''' may be reduced or removed.

Figure 30:
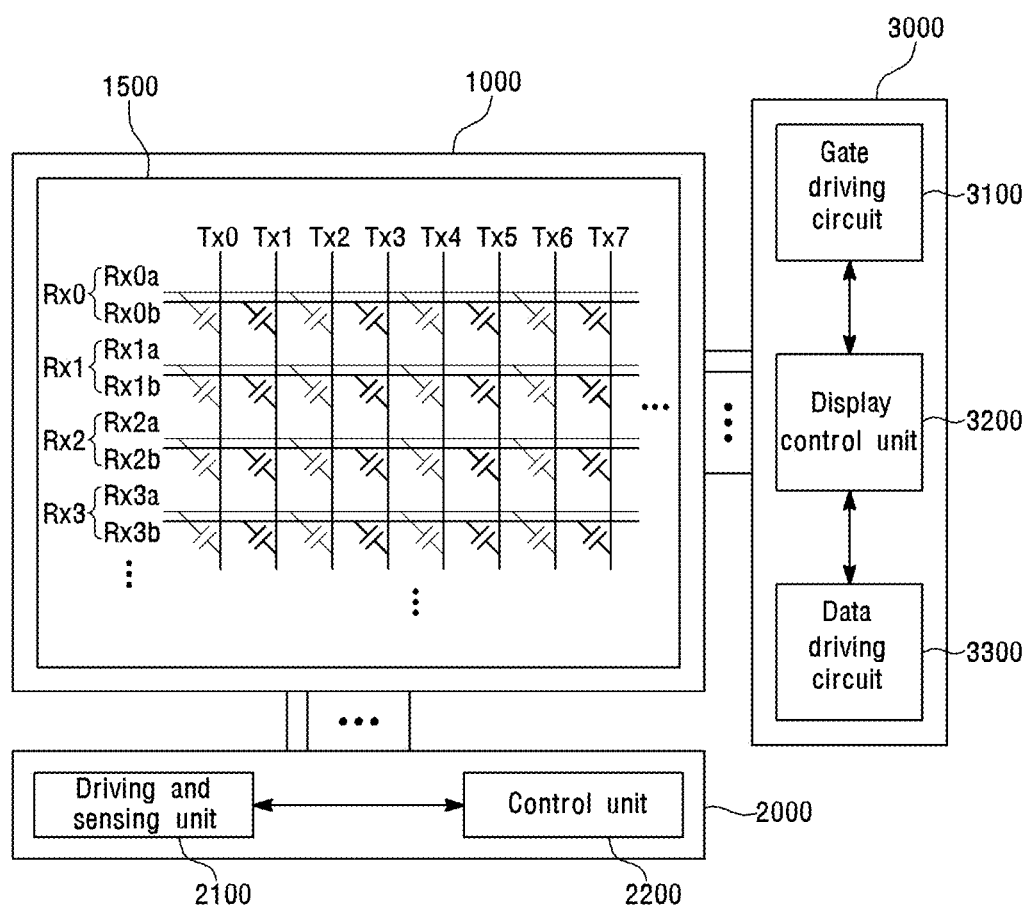
FIG. 30 is a block diagram of an electronic device according to a fourth embodiment of the present invention.

FIG. 30 is a block diagram of an electronic device according to a fourth embodiment of the present invention.

Referring to FIG. 30, the electronic device according to the fourth embodiment of the present invention includes a sensor unit 1500, a display panel 1000, a touch controller 2000, and a display controller 3000.

The sensor unit 1500 may be included in the display panel 1000 or separately provided. The sensor unit 1500 may include any one of the sensor units illustrated in FIGS. 5 to 26.

The sensor unit 1500 includes a plurality of first electrodes and a plurality of second electrodes. The plurality of first electrodes may be a plurality of driving electrodes Tx0, Tx1, Tx2, Tx3, Tx4, Tx5, Tx6, and Tx7, and the plurality of second electrodes may be a plurality of receiving electrodes Rx0, Rx1, Rx2, and Rx3.

The plurality of driving electrodes Tx0, Tx1, Tx2, Tx3, Tx4, Tx5, Tx6, and Tx7 may be the plurality of first patterns 101 in FIGS. 5 to 26, and the plurality of receiving electrodes Rx0, Rx1, Rx2, and Rx3 may be the plurality of third patterns 103 in FIGS. 5 to 26. On the contrary, the plurality of driving electrodes Tx0, Tx1, Tx2, Tx3, Tx4, Tx5, Tx6, and Tx7 may be the plurality of third patterns 103 in FIGS. 5 to 26, and the plurality of receiving electrodes Rx0, Rx1, Rx2, and Rx3 may be the plurality of first patterns 101 in FIGS. 5 to 26.

The touch controller 2000 controls the sensor unit 1500. The touch controller 2000 may include any one of the touch controllers illustrated in FIGS. 5 to 26. The touch controller 2000 may include a driving and sensing unit 2100 and a control unit 2200.

The touch controller 2000 may sequentially apply driving signals to the plurality of driving electrodes Tx0, Tx1, Tx2, Tx3, Tx4, Tx5, Tx6, and Tx7 of the sensor unit 1500 or simultaneously apply predetermined driving signals to at least two of the plurality of driving electrodes Tx0, Tx1, Tx2, Tx3, Tx4, Tx5, Tx6, and Tx7.

The touch controller 2000 may receive sensing signals output from the plurality of receiving electrodes Rx0, Rx1, Rx2, and Rx3 of the sensor unit 1500. Here, the sensing signal may contain information on an amount of variation in capacitance between the receiving electrode and the driving electrode adjacent thereto, a low ground mass (LGM) noise signal, and a display noise signal.

Each of the receiving electrodes Rx0, Rx1, Rx2, and Rx3 may include a pair of receiving electrodes. For example, the 0-th receiving electrode Rx0 may include a pair of receiving electrodes Rx0$a$ and Rx0$b$, a plurality of pair of receiving electrodes Rx0$a$ and Rx0$b$ may be alternately arranged, a plurality of 0$a$ receiving electrodes Rx0$a$ may be electrically connected to each other, and a plurality of 0$b$ receiving electrodes Rx0$b$ may be electrically connected to each other.

The 0$a$ receiving electrode Rx0$a$ may be arranged to form a dominant mutual capacitance with the 0-th driving electrode Tx0, the second driving electrode Tx2, the fourth driving electrode Tx4, and the sixth driving electrode Tx6, and the 0$b$ receiving electrode Rx0$b$ may be arranged to form a dominant mutual capacitance with the first driving electrode Tx1, the third driving electrode Tx3, the fifth driving electrode Tx5, and the seventh driving electrode Tx7. On the other hand, the 0$a$ receiving electrode Rx0$a$ may be arranged to form a relatively insignificant mutual capacitance with the first driving electrode Tx1, the third driving electrode Tx3, the fifth driving electrode Tx5, and the seventh driving electrode Tx7, and the 0$b$ receiving electrode Rx0$b$ may be arranged to form a relatively insignificant mutual capacitance with the 0-th driving electrode Tx0, the second driving electrode Tx2, the fourth driving electrode Tx4, and the sixth driving electrode Tx6.

The rest receiving electrodes Rx1, Rx2, and Rx3 may be also configured in the same manner as the 0-th receiving electrode Rx0.

The touch controller 2000 may analog-to-digital convert the sensing signal output from the plurality of receiving electrodes Rx0, Rx1, Rx2, and Rx3 to output a digital sensing signal.

The touch controller 2000 may output two signals among the sensing signals output from the plurality of receiving electrodes Rx0, Rx1, Rx2, and Rx3 as differential signals and analog-to-digital convert the output signals to output the converted signals. The touch controller 2000 may detect whether a touch is generated and/or a touch position based on the digital signal output from the touch controller 200.

The touch controller 2000 may include a driving and sensing unit 2100 that applies a driving signal to at least one of the driving electrodes Tx0, Tx1, Tx2, Tx3, Tx4, Tx5, Tx6, and Tx7 of the sensor unit 1500 and receives a sensing signal from the plurality of receiving electrodes Rx0, Rx1, Rx2, and Rx3 of the sensor unit 1500 and a control unit 2200 that controls the driving and sensing unit 2100.

A plurality of scan lines (or gate lines) and a plurality of data lines may be disposed on the display panel 1000. A subpixel may be disposed on an area in which the scan lines cross the data lines.

The display panel 1000 may include an active area on which a plurality of subpixels are disposed and an inactive area (dead space or bezel) disposed outside the active area. The active area may constitute a display screen of the electronic device. The display screen may have a landscape shape in which a horizontal length is greater than a vertical length. Alternatively, the display screen may have a portrait shape in which a vertical length is greater than a horizontal length.

The display controller 3000 controls the display panel 1000 and includes a gate driving circuit 3100, a display control unit 3200, and a data driving circuit 3300.

Figure 31:
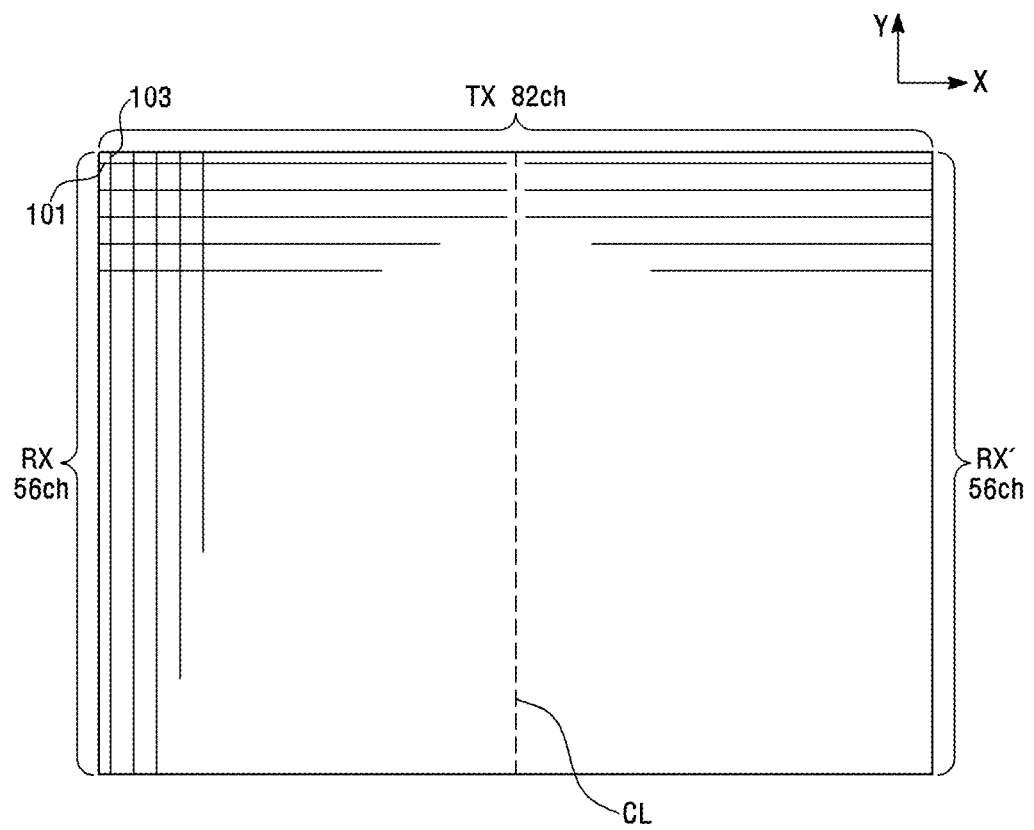
FIG. 31 is a view for explaining a typical sensor unit having a landscape shape.

FIG. 31 is a view for explaining a typical sensor unit having a landscape shape.

The sensor unit in FIG. 31 may detect only a position of a touch of an object such as a finger. The sensor unit includes a plurality of first patterns 101 each extending in the first direction X that is a major axis and a plurality of third patterns 103 each extending in the second direction Y that is a minor axis. The plurality of first patterns 101 and the plurality of third patterns 103 are arranged to cross each other and electrically insulated from each other.

In the sensor unit in FIG. 31, the plurality of third patterns 103 function as driving electrodes TX to which a touch driving signal is applied, and the plurality of first patterns 101 function as receiving electrodes RX from which a touch sensing signal is output. Each of the first patterns 101 is divided into two patterns based on an imaginary cutting line CL.

In FIG. 31, the plurality of first patterns 101 includes a total of 112 patterns. Based on the cutting line CL, 56 first patterns 101 are arranged at a left side, and 56 first patterns 101 are arranged at a right side. Also, the plurality of third patterns 103 include a total of 82 patterns. Thus, the total number of channels (or pins) of the touch controller (not shown) for controlling the sensor unit in FIG. 31 is 194.

FIGS. 32A and 32B are views for explaining other typical sensor units each having the landscape shape.

The typical sensor unit in FIG. 32A may not only sense a position of an object such as a finger but also drive the stylus pen or sense the position of the stylus pen. To this end, the typical sensor unit in FIG. 32A further includes a second pattern 102 and a fourth pattern 104 in addition to the sensor unit in FIG. 31. Also, in order to remove a noise, each of third patterns 103, which functions as the receiving electrode RX, includes a pair of electrodes 103$a$ and 103$b$ arranged alternately along the second direction Y as illustrated in FIG. 30.

When compared with the typical sensor unit in FIG. 31, since the typical sensor unit in FIG. 32A further includes the plurality of second patterns 102 and the plurality of fourth patterns 104, and each of the third patterns 103 includes the pair of electrodes 103$a$ and 103$b$, the total number of channels of the touch controller (not shown) is 358 that is a sum of the number (56) of the plurality of first patterns 101 at the left side based on the cutting line CL, the number (56) of the plurality of first patterns at the right side, the number (164) of the plurality of third patterns 103, and the number (82) of the plurality of fourth patterns 104. Here, since the plurality of second patterns 102 are not electrically connected to the touch controller (not shown), the number of the second patterns 102 is not added to the number of channels of the touch controller (not shown).

When compared with the sensor unit in FIG. 32A, the sensor unit in FIG. 32B has a difference in that the plurality of first patterns 101 function as receiving electrodes RX, the plurality of third patterns 103 function as driving electrodes TX, and each of the first patterns 101 includes a plurality of pair of electrodes 101a and 101b arranged alternately in the first direction X.

When compared with the typical sensor unit in FIG. 32A, since the typical sensor unit in FIG. 32B includes the first patterns 101 each including the pair of electrodes 101a and 101b arranged alternately in the first direction X, the total number of channels of the touch controller (not shown) is 388.

When FIGS. 32A and 32B are compared with each other, the number of channels of the touch controller (not shown) for the sensor unit in FIG. 32B requires relatively more due to characteristics of the landscape shape.

Figure 33A:
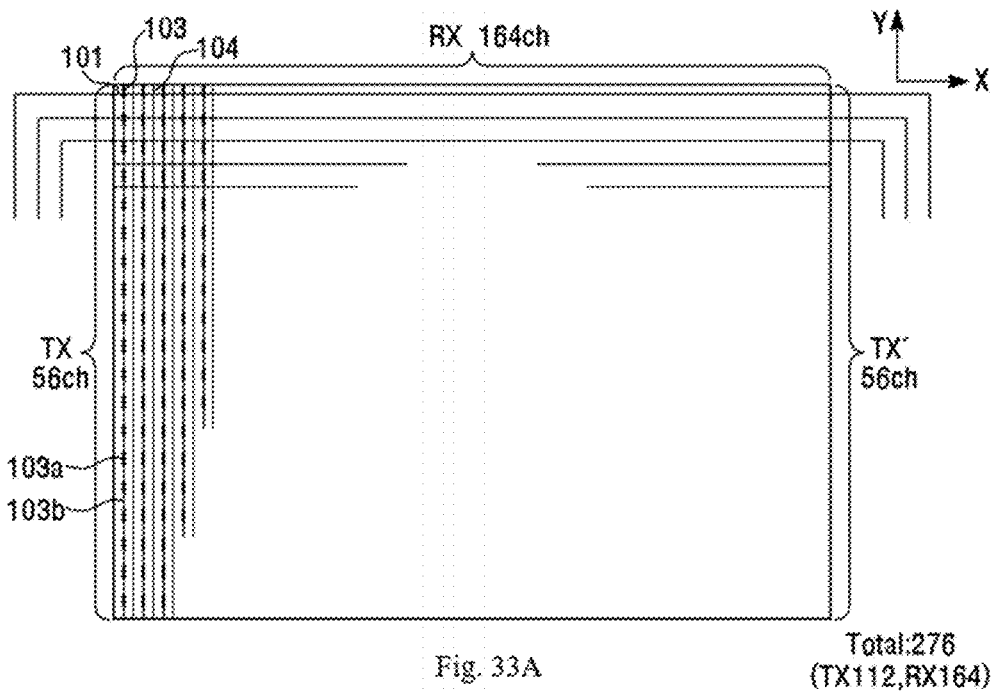
FIGS. 33A and 33B are views for explaining a sensor unit of an electronic device according to a fifth embodiment of the present invention.
Figure 33B:
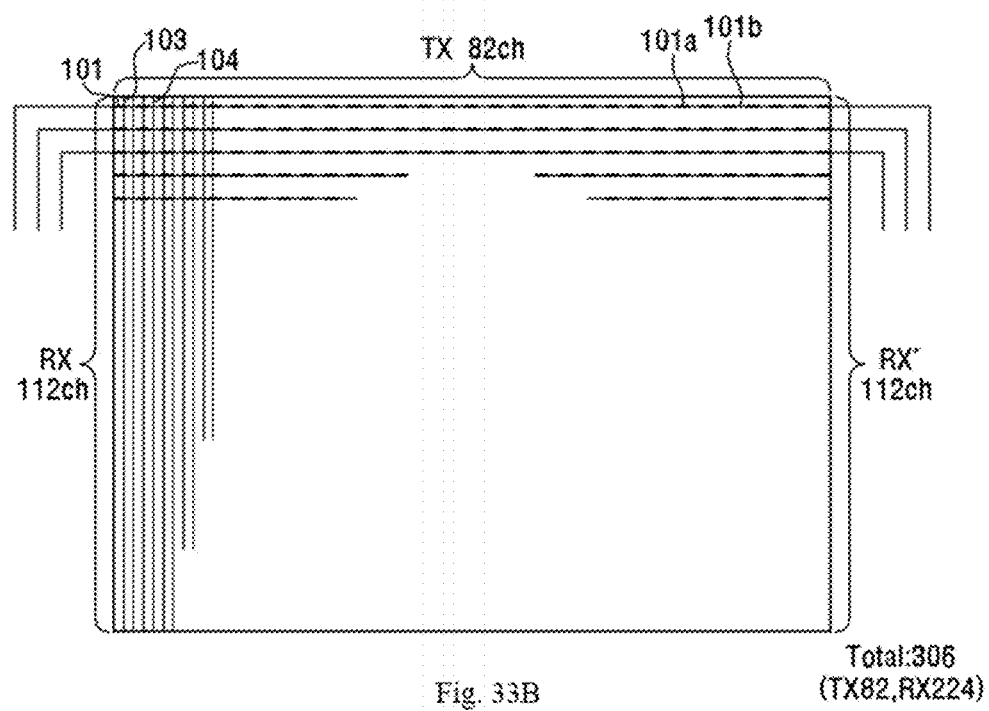

FIGS. 33A and 33B are views for explaining a sensor unit of an electronic device according to a fifth embodiment of the present invention.

In the sensor unit in FIG. 33A includes third patterns 103 each including a plurality of pair of electrodes 103a and 103b that are alternately arranged in the second direction Y as illustrated in FIG. 30 in addition to the sensor unit in FIG. 6, which is connected to a touch controller (not shown) in the double routing method.

The number of channels of the touch controller (not shown) for the sensor unit in FIG. 33A is 276. Here, the plurality of fourth patterns 104 are not electrically connected to the touch controller (not shown). When compared with the typical sensor unit in FIG. 32A, since the plurality of first patterns 101 connected in the double routing method function even in the second mode that drives the stylus pen, there is an advantage of relatively reducing the number of channels of the touch controller (not shown) by approximately 22%.

The sensor unit in FIG. 33B is configured such that each of the first patterns 101 of the sensor unit in FIG. 6 includes a plurality of pair of electrodes 101a and 101b that are alternately arranged in the first direction X as illustrated in FIG. 30.

The number of channels of the touch controller (not shown) for the sensor unit in FIG. 33B is 306. Here, the plurality of fourth patterns 104 are not electrically connected to the touch controller (not shown). When compared with the touch controller (not shown) for the typical sensor unit in FIG. 32B, since the plurality of first patterns 101 connected in the double routing method also function in the second mode for driving the stylus pen, there is an advantage of relatively reducing the number of channels of the touch controller (not shown) by approximately 22%.

Although there is no particular limitation when the display screen of the electronic device including the sensor unit in FIGS. 32A, 32B, 33A and 33B has a size of a general size of a screen of a smartphone, e.g., 6.9 inches, when the display screen has a size that increases to 11 inches to 16 inches, such as that of a tablet PC or a foldable device, a length of each of the first to fourth patterns 101, 102, 103, and 104) of the sensor unit in FIGS. 32A and 32B also increases. Thus, an overall resistance and a capacitance value of the sensor unit increase. Since the increase in resistance and capacitance value decrease a bandwidth of an operation frequency of each of a touch driving signal applied to the touch driving electrodes TX and a pen driving signal applied to the stylus pen driving electrode STX, a limitation of not obtaining a required bandwidth of the operation frequency required in design may occur.

On the other hand, in a case of the embodiment of the present invention in FIGS. 33A and 33B, since no exclusive channels for the stylus pen driving electrodes STX exist, there is an advantage of expanding the bandwidth of the operation frequency required in design because the resistance and capacitance value may be reduced.

Figure 34:
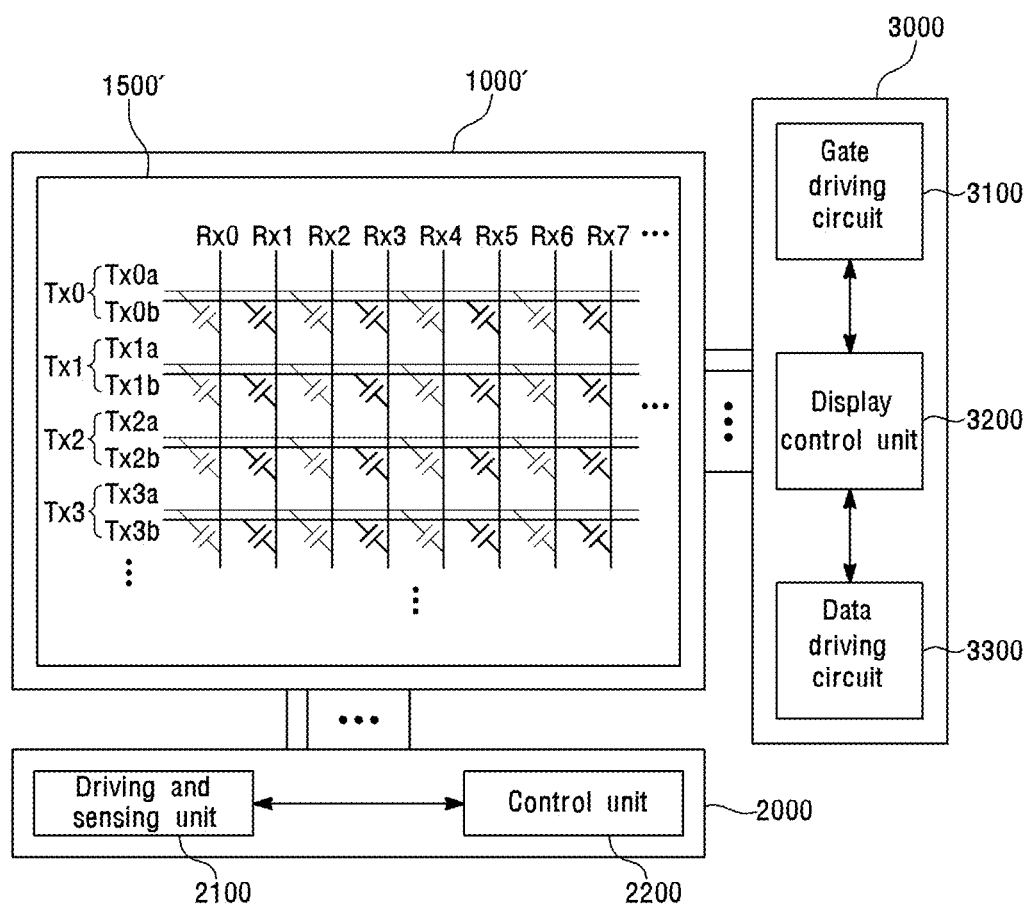
FIG. 34 is a block diagram of an electronic device according to a sixth embodiment of the present invention.

FIG. 34 is a block diagram of an electronic device according to a sixth embodiment of the present invention.

The electronic device illustrated in FIG. 34 has a difference from the electronic device according to the fourth embodiment illustrated in FIG. 30 as stated below.

Although, in the touch sensor 1500 in FIG. 30, the plurality of first electrodes serve as the plurality of driving electrodes Tx0, Tx1, Tx2, Tx3, Tx4, Tx5, Tx6, and Tx7, and the plurality of second electrodes serve as the plurality of receiving electrodes Rx0, Rx1, Rx2, and Rx3, in a sensor unit 1500' in FIG. 34, on the contrary, a plurality of first electrodes serve as a plurality of receiving electrodes Rx0, Rx1, Rx2, Rx3, Rx4, Rx5, Rx6, and Rx7, and a plurality of second electrodes serve as a plurality of driving electrodes Tx0, Tx1, Tx2, and Tx3.

The plurality of driving electrodes Tx0, Tx1, Tx2, and Tx3 may be the plurality of first patterns 101 in FIGS. 5 to 26 and FIGS. 33A and 33B, and the plurality of receiving electrodes Rx0, Rx1, Rx2, Rx3, Rx4, Rx5, Rx6, and Rx7 may be the plurality of third patterns 103 in FIGS. 5 to 26 and FIGS. 33A and 33B. On the contrary, the plurality of driving electrodes Tx0, Tx1, Tx2, and Tx3 may be the plurality of third patterns 103 in FIGS. 5 to 26 and FIGS. 33A and 33B, and the plurality of receiving electrodes Rx0, Rx1, Rx2, Rx3, Rx4, Rx5, Rx6, and Rx7 may be the plurality of first patterns 101 in FIGS. 5 to 26 and FIGS. 33A and 33B.

The feature in which the plurality of first electrodes serve as the plurality of driving electrodes as illustrated in FIG. 30 or serve as the plurality of receiving electrodes as illustrated in FIG. 34 may be determined by control of a control unit 2200.

When the control unit applies a driving signal to the plurality of first electrodes, the plurality of first electrodes may serve as the plurality of driving electrodes, and when the control unit applies a driving signal to the plurality of second electrodes, the plurality of second electrodes may serve as the plurality of driving electrodes.

The plurality of driving electrodes Tx0, Tx1, Tx2, and Tx3 and the plurality of receiving electrodes Rx0, Rx1, Rx2, Rx3, Rx4, Rx5, Rx6, and Rx7 may be arranged to cross each other. Each of the driving electrodes Tx0, Tx1, Tx2, and Tx3 may extend in a second axis direction, and each of the receiving electrode Rx0, Rx1, Rx2, Rx3, Rx4, Rx5, Rx6, and Rx7 may extend in a first axis direction different from the second axis direction. Here, the first axis direction may be perpendicular to the second axis direction.

Some driving electrodes Tx0a, Tx1a, Tx2a, Tx3a, etc., among the plurality of driving electrodes Tx0, Tx1, Tx2, and Tx3 may be arranged to form a mutual capacitance Cm with even-numbered receiving electrodes Rx0, Rx2, Rx4, Rx6, etc., among the plurality of receiving electrodes Rx0, Rx1, Rx2, etc., and the rest driving electrodes Tx0b, Tx1b, Tx2b, Tx3b, etc., among the plurality of driving electrodes Tx0, Tx1, Tx2, and Tx3 may be arranged to form a mutual capacitance Cm with odd-numbered receiving electrodes Rx1, Rx3, Rx5, Rx7, etc., among the plurality of receiving electrodes Rx0, Rx1, Rx2, etc.

Some driving electrodes Tx0$a$, Tx1$a$, Tx2$a$, Tx3$a$, etc., among the plurality of driving electrodes Tx0, Tx1, Tx2, and Tx3 may be arranged directly adjacent to the even-numbered receiving electrodes Rx0, Rx2, Rx4, Rx6, etc., among the plurality of receiving electrodes Rx0, Rx1, Rx2, etc., and spaced a predetermined distance from the odd-numbered receiving electrodes Rx1, Rx3, Rx5, Rx7, etc., instead of being directly adjacent thereto. Here, at least one different electrode may be disposed between the some driving electrodes Tx0$a$, Tx1$a$, Tx2$a$, Tx3$a$, etc., and the rest odd-numbered receiving electrodes Rx1, Rx3, Rx5, Rx7, etc.

The different electrode may be one of the some even-numbered receiving electrodes Rx0, Rx2, Rx4, Rx6, etc.

The rest driving electrodes Tx0$b$, Tx1$b$, Tx2$b$, Tx3$b$, etc., among the driving electrodes Tx0, Tx1, Tx2, and Tx3 may be arranged directly adjacent to the rest odd-numbered receiving odd-numbered electrodes Rx1, Rx3, Rx5, Rx7, etc., among the plurality of receiving electrodes Rx0, Rx1, Rx2, etc., and spaced a predetermined distance from the even-numbered receiving electrodes Rx0, Rx2, Rx4, Rx6, etc., instead of being directly adjacent thereto.

Here, at least one different electrode may be disposed between the rest driving electrodes Tx0$b$, Tx1$b$, Tx2$b$, Tx3$b$, etc., and the some even-numbered receiving electrodes Rx0, Rx2, Rx4, Rx6, etc. The different electrode may be one of the rest odd-numbered receiving electrodes Rx1, Rx3, Rx5, Rx7, etc.

The driving signal applied to the rest driving electrodes Tx0$b$, Tx1$b$, Tx2$b$, Tx3$b$, etc., may be an inverted driving signal obtained by inverting only a phase by 180° from the driving signal applied to the some driving electrodes Tx0$a$, Tx1$a$, Tx2$a$, Tx3$a$, etc.

For example, a driving signal applied to the driving electrode Tx0$b$ of the pair of driving electrodes Tx0$a$ and Tx0$b$ of the 0-th driving electrodes Tx0 may be an inverted driving signal obtained by inverting the driving signal applied to Tx0$a$.

The electronic device in FIG. 34 may perform a multi-driving of simultaneously applying driving signals to all driving electrodes Tx0, Tx1, Tx2, Tx3, etc., of the touch sensor 1500', and a flicker does not occur on the display panel although the multi-driving is performed. Also, since the multi-driving of all driving electrodes Tx0, Tx1, Tx2, Tx3, etc., may be performed, a driving time for performing mutual sensing may be reduced. Furthermore, since a turn-on time of an analog front end (AFE) may be reduced, a power consumption may be further reduced.

Figure 35:
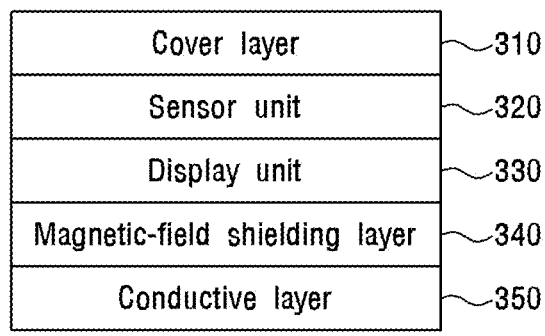
FIG. 35 is a view for explaining a stack-up structure of the electronic device according to various embodiments in FIGS. 5 to 34.

FIG. 35 is a view for explaining a stack-up structure of the electronic device according to various embodiments in FIGS. 5 to 34.

The electronic device may include a cover layer (310), a sensor unit 320, a display unit 330, a magnetic-field shielding layer 340, and a conductive layer 350.

The cover layer 310 may be disposed on the display unit 330 and made of a transparent material, and a tip of a stylus pen may directly contact a top surface (or touch surface) of the cover layer 310.

The display unit 330 is disposed below the cover layer 310 to provide predetermined visual information in response to control by a display controller (not shown). For example, the display unit 330 may be a flexible LCD module or a flexible OLED module.

The sensor unit 320 capable of driving and/or sensing the stylus pen and sensing a finger may be disposed between the cover layer 310 and the display unit 330. The sensor unit 320 may include at least one of the sensor units described above through FIGS. 5 to 34.

The magnetic-field shielding layer 340 may block a magnetic field to prevent other electronic components in the electronic device from being affected by the magnetic field. Also, the magnetic-field shielding layer 340 may diffuse heat emitted from the electronic components and block an electromagnetic wave (EMI) from the electronic components.

The conductive layer 350 may be made of metals such as copper or aluminum or may be an alloy made by adding other metal or non-metal elements to at least one metal. The conductive layer 350 may electrically have a ground potential.

Figure 36:
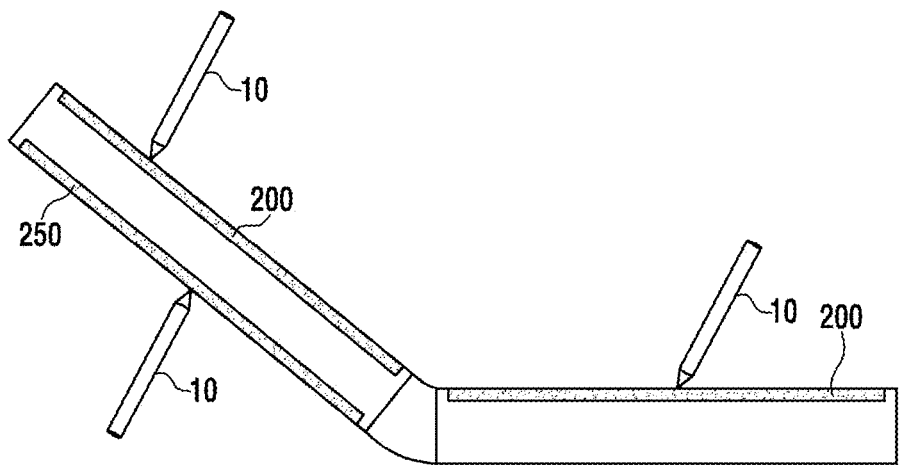
FIG. 36 is a schematic view of a foldable device that is an example of the electronic device described in FIGS. 5 to 35.

FIG. 36 is a schematic view of a foldable device that is an example of the electronic device described in FIGS. 5 to 35.

The foldable device includes an inner touch screen 200 and an outer touch screen 250.

Figure 4:
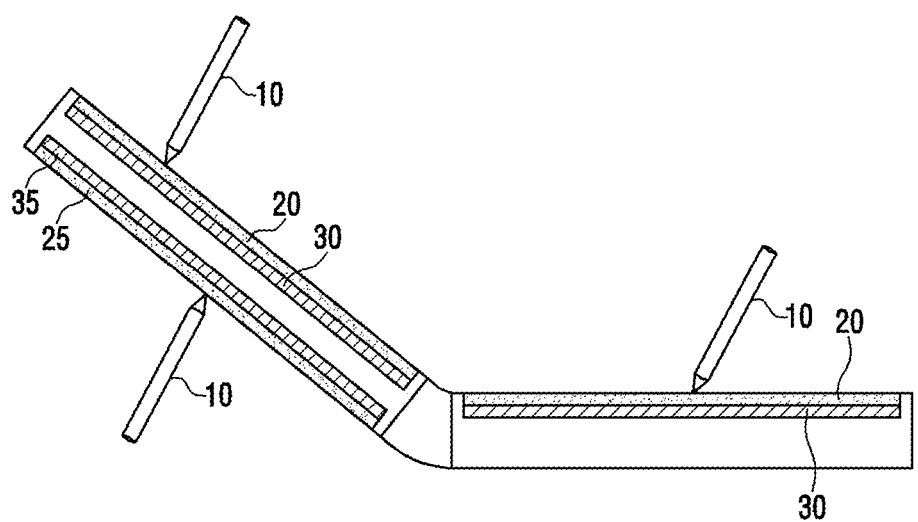
FIG. 4 is a schematic configuration view for explaining a limitation when a function of a stylus pen is realized on inner and outer screens by applying a typical EMR pen to a display panel in the typical electronic device.

As described above, since the electronic device in FIGS. 5 to 35 may drive and/or sense not only the object such as a finger but also the stylus pen by the sensor unit, the foldable device that is the electronic device according to the embodiments of the present invention does not require the digitizer described in FIG. 4. Thus, since the digitizer is not required to be attached to a lower portion of each of the inner touch screen 200 and the outer touch screen 250, increase in overall thickness and manufacturing costs of the foldable device may be prevented.

Also, the function of the stylus pen may be supported in not only the inner touch screen but also the outer touch screen.

Also, as the first pattern is connected to the touch controller in the double routing method, a connection condition of the sensor during an object touch and a stylus touch, such as driving, receiving, grounding, and floating, may be flexibly controlled according to demands of a user.

Also, since switching through a multiplexer in the touch controller is not required, a current loss caused by own resistance of the multiplexer may be prevented, and a configuration of the electronic device may be simplified.

Also, in a case of a tablet PC or a foldable device having a large screen, additional stylus sensing sensor is not required. Thus, the number of channels of touch driving traces is reduced, and the number of channels is significantly reduced in comparison with a typical touch screen for finger and stylus touch. Thus, a thickness of a bezel in a width direction of the electronic device may be significantly reduced.

Also, as additional stylus sensing sensor is not required, the stylus function may be performed on both surfaces of the inner and outer touch screens of the foldable device without increase in thickness or manufacturing costs of the display panel.

When the electronic device according to the embodiment of the present invention is used, additional sensor for driving and/or sensing the stylus pen is not required.

Also, the double routing may be performed.

Also, the number of channels between the touch controller and the sensor unit capable of simultaneously sensing the object and the stylus pen may be reduced.

The function of the stylus pen may be supported in the outer touch screen in addition to the inner touch screen.

Features, structures, and effects described in the above embodiments are incorporated into at least one embodiment of the present disclosure, but are not limited to only one embodiment. Moreover, features, structures, and effects exemplified in one embodiment can easily be combined and modified for another embodiment by those skilled in the art. Therefore, these combinations and modifications should be construed as falling within the scope of the present disclosure. Moreover, features, structures, and effects exemplified in one embodiment can easily be combined and modified for another embodiment by those skilled in the art. Therefore, these combinations and modifications should be construed as falling within the scope of the present invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising a sensor unit and a touch controller, wherein the sensor unit comprises:
    a plurality of first patterns, each of which extends in a first direction and has both ends electrically connected to the touch controller;
    a plurality of third patterns, each of which extends in a second direction different from the first direction to cross the first pattern and has both ends of which at least one end is electrically connected to the touch controller; and
    a plurality of fourth patterns arranged adjacent to the third patterns, each extending in the second direction, and having one ends electrically connected to the touch controller or electrically floating and the other ends electrically connected to each other, wherein the plurality of fourth patterns comprise at least three or more.

2. The electronic device of claim 1, wherein one end of at least one of the plurality of fourth patterns is electrically connected to the touch controller, and one ends of the rest fourth patterns are electrically floating.

3. The electronic device of claim 1, wherein one ends of the plurality of fourth patterns are connected in pairs in parallel and electrically connected to the touch controller.

4. The electronic device of claim 1, wherein the sensor unit further comprises a plurality of second patterns arranged adjacent to the plurality of first patterns, respectively, and wherein the plurality of second patterns have one ends electrically floating and the other ends electrically connected to each other.

5. The electronic device of claim 1, wherein each of the plurality of first patterns comprises:
    a first-1 pattern having both ends of which one end is electrically connected to the touch controller; and
    a first-2 pattern arranged adjacent to the first-1 pattern and having both ends of which the other end is electrically connected to the touch controller.

6. The electronic device of claim 1, wherein each of the plurality of third patterns comprises:
    a third-1 pattern having both ends of which one end is electrically connected to the touch controller; and
    a third-2 pattern arranged adjacent to the third-1 pattern and having both ends of which the other end is electrically connected to the touch controller.

7. An electronic device comprising a sensor unit and a touch controller, wherein the sensor unit comprises:
    a plurality of first patterns, each of which extends in a first direction and has both ends of which at least one end is electrically connected to the touch controller;
    a plurality of second patterns arranged adjacent to the first patterns, each extending in the first direction, and having one ends electrically connected to each other;
    a plurality of third patterns, each of which extends in a second direction different from the first direction to cross the first pattern and has both ends of which at least one end is electrically connected to the touch controller; and
    a plurality of fourth patterns arranged adjacent to the third patterns, each extending in the second direction, and having one ends electrically connected to each other,
    wherein the plurality of fourth patterns comprise at least three or more,
    wherein the plurality of first patterns comprise some first patterns each having both ends of which one end is electrically connected to the touch controller and other first patterns each having both ends of which the other end is electrically connected to the touch controller, and
    wherein the some first patterns and the other first patterns are arranged alternately one by one along the second direction.

8. The electronic device of claim 7, wherein the plurality of second patterns comprise some second patterns each having both ends of which one end is electrically connected to the touch controller and other second patterns each having both ends of which the other end is electrically connected to the touch controller, and
    wherein the some second patterns and the other some second patterns are arranged alternately along the second direction.

9. The electronic device of claim 7, wherein each of the plurality of third patterns comprises:
    a third-1 pattern; and
    a third-2 pattern arranged adjacent to the third-1 pattern, wherein the third-1 pattern is arranged closer to the first pattern than the third-2 pattern.

10. The electronic device of claim 7, wherein each of the plurality of first patterns comprises:
    a first-1 pattern; and
    a first-2 pattern arranged adjacent to the first-1 pattern, wherein the first-1 pattern is arranged closer to the third pattern than the first-2 pattern.

11. The electronic device of claim 1, further comprising a display panel on which the sensor unit is disposed, wherein the display panel comprises an active area on which the plurality of first patterns and the plurality of third patterns are arranged and a dead space outside the active area,
    wherein the sensor unit further comprises at least one uplink channel disposed on the dead space, and
    wherein the uplink channel comprises an uplink trace extending in the first direction and a connection trace configured to connect the uplink trace to the touch controller.

12. The electronic device of claim 11, wherein the uplink channel comprises a first uplink channel and a second uplink channel, and
    wherein the plurality of first patterns are disposed between the first uplink channel and the second uplink channel.

13. The electronic device of claim 11, wherein the connection trace comprises some parallel traces arranged parallel to the uplink trace, and wherein a plurality of traces connected to one ends of the plurality of first patterns are disposed between the uplink traces and the parallel traces.

14. The electronic device of claim 1, wherein the touch controller controls the sensor unit to operate in one of a plurality of modes, wherein the plurality of modes comprise:
   an uplink mode that controls a current to flow through some first patterns in the first direction among the plurality of first patterns and controls a current to flow through other first patterns in a direction opposite to the first direction; and
   a downlink mode that controls to receive a stylus pen signal from the plurality of first patterns and the plurality of third patterns.

15. The electronic device of claim 14, wherein in the uplink mode, the touch controller controls:
   a pen driving signal to be applied to one ends of the some first patterns;
   an inverse pen driving signal to be applied to the other ends of the some first patterns or the other ends of the some first patterns to be grounded;
   the inverse pen driving signal to be applied to the one ends of the other first patterns or the one ends of the other first patterns to be grounded; and
   the pen driving signal to be applied to the other ends of the other first patterns.

16. The electronic device of claim 1, wherein the touch controller comprises:
   a first circuit unit comprising a driving circuit connected to one ends of the plurality of first patterns to output a pen driving signal, an inverse driving circuit configured to output an inverse pen driving signal, and a ground circuit;
   a second circuit unit comprising a driving circuit connected to the other ends of the plurality of first patterns to output the pen driving signal, an inverse driving circuit configured to output the inverse pen driving signal, and a receiving circuit configured to receive a stylus pen signal;
   a third circuit unit comprising a receiving circuit connected to one ends of the plurality of third patterns to receive the stylus pen signal; and
   a control unit configured to control the first to third circuit units.

17. The electronic device of claim 1, wherein the touch controller comprises:
   a differential amplifier unit connected to both ends of the plurality of first patterns; and
   a circuit unit comprising a receiving circuit connected to one ends of the plurality of third patterns to receive a stylus pen signals.

18. The electronic device of claim 7, wherein the touch controller controls the sensor unit to operate in one of a plurality of modes,
   wherein the plurality of modes comprises a touch sensing mode and a pen signal sensing mode,
   in the touch sensing mode, the touch controller controls a touch driving signal to be applied to the plurality of third patterns and receives a touch sensing signal from the plurality of first patterns, and
   in the pen signal sensing mode, the touch controller receives a pen signal from the plurality of first patterns and the plurality of third patterns,
   wherein the touch controller differentiates and outputs two signals output from an n-th first pattern and an n+2-th first pattern in the second direction in an order from the top of the plurality of first patterns.

* * * * *